United States Patent
Ho et al.

(10) Patent No.: US 10,996,521 B2
(45) Date of Patent: May 4, 2021

(54) DISPLAY DEVICE HAVING DESIGN OF ADJUSTABLE LIGHT INTENSITY DIRECTION

(71) Applicant: AU OPTRONICS CORPORATION, Hsin-Chu (TW)

(72) Inventors: Sheng-Ju Ho, Hsin-Chu (TW); Ming-Lung Chen, Hsin-Chu (TW); Li-Jia Chen, Hsin-Chu (TW); Ming-Chun Hsu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 50 days.

(21) Appl. No.: 16/405,259

(22) Filed: May 7, 2019

(65) Prior Publication Data

US 2019/0377231 A1      Dec. 12, 2019

(30) Foreign Application Priority Data

Jun. 8, 2018   (TW) .................................. 107119901

(51) Int. Cl.
  *G02F 1/1343*  (2006.01)
  *G02F 1/137*   (2006.01)
  *G09G 5/10*    (2006.01)

(52) U.S. Cl.
  CPC ........ *G02F 1/134309* (2013.01); *G02F 1/137* (2013.01); *G09G 5/10* (2013.01)

(58) Field of Classification Search
  None
  See application file for complete search history.

(56) References Cited

U.S. PATENT DOCUMENTS

| 8,570,450 B2 | 10/2013 | Lee et al. |
| 9,696,583 B2 | 7/2017 | Lee et al. |
| 2010/0103148 A1 | 4/2010 | Okazaki et al. |
| 2013/0002970 A1 | 1/2013 | Baek et al. |

FOREIGN PATENT DOCUMENTS

| CN | 101632039 | 1/2010 |
| CN | 101968595 | 2/2011 |
| CN | 102346308 | 2/2012 |
| CN | 102955302 | 3/2013 |
| CN | 104749833 | 7/2015 |
| TW | 201135290 | 10/2011 |
| TW | 201300882 | 1/2013 |

*Primary Examiner* — Richard H Kim
(74) *Attorney, Agent, or Firm* — WPAT, PC

(57) ABSTRACT

A display device includes a display module emitting collimated light along a propagation direction and an adjustment panel disposed on the display module. The adjustment panel includes a first substrate, a second substrate, a medium layer disposed between the first substrate and the second substrate, a first electrode layer disposed on the first substrate, and a second electrode layer disposed on the second substrate and facing the first electrode layer. The medium layer includes a first medium. When the adjustment panel is in a first enabled state, a voltage difference exists between the first substrate and the second substrate to form an electric field distribution. At least one equivalent dioptric structure is formed in the medium layer according to the electric field distribution. At least part of the collimated light passes through the equivalent dioptric structure and emits along a predetermined light emitting direction deflected from the propagation direction.

18 Claims, 31 Drawing Sheets

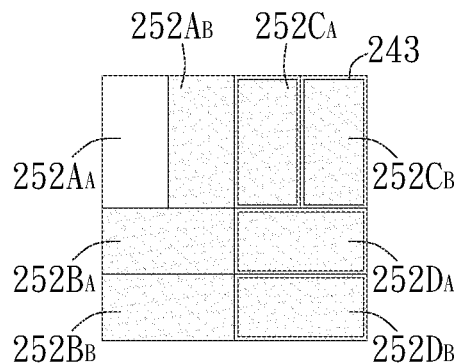
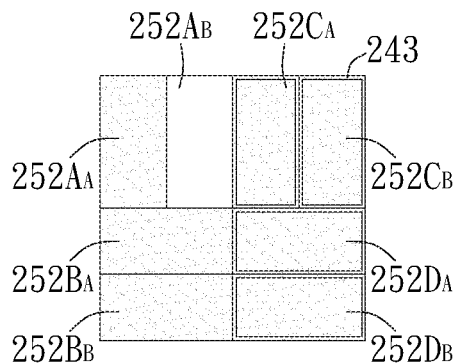
FIG. 17A　　　　　　　FIG. 17B
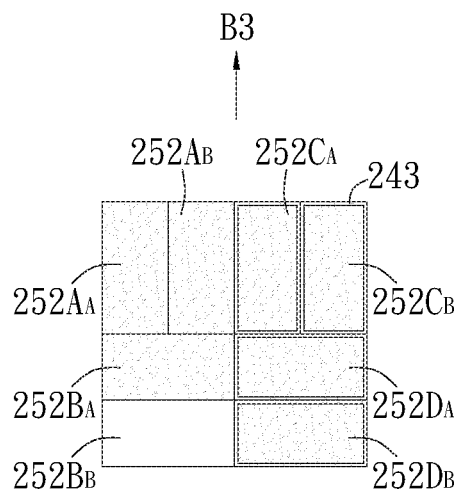
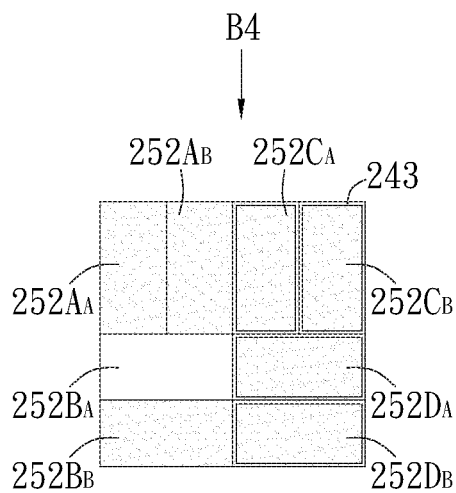
FIG. 17C　　　　　　　FIG. 17D

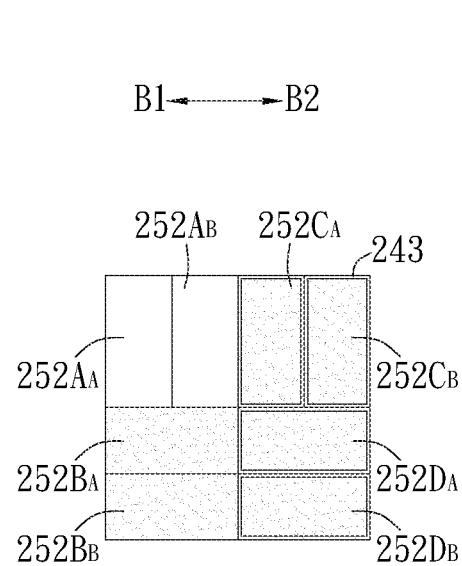
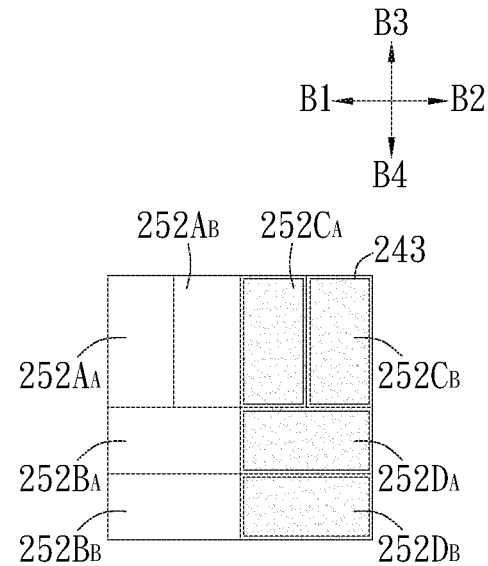
FIG. 18A  FIG. 18B
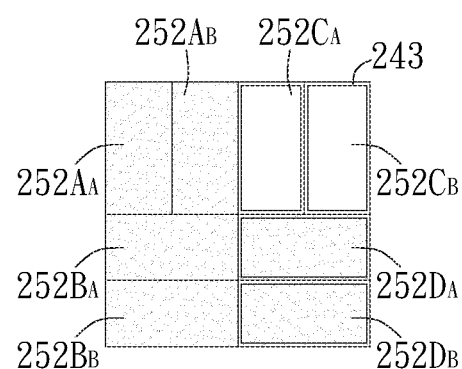
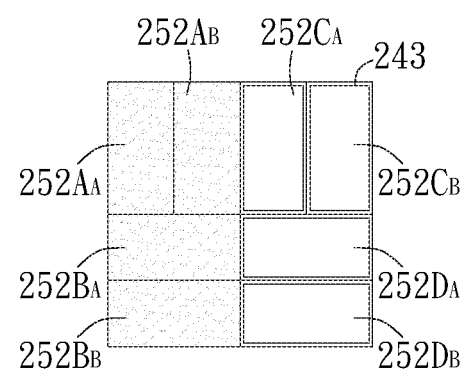
FIG. 19A  FIG. 19B

DISPLAY DEVICE HAVING DESIGN OF ADJUSTABLE LIGHT INTENSITY DIRECTION

BACKGROUND

Technical Field

The present invention is directed to a display device. Particularly the present invention is directed to a display device adopting a collimating light source.

Related Art

Display devices have been widely applied to various electronic devices, such as televisions, personal computers, mobile phones, wearable devices, digital cameras, and handheld video games. However, in order to enhance the visual perception of a user, manufacturers are still continuously improving the optical performance of the display device.

Existing display devices often have different brightness at different viewing angles for brighter areas in display frames. In other words, observers located at different positions on the front side of the display device feel differently for a bright area. An existing method is to increase a light source driving current corresponding to the bright area in a frame. However, such a method leads to higher power consumption, and the life of the light source is also shortened. Therefore, the existing display devices still need to be improved.

SUMMARY

The present invention is directed to a display device capable of adjusting the display brightness at different angles.

The present invention is further directed to a display device capable of reducing the loss of a light source.

A display device includes a display module and an adjustment panel disposed on the display module. The display module emits collimated light along a propagation direction. The adjustment panel includes a first substrate, a second substrate disposed facing the first substrate, a medium layer disposed between the first substrate and the second substrate, a first electrode layer disposed on the first substrate, and a second electrode layer disposed on the second substrate and facing the first electrode layer. The medium layer includes a first medium. When the adjustment panel is in a first enabled state, a voltage difference exists between the first substrate and the second substrate to form an electric field distribution. At least one equivalent dioptric structure is formed in the medium layer according to the electric field distribution. At least part of the collimated light passes through the equivalent dioptric structure and emits along a predetermined light emitting direction deflected from the propagation direction, thus adjusting the light intensity direction.

BRIEF DESCRIPTION OF THE DRAWINGS

FIGS. 17A, 17B, 17C and 17D are schematic diagrams of different embodiments that a light emitting group generates a light emitting mode as shown in FIG. 5.

FIGS. 18A and 18B are schematic diagrams of different embodiments that a light emitting group generates a light emitting mode as shown in FIG. 8.

FIGS. 19A and 19B are schematic diagrams of embodiments that a light emitting group generates a light emitting mode as shown in FIG. 10A.

DETAILED DESCRIPTION

The present invention provides a display device, which changes a deflection direction of light via an adjustment panel or provides uniform light from different viewing angles, so as to improve the display quality.

Figure 1:
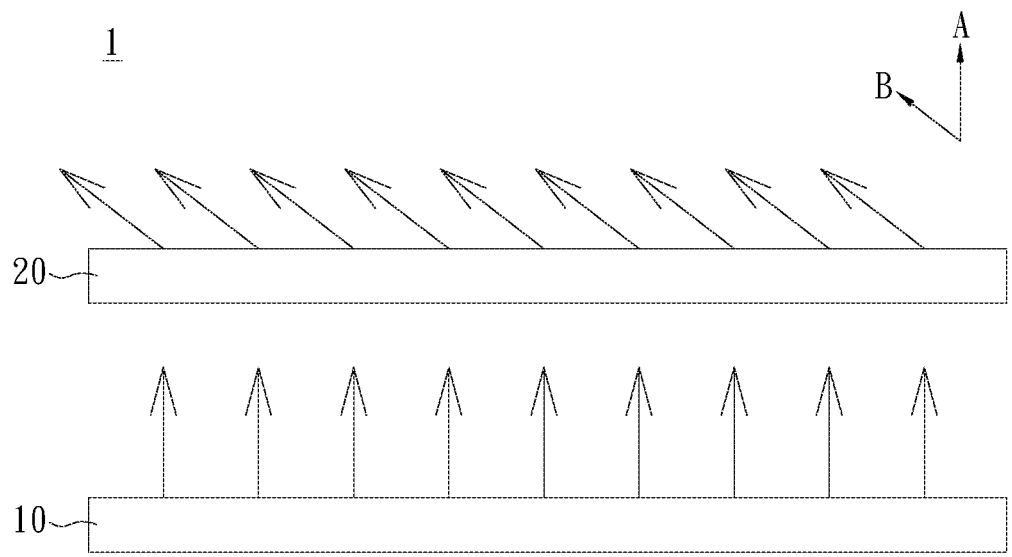
FIG. 1 is a schematic diagram of an embodiment of a display device of the present invention.

FIG. 1 is a cross-sectional view of an embodiment of a display device 1 of the present invention. As shown in FIG. 1, the display device 1 includes a display module 10 and an adjustment panel 20 disposed on the display module 10. The display module 10 emits collimated light along a propagation direction A. When the adjustment panel 20 is in a first enabled state, an equivalent dioptric structure is formed in the adjustment panel 20, so that the light that passes through the equivalent dioptric structure is emitted along a predetermined light emitting direction B deflected from the propagation direction A. The equivalent dioptric structure refers to an optical mechanism for deflecting all or part of the incident light from the original path, and includes several different forms which are respectively described in various embodiments below, but not limited to the following embodiments.

Figure 2:
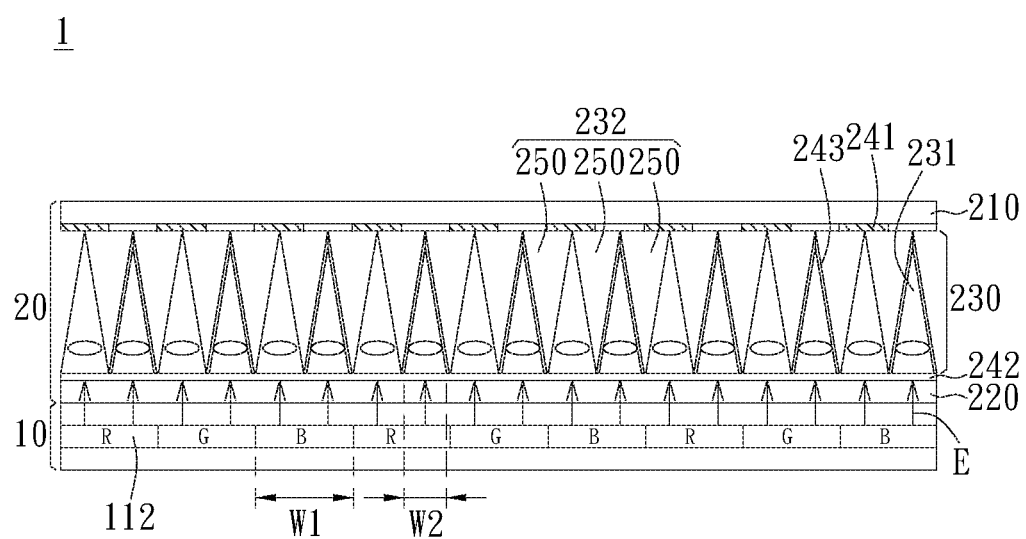
FIG. 2 is a schematic diagram of an embodiment of a display device.

FIG. 2 is a schematic diagram of an embodiment of the display device 1. An adjustment panel 20 includes mediums having polyhedral structures 250. As shown in FIG. 2, the adjustment panel 20 is disposed on the display module 10.

In the embodiment of FIG. 2, the display module 10 is a self-luminous display panel, and has a plurality of sub pixels 112. In an embodiment, marking letters R, G, and B in the sub pixels 112 refer to regions capable of producing light in different colors. The adjustment panel 20 includes a first substrate 210, a second substrate 220, a medium layer 230, a first electrode layer 241, and a second electrode layer 242. The second substrate 220 is disposed facing the first substrate 210. The second substrate 220 receives collimated light E from the display module 10. That is, the second substrate 220 is located on the light incoming side of the adjustment panel 20, and the first substrate 210 is located on the light emitting side of the adjustment panel 20. The medium layer 230 is disposed between the first substrate 210 and the second substrate 220. The first electrode layer 241 is disposed on the first substrate 210, and the second electrode layer 242 is disposed on the second substrate 220 and faces the first electrode layer 241.

As shown in FIG. 2, the medium layer 230 includes first mediums 231 and second mediums 232. In the present embodiment, the medium layer 230 is filled with the first mediums 231 and the second mediums 232. In the embodiment of FIG. 2, the second mediums 232 and the first mediums 231 are arranged in a staggered manner. The first mediums 231 are materials having a birefringence property, such as flowable liquid crystals. The second mediums 232 are curable liquid crystals having a fixed refractive index. The refractive index of the first mediums 231 may be controlled by a voltage. In other words, the refractive index of the first mediums 231 is voltage dependent or a function of voltage. In addition, as shown in FIG. 2, the part, close to one side of the second substrate 220, of each of the first mediums 231 between the second mediums 232 has a width W2. A width W1 of each of the sub pixels 112 is approximately equal to twice of the width W2 of the part, close to one side of the second substrate 220, of each of the first mediums 231. The first electrode layer 241 includes multiple first electrodes. The width of each of the first electrodes is approximately equal to the width W2 of the part, close to one side of the second substrate 220, of each of the first mediums 231.

Figure 3:
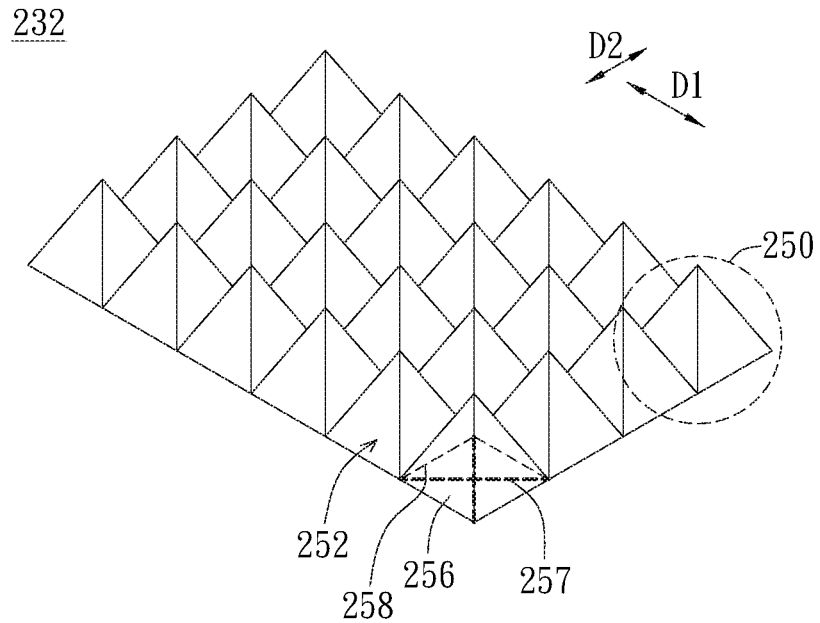
FIG. 3 is a three-dimensional diagram of an embodiment of a polyhedral structure.

The second mediums 232 include a plurality of polyhedral structures 250. Referring to FIG. 2 and FIG. 3, FIG. 3 is a three-dimensional diagram of an embodiment of the polyhedral structures 250. In the embodiment of FIG. 3, the polyhedral structures 250 are pyramids. As shown in FIG. 3, the polyhedral structures 250 are adjacent to one another and are arranged along a first arrangement direction D1 parallel to the side edge of the adjustment panel and a second arrangement direction D2 perpendicular to the first arrangement direction D1. Specifically, each of the pyramids has a bottom surface 256 and four side faces 252 connected to the bottom surface 256. The bottom surfaces 256 are disposed close to the first substrate. The bottom edge 258 on the bottom surface 256 of one pyramid is connected with the bottom edge of another pyramid. The plurality of pyramids is distributed in an array on the first substrate. The first mediums (231, see FIG. 2) are distributed in the spaces among the pyramids.

In addition, as shown in FIG. 2, the display device 1 further includes a third electrode layer 243. The third electrode layer 243 is disposed on part of the surfaces (such as the side faces 252 of the abovementioned pyramids) of the polyhedral structures 250. As shown in FIG. 2, part of the surfaces of the polyhedral structures 250 are provided with the third electrode layer 243, and the other part of the surfaces of the polyhedral structures 250 do not have the third electrode layer 243. The third electrode layer 243 and the first electrode layer 241 are disposed in a staggered manner in a projection direction on the first substrate 210. That is, electrodes of the third electrode layer 243 and the first electrodes of the first electrode layer 241 are alternatively disposed from one another in a spacing manner within a projection range on a plane where the first substrate 210 is located.

Figure 4:
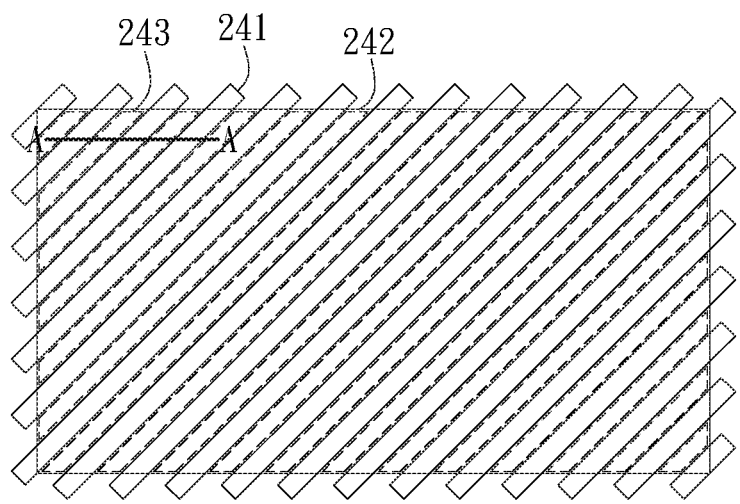
FIG. 4 is a schematic diagram of an electrode distribution corresponding to FIG. 2.

FIG. 4 is a schematic diagram of an electrode distribution corresponding to FIG. 2. FIG. 4 only illustrates a corresponding relation between the first electrode layer 241 and the second electrode layer 242. It can be seen from the top view of FIG. 4, the first electrode layer 241 has a plurality of strip-shaped first electrodes. The second electrode layer 242 is a planar electrode. Dotted frames drawn between the first electrodes refer to the distribution ranges of the third electrode layer 243. The first electrodes are obliquely disposed in parallel and spaced apart from each other. The inclination direction of the first electrodes approximately forms an angle of 45 degrees with the side edge of the planar electrode or is along a diagonal of the planar electrode. Further, referring to FIGS. 3 and 4, the inclination direction of the first electrode is along a diagonal 257 of the bottom surface 256 of the pyramid. The first electrodes formed in the first electrode layer 241 and arranged in the spacing manner may be staggered from the third electrode layer 243. That is, the first electrodes of the first electrode layer 241 and the electrodes of the third electrode layer 243 are alternatively disposed within the projection range of the plane where the first substrate is located.

Figure 5:
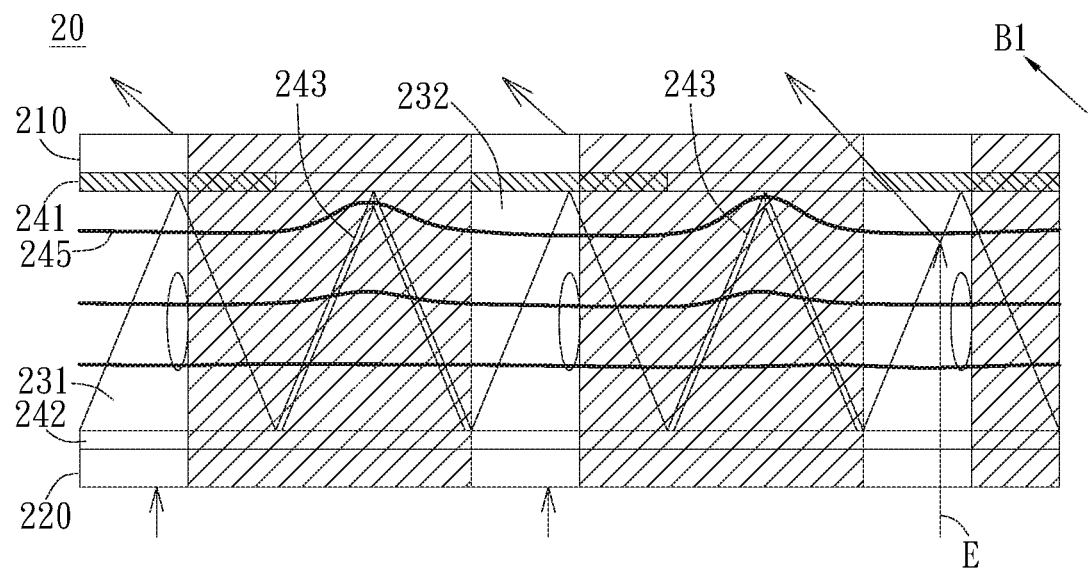
FIG. 5 is a schematic diagram of an embodiment of a first enabled state.

FIG. 5 is a schematic diagram of an embodiment of a first enabled state. The first electrode layer 241 and the second electrode layer 242 in FIG. 5 are enlarged cross-sectional views correspond to a line AA in FIG. 4. FIG. 5 illustrates a unidirectional deflected form serving as the first enabled state. As shown in FIG. 5, the first electrode layer 241 is disposed on the first substrate 210, and the second electrode layer 242 is disposed on the second substrate 220. When the adjustment panel 20 is in the first enabled state, a voltage difference exists between the first substrate 210 and the second substrate 220 to form an electric field distribution. For example, the first electrode layer 241 is adjusted to be OFF, and the second electrode layer 242 is adjusted to be ON, thus forming the electric field distribution between the first substrate 210 and the second substrate 220. The shape of an equipotential line 245 varies with the electric field distribution, and liquid crystal molecules are changed from an original lying state (from a long-axis direction of the liquid crystal molecules) into an upright state. At the moment, an equivalent dioptric structure is formed in the medium layer according to the electric field distribution, so as to change the path of collimated light.

Specifically, according to the above, the refractive index of the first mediums 231 may be controlled by a voltage. When no voltage difference exists between the first substrate 210 and the second substrate 220, the refractive index of the first mediums 231 and the second mediums 232 are both equal to a first refractive index value (such as 1.5). When the adjustment panel 20 is in the first enabled state, the refractive index of the first mediums 231 varies from the first refractive index value n1 into a second refractive index value n2 (such as increased to 1.7) with the voltage difference. According to another aspect, the refractive index of the second mediums 232 is maintained to be equal to the first refractive index value n1. A difference between the two refractive index values is distributed along a border between the first mediums 231 and the second mediums 232. In other words, for the flowable liquid crystals and the polyhedral structures, the surfaces of the polyhedral structures are used as refraction interfaces (which are, in the present embodiment, of the shapes of the side faces of the pyramids). In the first enabled state, the refraction interfaces generate and form the equivalent dioptric structures.

As shown in FIG. 5, a predetermined light emitting direction includes a first light emitting direction B1. When the adjustment panel 20 is in the first enabled state, the pixels at positions of the display module corresponding to the third electrode layer 243 and positions of the display module corresponding to part of the first electrode layers 241 are not lightened or are set to be dark or fully black (such as regions covered by oblique lines), and the collimated light that passes through the equivalent dioptric structures is emitted along the first light emitting direction B1 deflected from the propagation direction. Therefore, each correspondingly lightened position of the adjustment panel 20 may emit the light toward a single direction in a deflected manner.

The collimated light may provide an effect of adjusting the light intensity direction due to the nature that a peak value of the light intensity is concentrated within a small viewing angle range. In an embodiment, the emitting viewing angle of the collimated light is less than or equal to 15 degrees. The emitting viewing angle refers to a viewing range of full width at half maximum of the light intensity peak value of the light emitted from the display module.

In other embodiments, the varied refractive index of the first mediums is preferably greater than the refractive index of the second mediums. That is, the mediums close to the light incoming side of the adjustment panel have a larger refractive index. The light passes through the mediums having the larger refractive index at first so as to increase the deflection degree of the emitted light from the propagation direction, but not limited thereto.

Figure 6A:
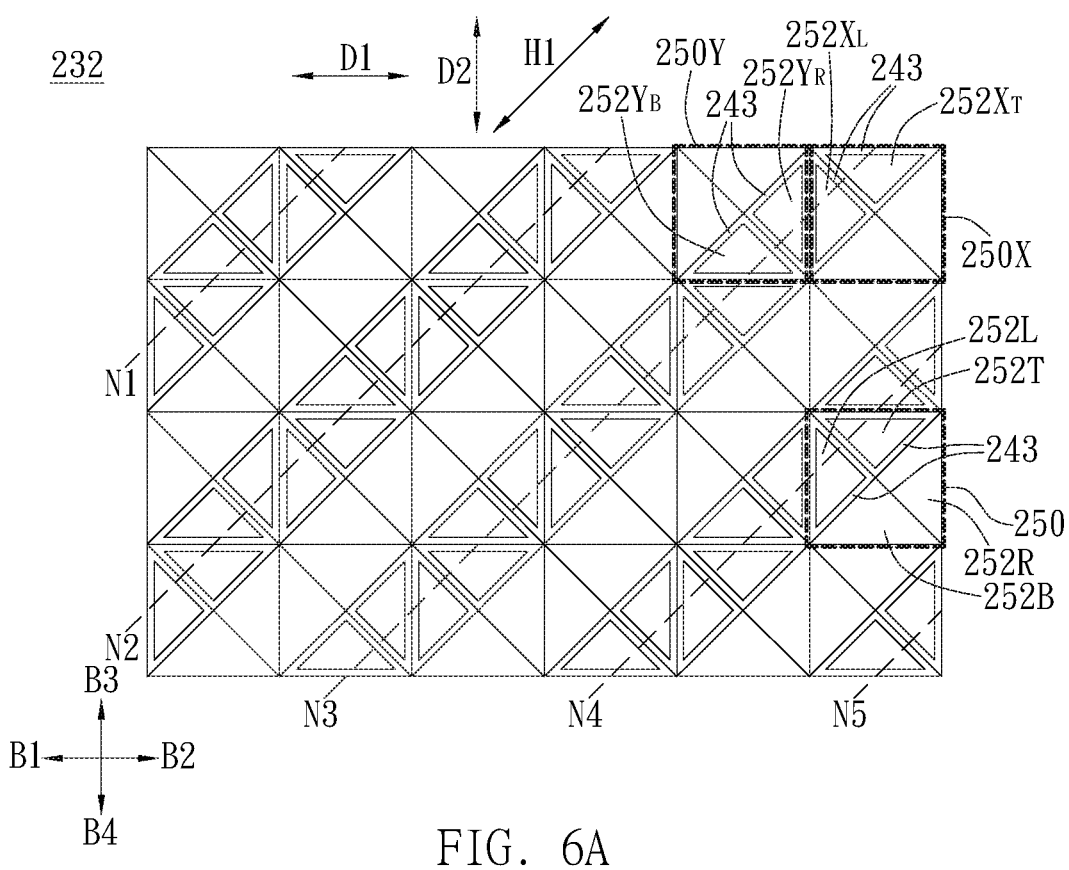
FIGS. 6A and 6B are top views of an embodiment of a second medium.
Figure 6B:
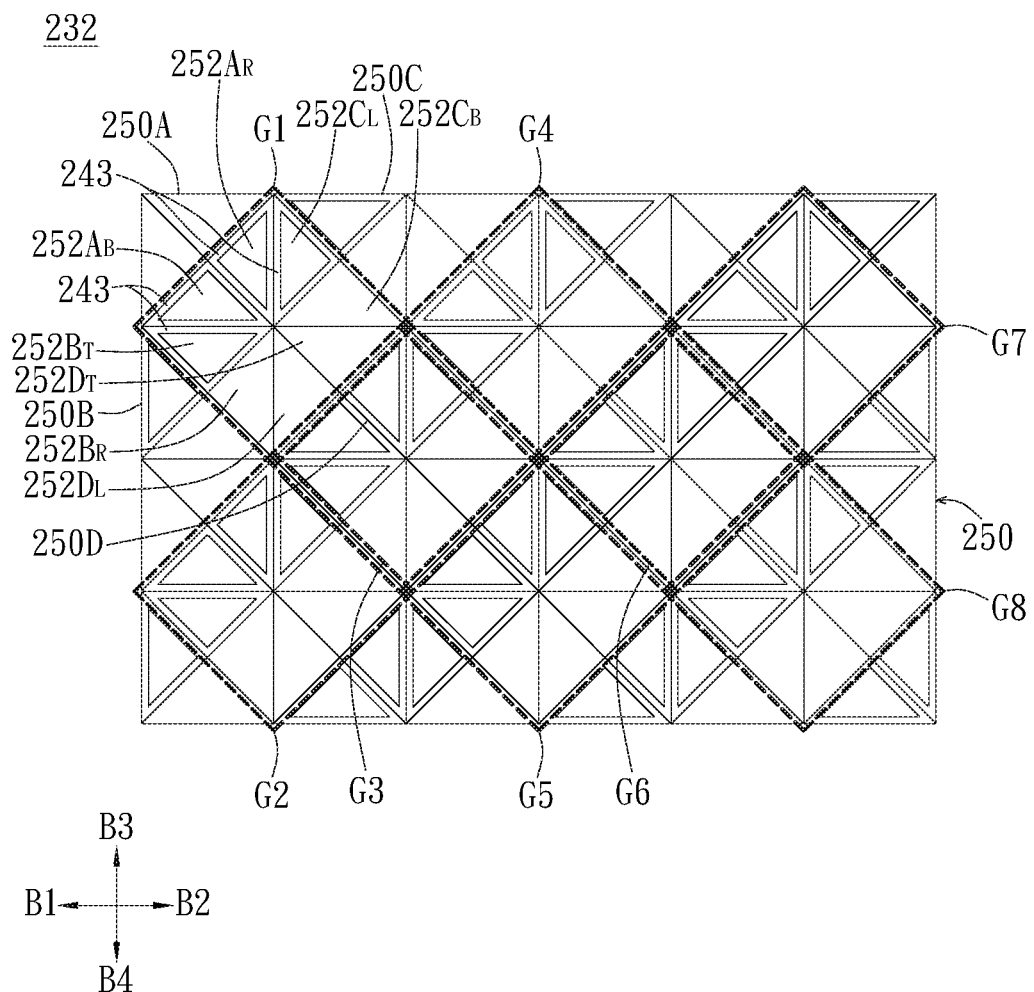

FIGS. 6A and 6B are top views of an embodiment of the second medium 232. In FIG. 6A, the polyhedral structures 250 are pyramids. As shown in FIG. 6A, the polyhedral structures 250 are adjacent to one another and are arranged along the first arrangement direction D1 and the second arrangement direction D2. Part of the surfaces of the polyhedral structures 250 are provided with the third electrode layer 243. The third electrode layer 243 consists of multiple third electrodes. In terms of the polyhedral structures of the pyramids, the third electrode layer 243 is disposed on two adjacent side faces of the four side faces of one pyramid and is distributed along the rim of the side edge. For an adjacent next pyramid, the third electrode layer 243 is disposed on the other two adjacent side faces opposite to the previous pyramid. In an embodiment, in the polyhedral structure 250X, the third electrode layer 243 is disposed on the side face $252X_T$ and the adjacent side face $252X_L$. In the polyhedral structure 250Y, the third electrode layer 243 is disposed on the side face $252Y_R$ and the adjacent side face $252Y_B$.

On the whole, the third electrode layer 243 located on different polyhedral structures 250 is approximately obliquely arranged in parallel in a spacing manner along the same inclination direction. The second mediums 232 have a plurality of third electrode layers 243, which are inclined relative to the second arrangement direction D2 and arranged in multiple rows. As shown in FIG. 6A, the third electrode layer 243 is divided into rows N1 to N5. In an embodiment, the third electrode layers 243 on the side face $252Y_R$ and the side face $252Y_B$ are located in the same row (the row of N3) and are arranged along a direction H1. The third electrode layers 243 on the side face 252L and the side face 252T are located in another row (the row of N4) disposed in a spacing from the previous row (the row of N3) and are arranged along the direction H1. Further, referring to FIG. 3 and FIG. 6A, multiple third electrodes are arranged along oblique straight lines, and the inclination direction of each of the oblique straight lines is along the diagonal 257 of the bottom surface 256 of each of the pyramids. A distance exists between the third electrodes on different oblique straight lines and is approximately equal to half of the length of the diagonal 257 of the bottom surface 256 of each of the pyramids. The third electrodes arranged in the spacing manner may be staggered from the first electrodes (referring to FIG. 4).

In the embodiment of FIG. 5, the light is deflected toward a single direction through the side faces of the polyhedral structures when the voltage difference is formed. As shown in FIG. 6A, in terms of a planar graph, the predetermined light emitting direction may include a first light emitting direction B1, a second light emitting direction B2, a third light emitting direction B3, and a fourth light emitting direction B4. In terms of the polyhedral structure 250 of each of the pyramids, the four side faces may respectively guide the light to the above-mentioned four different light emitting directions. In an embodiment, the light that passes through the side face 252R is deflected toward the first light emitting direction B1; the light that passes through the side face 252L is deflected toward the second light emitting direction B2; the light that passes through the side face 252B is deflected toward the third light emitting direction B3; and the light that passes through the side face 252T is deflected toward the fourth light emitting direction B4.

In order to allow the light to be emitted toward different predetermined light emitting directions and consider the arrangement positions of all the electrode layers, each of the second mediums is a light emitting group composed of four adjacent polyhedral structures 250 disposed along the first arrangement direction and the second arrangement direction. Each of the light emitting groups (a dotted scope in FIG. 6B, such as G1) refers to a unit capable of meeting all the predetermined light emitting directions. Specifically, the plurality of polyhedral structures 250 constituting the light emitting groups forms a 2×2 array, and eight side faces, close to the center of the light emitting group, of the four polyhedral structures 250 constitute the light emitting group. In an embodiment, the light emitting group G1 includes the side face $252A_R$ and the side face $252A_B$ of the polyhedral structure 250A, the side face $252B_T$ and the side face $252B_R$ of the polyhedral structure 250B, the side face $252C_L$ and the side face $252C_B$ of the polyhedral structure 250C, and the side face $252D_T$ and the side face $252D_L$ of the polyhedral structure 250D.

As shown in FIG. 6B, each of the light emitting groups includes different side faces of the polyhedral structures 250 and may allow the light to be emitted toward different predetermined light emitting directions. Part of the side faces does not have the third electrode layer 243, and the other side faces are provided with the third electrode layer 243.

In an embodiment, the positions, provided with the third electrode layer 243, in each of the light emitting groups are preferably the same. In an embodiment, as shown in FIG. 6B, the two side faces (such as the side face $252A_B$ of the polyhedral structure 250A and the side face $252B_T$ of the polyhedral structure 250B) on the left of the center of each of the light emitting groups and the two upper side faces (such as the side face $252C_L$ of the polyhedral structure 250C and the side face $252A_R$ of the polyhedral structure 250A) above the center of each of the light emitting groups are provided with the third electrode layer 243, so as to provide a light emitting effect of relatively uniform brightness distribution, but the position of the third electrode layer 243 is not limited thereto.

It should be added that the number of the polyhedral structures 250 required by each of the above-mentioned light emitting groups is merely an example, but not limited thereto. In other embodiments, the above-mentioned 2×2 polyhedral structures 250 can be used as one basic unit to expand the scope of each of the light emitting groups, such as 4×2 polyhedral structures 250 constituting each of the light emitting groups.

Figures 7A, 7B:
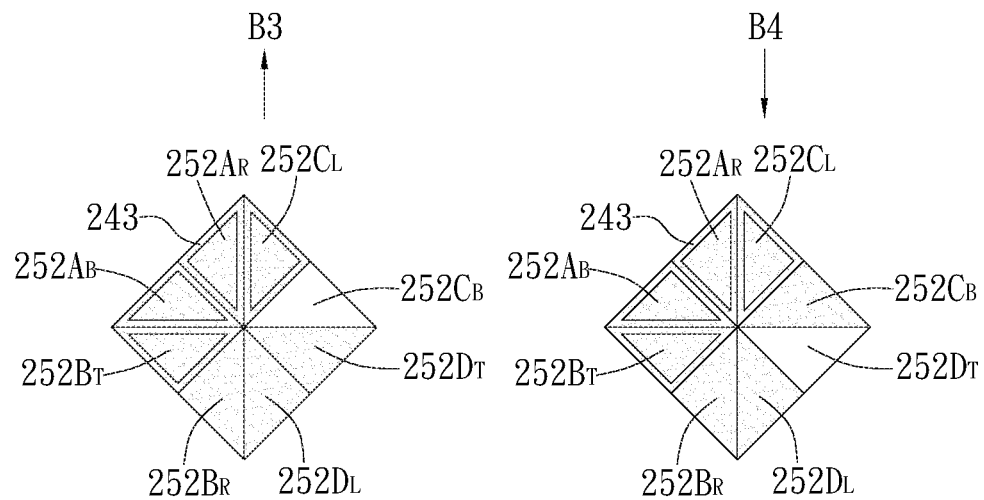
FIGS. 7A, 7B, 7C, and 7D are schematic diagrams of different embodiments that a light emitting group generates a light emitting mode as shown in FIG. 5.

FIGS. 7A, 7B, 7C, and 7D are schematic diagrams of different embodiments that a light emitting group generates a light emitting mode as shown in FIG. 5. Referring to FIGS. 7A to 7D, when the adjustment panel is in the first enabled state illustrated in FIG. 5, the pixels of the display module at positions corresponding to the third electrode layer and positions corresponding to part of the first electrode layer 241 are not lightened or are set to be dark or fully black. As shown in FIG. 7A, the positions corresponding to the side faces $252A_R$, $252A_B$, $252B_T$ and $252C_L$ provided with the third electrode layer 243 are not lightened, and the positions corresponding to the side faces $252B_R$, $252D_L$ and $252D_T$ are not lightened, either. The position corresponding to the side face $252C_B$ is lightened or is set to be bright or fully white, so as to deflect the light toward the third light emitting direction B3.

Similarly, in FIG. 7B, the positions corresponding to the side faces provided with the third electrode layer 243 are not lightened, the positions corresponding to the side faces $252B_R$, $252D^L$ and $252C_B$ are not lightened, and the position corresponding to the side face $252D_T$ is lightened, so as to deflect the light toward the fourth light emitting direction B4.

Figures 7C, 7D:
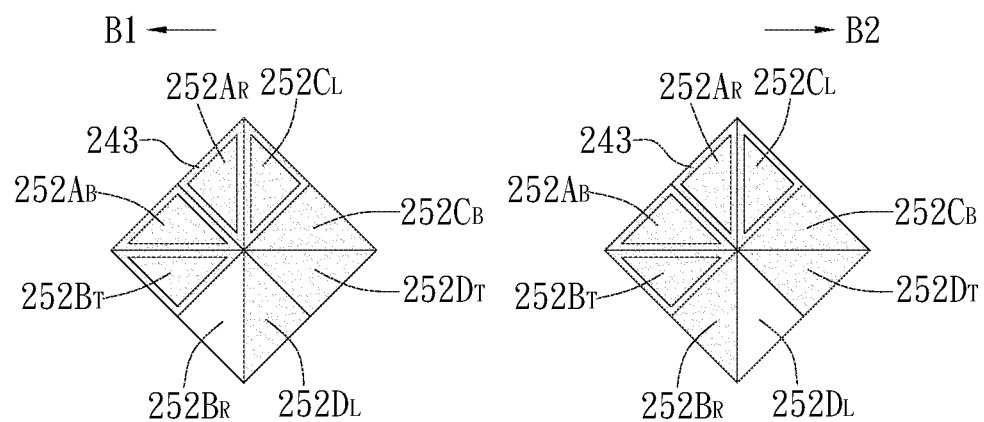

In FIG. 7C, the positions corresponding to the side faces provided with the third electrode layer 243 are not lightened, the positions corresponding to the side faces $252D_L$, $252D_T$ and $252C_B$ are not lightened, and the position corresponding to the side face $252B_R$ is lightened, so as to deflect the light toward the first light emitting direction B1.

In FIG. 7D, the positions corresponding to the side faces provided with the third electrode layer 243 are not lightened, the positions corresponding to the side faces $252B_R$, $252D_T$ and $252C_B$ are not lightened, and the position corresponding to the side face $252D_L$ is lightened, so as to deflect the light toward the second light emitting direction B2.

Different forms of the unidirectional deflected light may be known from the descriptions in FIGS. 7A to 7D. When the adjustment panel performs the unidirectional deflected form illustrated in FIG. 5, in an embodiment, one of the forms in FIGS. 7A to 7D may be selected to allow each of the light emitting groups to guide the light generated by the display module to the same predetermined light emitting direction, so as to emit the light toward the single direction in the deflected manner.

In another embodiment, different light emitting groups may select different forms in FIGS. 7A to 7D. For example, the light emitting groups G1 to G5 in FIG. 6B adopt the form in FIG. 7A and deflect the light toward the third light emitting direction B3. The light emitting groups G6 to G8 adopt the form in FIG. 7C and deflect the light toward the first light emitting direction B1. Therefore, the directions of the unidirectional deflected light provided by different light emitting groups are different. The display device adjusts the light to be in different light intensity directions at different positions of a frame, so as to provide different visual perceptions.

Figure 8:
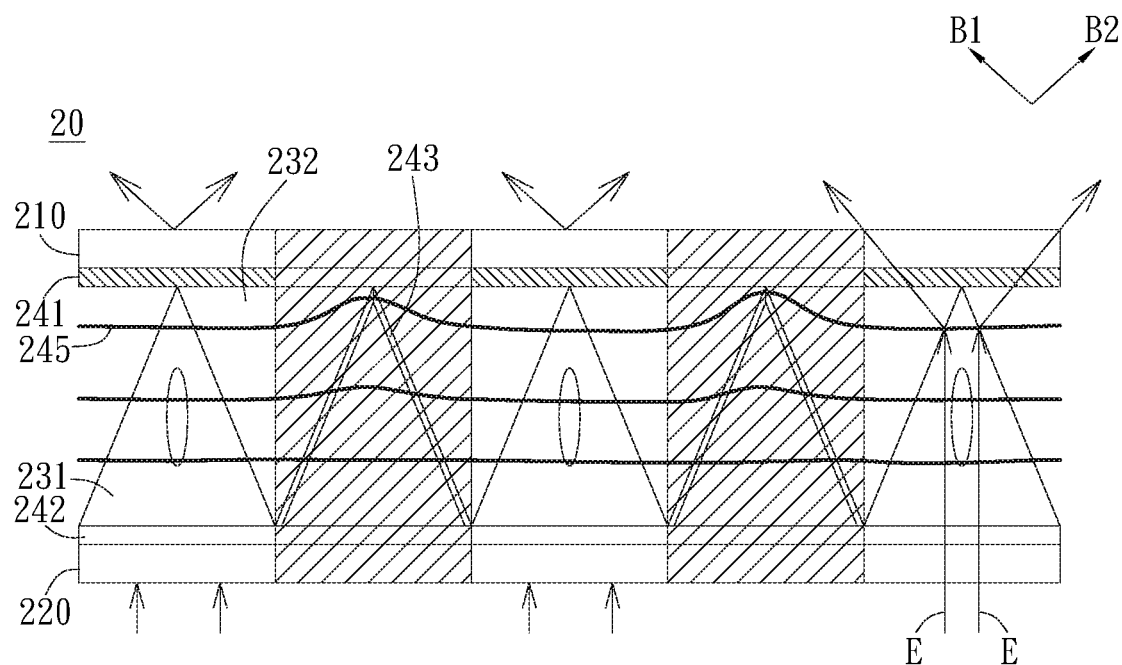
FIG. 8 is a schematic diagram of another embodiment of a first enabled state.

FIG. 8 is a schematic diagram of another embodiment of the first enabled state. FIG. 8 illustrates a multidirectional deflected form serving as the first enabled state. As shown in FIG. 8, the first electrode layer 241 is disposed on the first substrate 210, and the second electrode layer 242 is disposed on the second substrate 220. When the adjustment panel 20 is in the first enabled state, a voltage difference exists between the first substrate 210 and the second substrate 220 to form an electric field distribution. Similarly, the refractive index of the first mediums 231 may be controlled by a voltage, and the second mediums 232 are of polyhedral structures having a fixed refractive index value. When the adjustment panel 20 is in the first enabled state, the voltage difference exists to allow the refractive index of the first mediums 231 to vary from a first refractive index value to a second refractive index value and maintain the refractive index of the second mediums 232 to be equal to the first refractive index value. At the moment, a border between the first mediums 231 and the second mediums 232 has a refractive index value difference. In other words, the surfaces of the polyhedral structures are used as refraction interfaces to form the equivalent dioptric structures.

As shown in FIG. 8, the predetermined light emitting direction includes a first light emitting direction B1 and a second light emitting direction B2. A difference from the embodiment illustrated in FIG. 5 is that when the adjustment panel 20 is in the first enabled state, the pixels of the display module at positions corresponding to the third electrode layer 243 are not lightened or are set to be dark or fully black (such as regions covered by oblique lines), and the collimated light that passes through the equivalent dioptric structures is emitted along the first light emitting direction B1 and the second light emitting direction B2 which are deflected from the propagation direction. Therefore, each correspondingly lightened position of the adjustment panel 20 may emit the light toward two directions in a deflected manner.

Figures 9A, 9B:
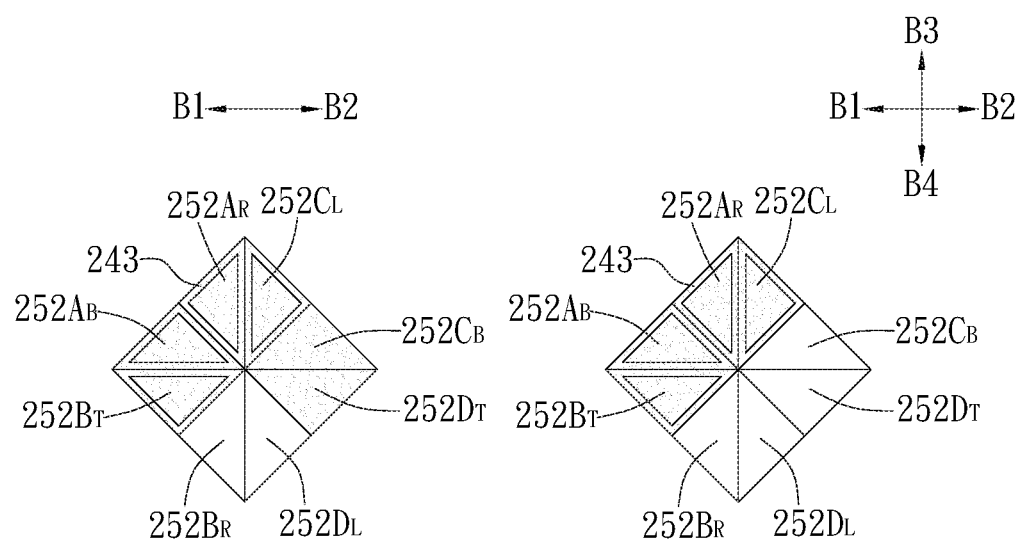
FIGS. 9A and 9B are schematic diagrams of different embodiments that a light emitting group generates a light emitting mode as shown in FIG. 8.

FIGS. 9A and 9B are schematic diagrams of different embodiments that a light emitting group generates a light emitting mode as shown in FIG. 8. Referring to FIGS. 9A and 9B, when the adjustment panel is in the first enabled state illustrated in FIG. 8, the pixels of the display module at positions corresponding to the third electrode layer 243 are not lightened or are set to be dark or fully black. As shown in FIG. 9A, the positions corresponding to the side face provided with the third electrode layer 243 are not lightened, and the positions corresponding to the side faces $252C_B$ and $252D_T$ are not lightened, but the positions corresponding to the side faces $252B_R$ and $252D_L$ are lightened, so as to deflect the light toward the first light emitting direction B1 and the second light emitting direction B2.

It should be understood that in other embodiments, the positions corresponding to any two of the four side faces without the third electrode layer in the light emitting group may be selectively lightened to allow each of the light emitting groups to guide the light generated by the display module to two predetermined light emitting directions, so as to emit the light toward multiple directions in the deflected manner. Further, if the positions corresponding to the four side faces without the third electrode layer in the light emitting group are all lightened to allow each of the light emitting groups to guide the light generated by the display module to four predetermined light emitting directions, the light also may be emitted toward multiple directions in the deflected manner. As shown in FIG. 9B, the positions corresponding to the side faces provided with the third electrode layer 243 are not lightened, and the positions corresponding to the side faces $252B_R$, $252C_B$, $252D_L$ and $252D^T$ are all lightened, so as to deflect the light toward four predetermined light emitting directions (B1, B2, B3 and B4).

Figure 10A:
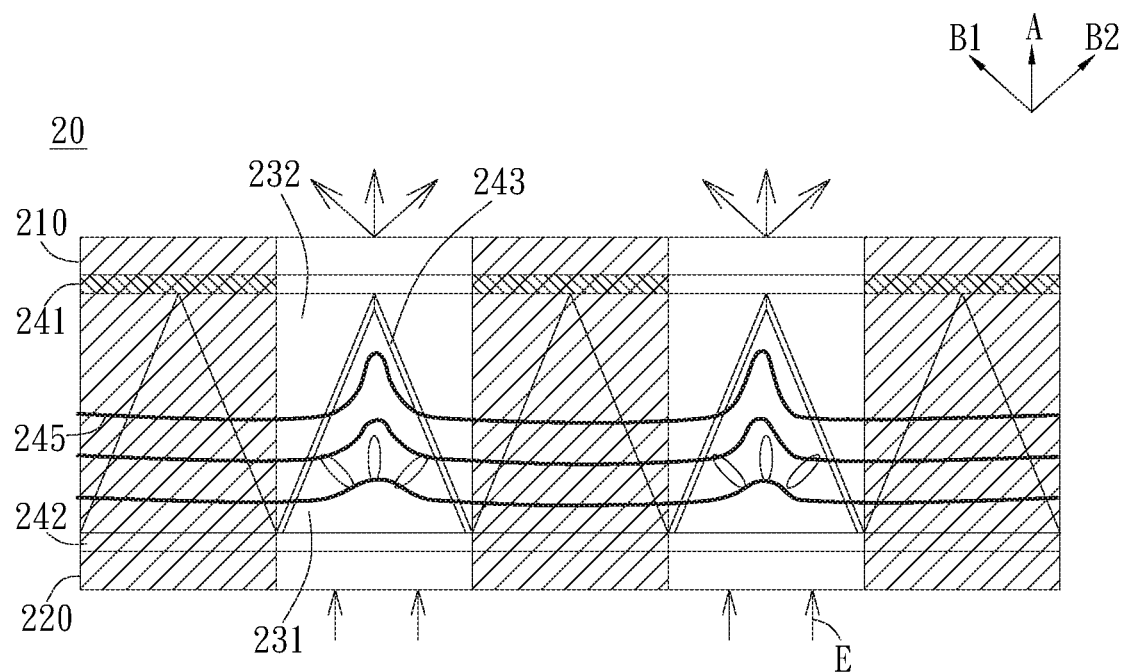
FIG. 10A is a schematic diagram of another embodiment of a first enabled state.

FIG. 10A is a schematic diagram of another embodiment of the first enabled state. FIG. 10A illustrates a scattered form serving as the first enabled state. The scattered form refers to scattering the collimated light to different viewing angles to allow the light intensities from various viewing angles to be close. As shown in FIG. 10A, the second electrode layer 242 is disposed on the second substrate 220, and the third electrode layer 243 are disposed on part of the surfaces of the polyhedral structures. When the adjustment panel 20 is in the first enabled state, a voltage different exists between the first substrate 210 and the second substrate 220 to form an electric field distribution. For example, the second electrode layer 242 is adjusted to be ON, and the third electrode layer 243 is adjusted to be OFF, thus forming the electric field distribution between the first substrate 210 and the second substrate 220. The shape of an equipotential line 245 varies with the electric field distribution, and part of liquid crystal molecules are changed from an original lying state into an upright state. The positions close to the surfaces of the polyhedral structures are affected by the fact that the third electrode layer 243 changes the magnitude of the voltage difference, so that part of the liquid crystal molecules are inclined. At the moment, an equivalent dioptric structure is formed in the medium layer according to the electric field distribution, so as to change the path of collimated light.

The first mediums 231 and the second mediums 232 are similar to those in the above-mentioned embodiments. That is, the refractive index of the first mediums 231 may be controlled by a voltage, and the second mediums 232 are of polyhedral structures having a fixed refractive index value. When the adjustment panel 20 is in the first enabled state, the voltage difference exists to allow the refractive index of the first mediums 231 to vary. At the moment, a border between the first mediums 231 and the second mediums 232 builds a refraction interface. In other words, the surfaces of the polyhedral structures are used as refraction interfaces to form the first type of equivalent dioptric structures.

Figure 10B:
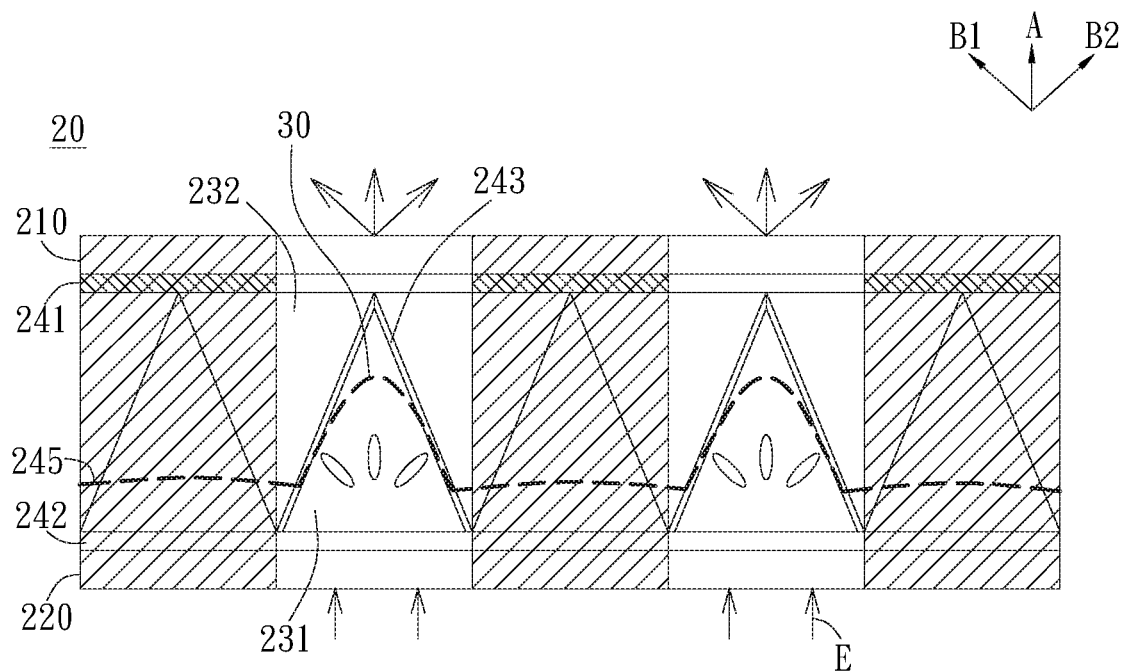
FIG. 10B is a schematic diagram of generating an equivalent dioptric structure in a first medium in correspondence to FIG. 10A.

In addition, as shown in FIG. 10B, in addition to the equivalent dioptric structures formed on the surfaces of the polyhedral structures, the states of the liquid crystal molecules at different positions of the first mediums 231 are changed along with the voltage difference to simultaneously form another type of equivalent dioptric structures in the first mediums 231. Specifically, the first mediums 231 generate refraction interfaces having gradient-distributed refractive indexes according to the electric field distribution, such as analogous curved surfaces formed by turning the liquid crystal molecules in a way of stacking or connection or in other combination ways. As shown in FIG. 10B, the equivalent dioptric structure includes multiple dioptric units 30. In other words, the above-mentioned refraction interface may form another type of equivalent dioptric structure in each of the first mediums 231. In the embodiments of FIGS. 10A and 10B, the refraction interfaces are built in the first mediums 231 as a lens.

As shown in FIGS. 10A and 10B, the predetermined light emitting direction includes a first light emitting direction B1 and a second light emitting direction B2. A difference from the embodiments of FIG. 5 and FIG. 8 is that when the adjustment panel 20 is in the first enabled state, the pixels of the display module at positions corresponding to the first electrode layer 241 are not lightened or are set to be dark or fully black (such as regions covered by oblique lines), and the positions corresponding to the third electrode layer 243 are lightened or set to be bright or fully white. The collimated light that passes through the above-mentioned two types of equivalent dioptric structures is emitted along the first light emitting direction B1, the second light emitting direction B2, and the propagation direction A. Therefore, each correspondingly lightened position of the adjustment panel 20 may scatter the light.

On the whole, as shown in FIGS. 10A and 10B, the present embodiment simultaneously has two types of equivalent dioptric structures. The equivalent dioptric structures 30 formed by the refraction interfaces built in the first mediums 231 provide a lens-like effect to refract the light from the display module to form divergent light. The equivalent dioptric structures formed by the refraction interfaces built in the border between the first mediums 231 and the second mediums 232 provide a prism effect to deflect partial divergent light toward the predetermined light emitting direction. The light that passes through the adjustment panel 20 is emitted in a scattered form.

It should be understood that the above-mentioned emission of the light toward the first light emitting direction B1, the second light emitting direction B2, and the propagation direction A is only an illustration that the scattered light includes different directions besides the predetermined light emitting direction and is not limited to the propagation direction A. By virtue of the scattering operation, a relatively uniform light intensity distribution exists in each direction.

Figure 11A:
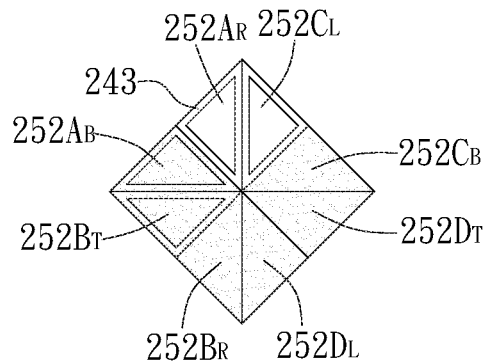
FIGS. 11A and 11B are schematic diagrams of an embodiment that a light emitting group generates a light emitting mode as shown in FIG. 10A.
Figure 11B:
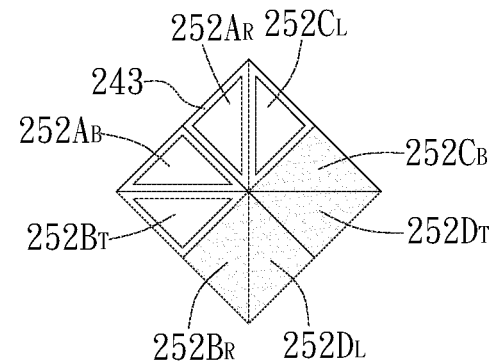

FIGS. 11A and 11B are schematic diagrams of an embodiment that a light emitting group generates a light emitting mode as shown in FIG. 10A. Referring to FIG. 11A, when the adjustment panel is in the first enabled state as shown in FIG. 10A, the positions of the display module corresponding to the third electrode layer are lightened. In an embodiment, as shown in FIG. 11A, the positions corresponding to part of the third electrode layer 243 are lightened. For example, the side face $252A_R$ provided with the third electrode layer 243 and the side face $252C_L$ opposite to the next polyhedral structure are lightened, and the rest positions are not lightened to form lens-like equivalent dioptric structures inside the first mediums covered by the side face $252A_R$ and the side face $252C_L$, so as to emit the light in a scattered form.

In another embodiment, as shown in FIG. 11B, the positions corresponding to the side faces $252A_R$, $252A_B$, $252B_T$ and $252C_L$ provided with the third electrode layer 243 are all lightened, and the positions corresponding to the four side faces without the third electrode layer 243 are not lightened, so as to emit the light in the scattered form. Compared with the previous embodiment, the present embodiment has the advantage that the positions corresponding to the side faces $252A_B$ and $252B_T$ are additionally lightened to increase the brightness of the scattered light in the third light emitting direction and the fourth light emitting direction.

Figure 12A:
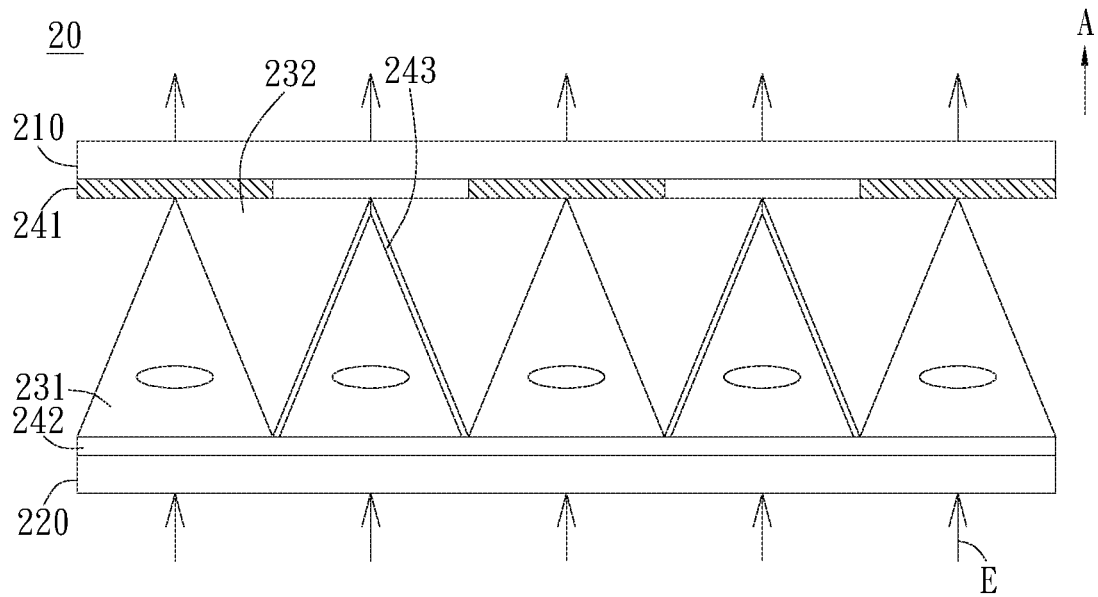
FIG. 12A is a schematic diagram of an embodiment of a second enabled state.

FIG. 12A is a schematic diagram of an embodiment of a second enabled state. FIG. 12A illustrates a collimated form serving as the second enabled state. The collimated form refers to an operation mode for maintaining the direction of the collimated light. As shown in FIG. 12A, the first electrode layer 241 is disposed on the first substrate 210 and the second electrode layer 242 is disposed on the second substrate 220. The third electrode layer 243 is disposed on part of the surfaces of the polyhedral structures. When the adjustment panel 20 is in the second enabled state, no voltage difference exists between the first substrate 210 and the second substrate 220. For example, the first electrode layer 241, the second electrode layer 242, and the third electrode layer 243 are all adjusted to be OFF. The collimated light penetrates through the adjustment panel 20 along the propagation direction A.

Figure 12B:
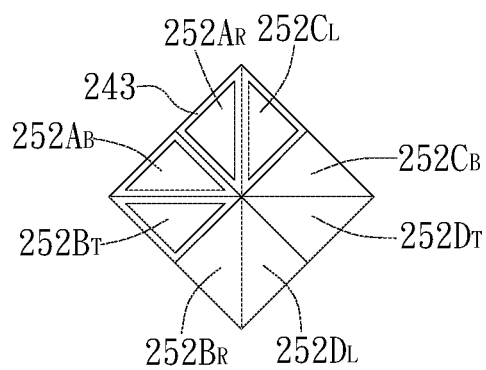
FIG. 12B is a schematic diagram of an embodiment that a light emitting group generates a light emitting mode as shown in FIG. 12A.

FIG. 12B is a schematic diagram of an embodiment that a light emitting group generates a light emitting mode as shown in FIG. 12A. Referring to FIG. 12B, when the adjustment panel is in the second enabled state illustrated in FIG. 12A, each side face corresponding to each light emitting group is lightened or set to be bright or fully white, so as to emit the light along the propagation direction.

It can be known from all the above-mentioned embodiments that the display device may switch different forms (such as unidirectional deflection, multidirectional deflection, scattering and collimation) of the emitted light by virtue of the voltage difference (with or without the voltage difference) of the electrode layers in the adjustment panel in cooperation with the pixels not lightened at specific positions, so as to provide different changing modes for the light intensity direction.

Figure 13A:
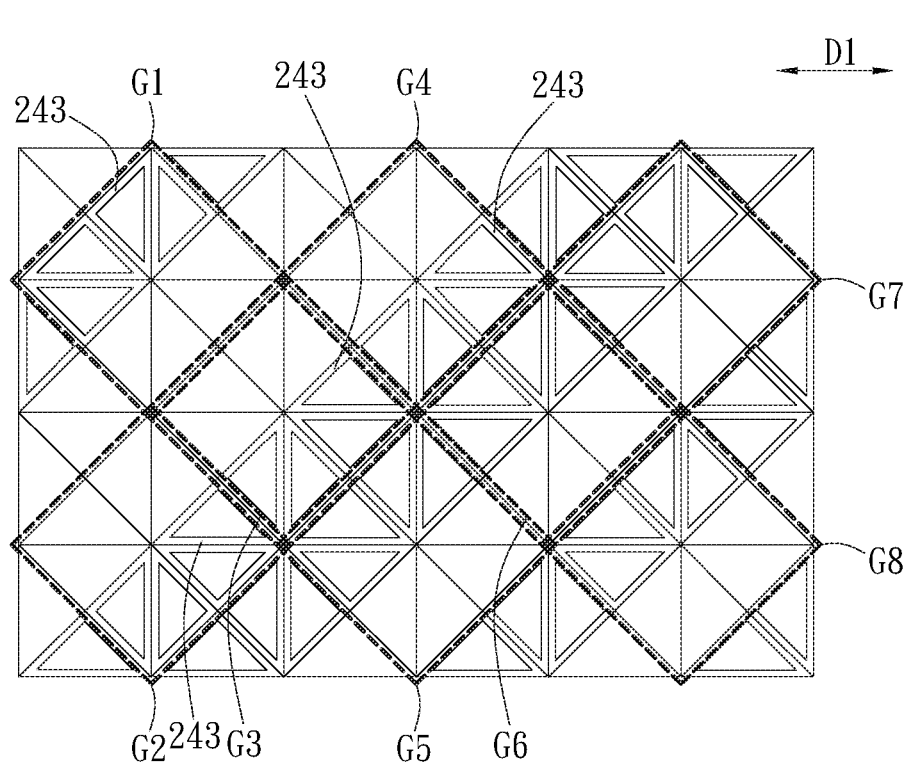
FIG. 13A is a top view of another embodiment of a second medium.

FIG. 13A is a top view of another embodiment of a second medium 232. The present embodiment illustrates a different arrangement of electrodes on the surfaces of the polyhedral structures 250. As shown in FIG. 13A, the polyhedral structures 250 are pyramids. The polyhedral structures 250 are adjacent to one another and are distributed along a first arrangement direction D1 and a second arrangement direction D2. Part of the surfaces of the polyhedral structures 250 are provided with the third electrode layer 243. Similarly, the third electrode layer 243 located on different polyhedral structures 250 are approximately arranged along the same inclination direction and are obliquely disposed. A difference from the above-mentioned embodiment is that the positions to be provided with the third electrode layer 243 in each of the light emitting groups may be different according to a requirement of displaying different brightness effects.

Figure 13B:
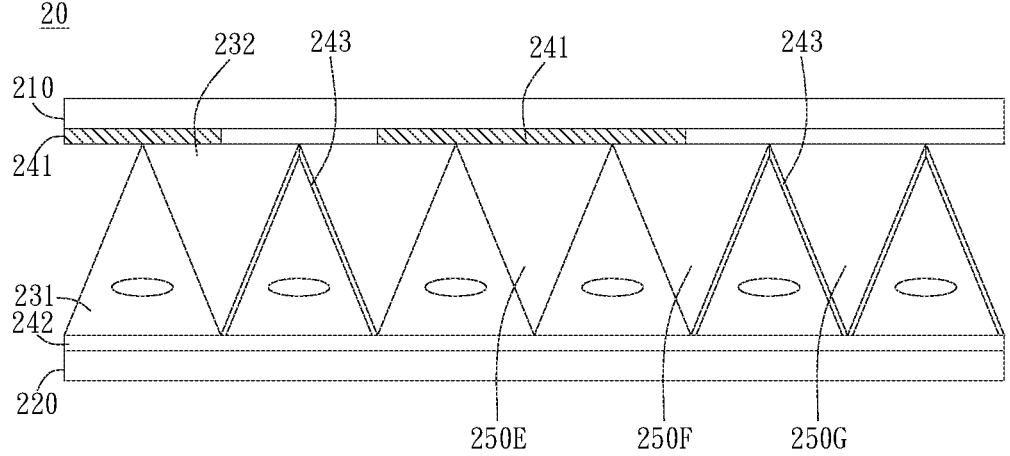
FIG. 13B is a schematic diagram of an electrode arrangement mode corresponding to FIG. 13A.

For example, in FIG. 13A, the third electrode layer 243 of the light emitting group G3 is disposed on the four side faces opposite to the third electrode layer 243 of the light emitting group G1 and are arranged along the same inclination direction. To conform to the position change of the third electrode layer 243 of the light emitting group G3, the third electrode layer 243 of the light emitting groups G2 and G4 may be disposed on the corresponding side faces (namely the four side faces opposite to the third electrode layer 243 of the light emitting group G1), so that the third electrode layer 243 on different polyhedral structures are obliquely disposed on the oblique straight lines on the same side. The sides without the third electrode layer 243 in the light emitting groups G2 to G4 may be provided with the first electrode layer, so that the third electrode layer may be staggered from the first electrode layer. Referring to the schematic diagram of FIG. 13B, compared with FIG. 12A, the structure in FIG. 13B has the advantage that to conform to the position change of the third electrode layer 243 of the polyhedral structures 250E, 250F and 250G, the positions of the first electrode layer 241 are correspondingly changed, so that the third electrode layer 243 and the first electrode layer 241 area alternatively disposed.

In other embodiments, selectively, only the positions of the third electrode layer 243 of the light emitting group G3 are changed, but the positions of the third electrode layer 243 of the light emitting groups G2 and G4 are not changed (namely the positions are the same as the positions of the third electrode layer 243 of the light emitting group G1), and the staggering positions of the first electrode layer are adjusted therewith.

Figure 14:
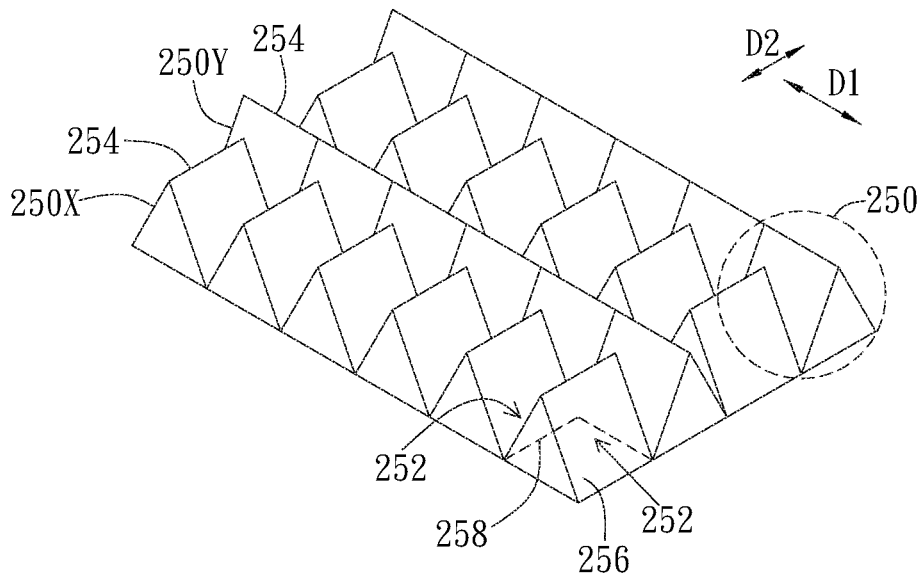
FIG. 14 is a three-dimensional diagram of another embodiment of a polyhedral structure.

FIG. 14 is a three-dimensional diagram of another embodiment of the polyhedral structure 250. In the embodiment of FIG. 14, the polyhedral structures 250 are triangular prisms. As shown in FIG. 14, the polyhedral structures 250 are adjacent to one another and are arranged along a first arrangement direction D1 parallel to the side edge of the adjustment panel and a second arrangement direction D2 perpendicular to the first arrangement direction D1. Specifically, each of the triangular prisms has a ridge 254, a bottom surface 256 opposite to the ridge 254, and two side faces 252 connected to the bottom surface 256. The bottom surfaces 256 are close to the first substrate. The bottom edge 258 on the bottom surface 256 of each of the triangular prisms is connected to the bottom edge 258 of the triangular prisms. Each of the triangular prisms is disposed on the first substrate along a direction perpendicular to the first arrangement direction D1 or parallel to the first arrangement direction D1. For example, the ridge 254 of the polyhedral structure 250X is along the direction perpendicular to the first arrangement direction D1, and the ridge 254 of the polyhedral structure 250Y is along the direction parallel to first arrangement direction D1. The above-mentioned first mediums are arranged in the spaces among the triangular prisms.

Figure 15:
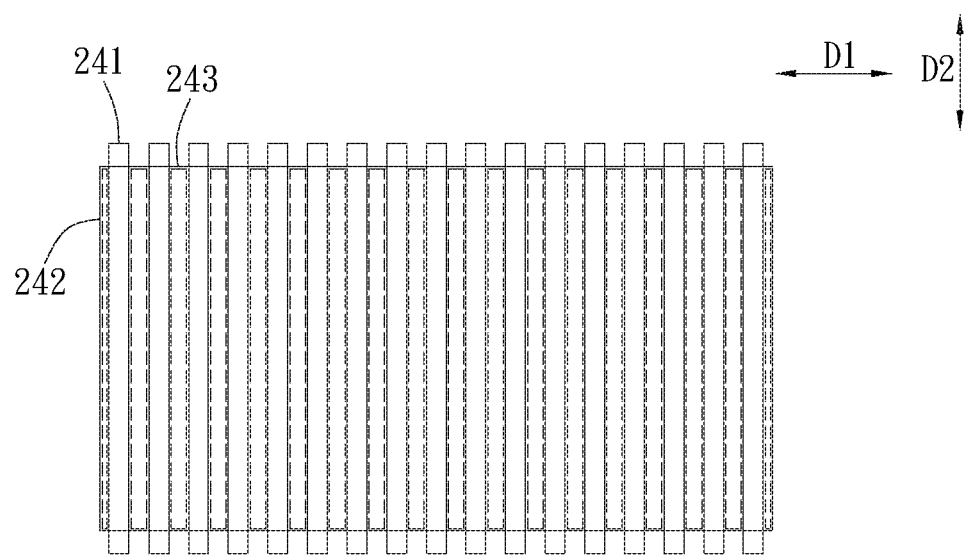
FIG. 15 is a schematic diagram of distribution of a first electrode layer and a second electrode layer according to another embodiment.

FIG. 15 is a schematic diagram of distribution of a first electrode layer 241 and a second electrode layer 242 according to another embodiment. It can be observed from the planar graph of FIG. 15 that the first electrode layer 241 has a plurality of strip-shaped electrodes, and the second electrode layer 242 is a planar electrode. Dotted frames drawn between the strip-shaped electrodes of the first electrode layer 241 refer to distribution ranges of the third electrode layer 243. The strip-shaped electrodes of the first electrode layer 241 are all longitudinally arranged (parallel to the second arrangement direction D2) in parallel in a spacing manner.

Figure 16A:
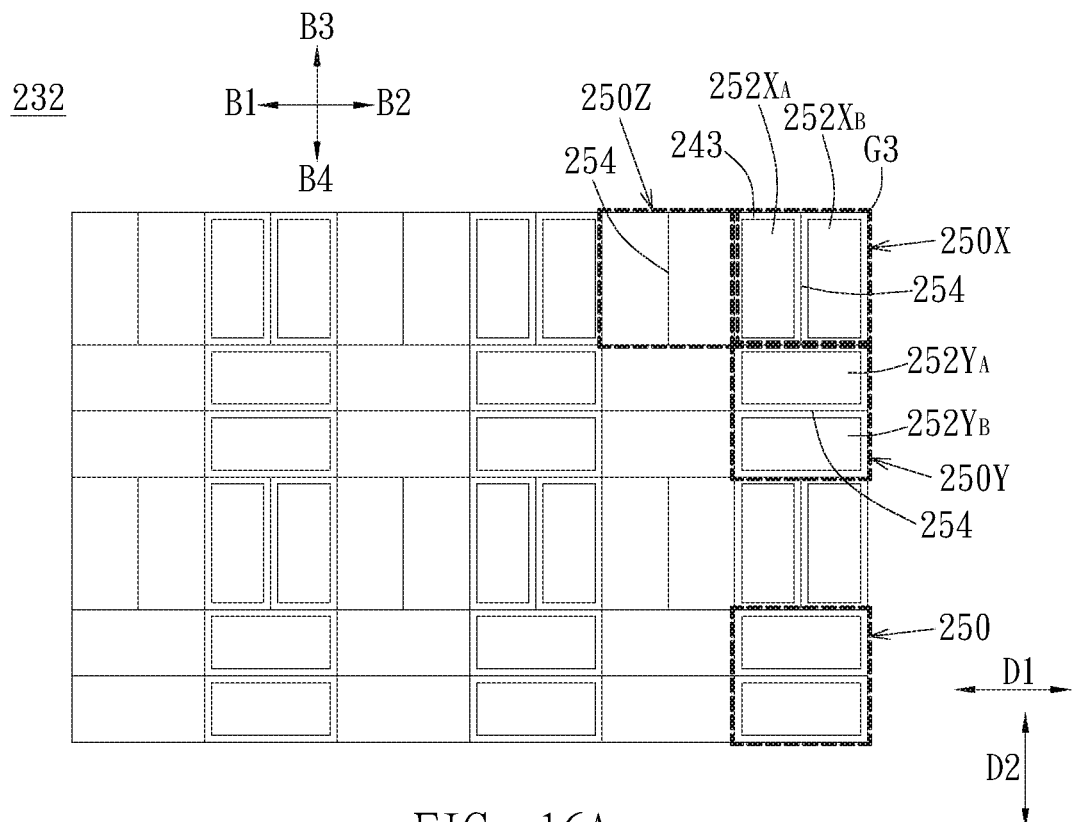
FIGS. 16A and 16B are top views of an embodiment of a second medium.
Figure 16B:
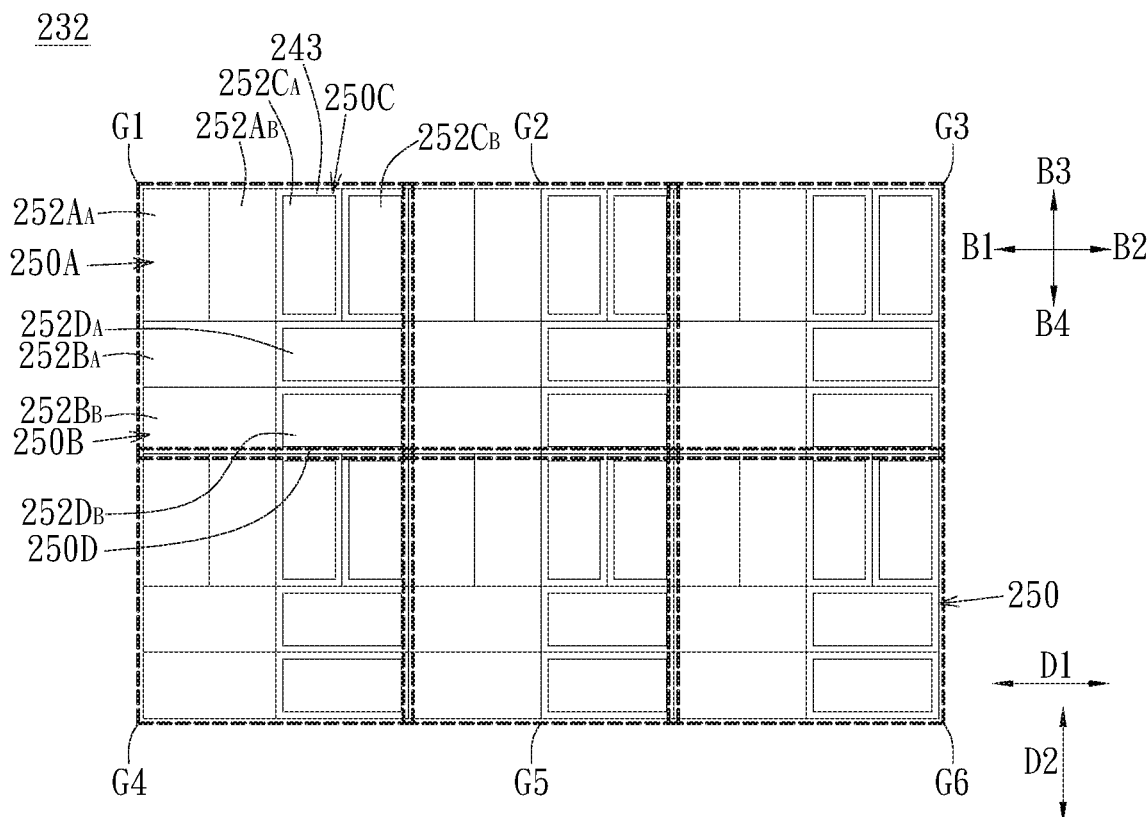

FIGS. 16A and 16B are top views of an embodiment of a second medium 232. In FIG. 16A, the polyhedral structures 250 are triangular prisms. As shown in FIG. 16A, the polyhedral structures 250 are adjacent to one another and are arranged along the first arrangement direction D1 and the second arrangement direction D2. The surfaces of part of the polyhedral structures 250 are provided with the third electrode layer 243. The third electrode layer 243 is composed of multiple third electrodes. In terms of taking the triangular prisms as the polyhedral structure 250, the third electrode layer 243 is disposed on two side faces of one triangular prism. If the next adjacent triangular prism has a different arrangement direction for the ridge 254, the third electrode layer 243 is disposed on the two side faces of the triangular prism. On the contrary, if the next adjacent triangular prism has the same arrangement direction for the ridge 254, no third electrode layer 243 is disposed on the two side faces of the triangular prism.

For example, for the polyhedral structure 250X, the third electrode layer 243 is disposed on the side faces $252X_A$ and $252X_B$. For the polyhedral structure 250Y, the arrangement direction of the ridge 254 is different from the arrangement direction of the ridge 254 of the polyhedral structure 250X, so the third electrode layer 243 is also disposed on the side faces $252Y_A$ and $252Y_B$ of the polyhedral structure 250Y. For the polyhedral structure 250Z, the arrangement direction of the ridge 254 is the same as the arrangement direction of the ridge 254 of the polyhedral structure 250X, so no third electrode layer is disposed on the two side faces of the polyhedral structure 250Z.

On the whole, the third electrode layer 243 located on different polyhedral structures 250 are approximately arranged in parallel along the same direction (such as a direction parallel to the second arrangement direction D2) and disposed in a spacing manner. Further, referring to FIG. 16A and FIG. 15, the multiple third electrodes are arranged along straight lines. An extending direction of each of the straight lines is parallel to the second arrangement direction D2. A distance exists between the third electrodes on different straight lines and is approximately equal to the width of the bottom edge of each of the triangular prisms. The spaced strip-shaped electrodes formed in the first electrode layer 241 may be staggered from the third electrode, namely are staggered in a spacing manner within a projection range of a plane where the first substrate is located.

As shown in FIG. 16B, in terms of the planar graph, the predetermined light emitting direction may include a first light emitting direction B1, a second light emitting direction B2, a third light emitting direction B3, and a fourth light emitting direction B4. For the polyhedral structure 250 of each of the triangular prisms, two side faces may respectively guide the light to two of the four different light emitting directions, and the other two light emitting directions may be guided by another triangular prism having a different arrangement direction of the ridge 254. For example, the light that passes through the side face $252A_B$ is deflected toward the first light emitting direction B1; the light that passes through the side face $252A_A$ is deflected toward the second light emitting direction B2; the light that passes through the side face $252B_B$ is deflected toward the third light emitting direction B3, and the light that passes through the side face $252B_A$ is deflected toward the fourth light emitting direction B4.

In order to allow the light to be emitted toward different predetermined light emitting directions and consider the arrangement positions of all the electrode layers, each of the second mediums is a light emitting group composed of four adjacent polyhedral structures 250 disposed along the first arrangement direction D1 and the second arrangement direction D2. Specifically, the plurality of polyhedral structures 250 constituting the light emitting group forms a 2×2 array, and eight side faces of the four polyhedral structures 250 jointly constitute the light emitting group. For example, the light emitting group G1 includes the side face $252A_A$ and the side face $252A_B$ of the polyhedral structure 250A, the side face $252B_A$ and the side face $252B_B$ of the polyhedral structure 250B, the side face $252C_A$ and the side face $252C_B$ of the polyhedral structure 250C, as well as the side face $252D_A$ and the side face $252D_B$ of the polyhedral structure 250D.

In the first arrangement direction D1 or the second arrangement direction D2, the ridges 254 of two adjacent triangular prisms in the light emitting group are perpendicular to each other. For example, in the embodiment of FIG. 16B, the ridges 254 of two adjacent triangular prisms in the light emitting group in the second arrangement direction D2 are perpendicular to each other. For example, the ridge 254 of the polyhedral structure 250A is perpendicular to the ridge 254 of the polyhedral structure 250B.

As shown in FIG. 16B, each of the light emitting groups includes different side faces of the polyhedral structures 250. Different arrangement directions of the ridges may allow the side faces of the polyhedral structures 250 to emit the light toward different predetermined light emitting directions.

Part of the side faces are does not have the third electrode layers 243, and the rest of the side faces are provided with the third electrode layer 243.

Figure 16C:
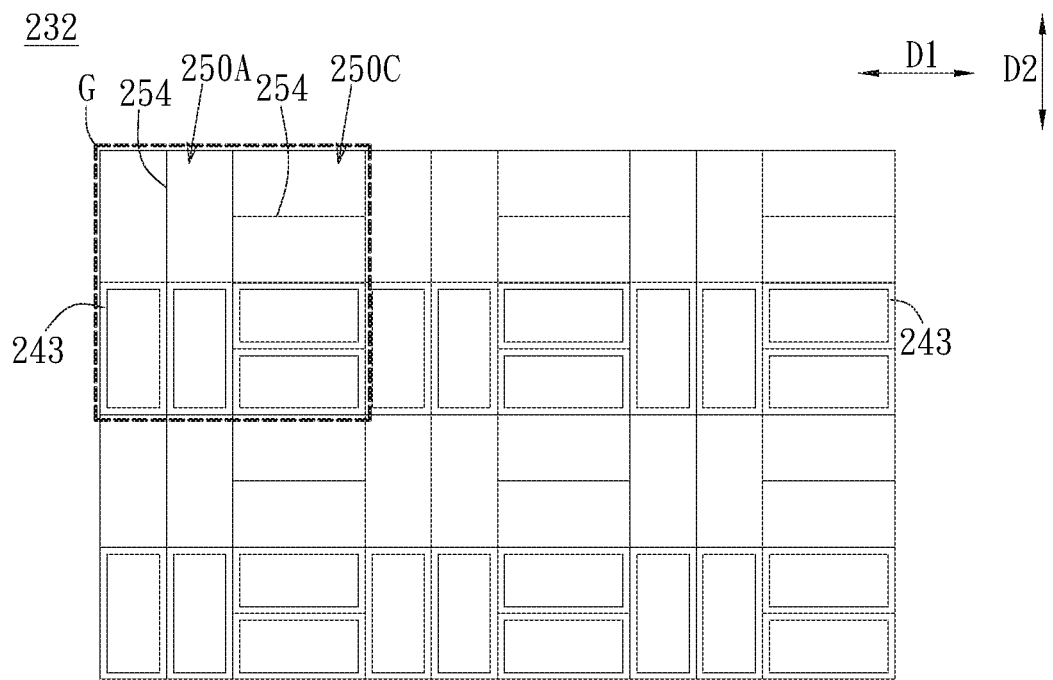
FIGS. 16C and 16D are top views of different embodiments of a second medium.
Figure 16D:
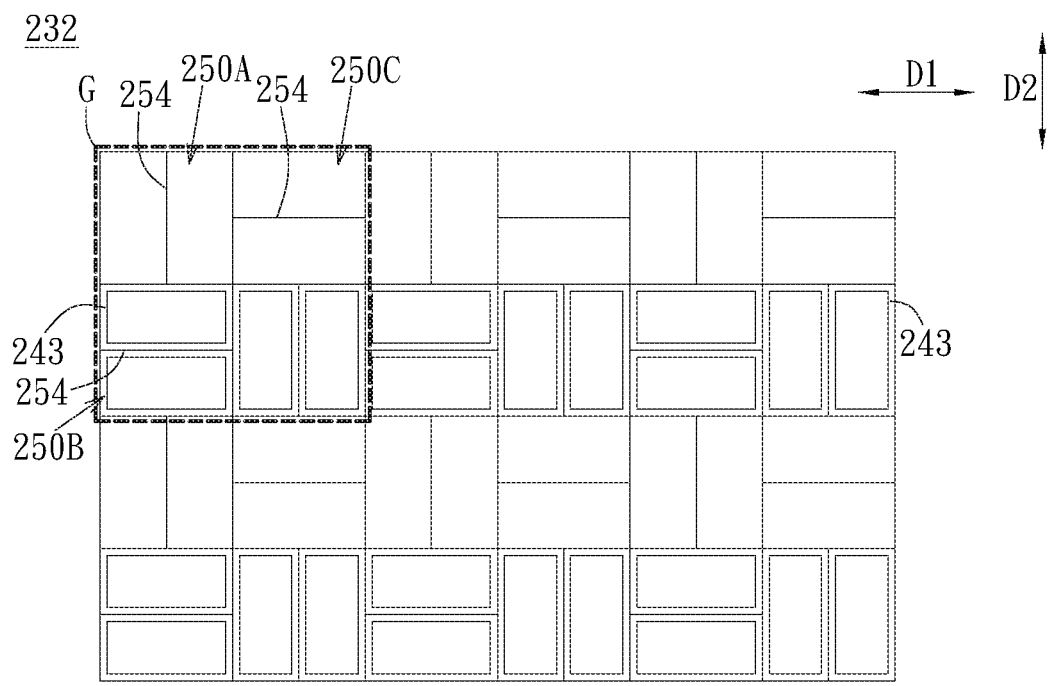

FIGS. 16C and 16D are top views of different embodiments of the second medium 232. In FIG. 16C, the third electrode layer 243 located on different polyhedral structures 250 are arranged in parallel in a spacing manner along a direction parallel to the first arrangement direction D1. In the embodiment of FIG. 16C, the ridges 254 of two adjacent triangular prisms in the light emitting group in the first arrangement direction D1 are perpendicular to each other. For example, in the light emitting group G, the ridge 254 of the polyhedral structure 250A is perpendicular to the ridge 254 of the polyhedral structure 250C.

In FIG. 16D, the third electrode layer 243 located on different polyhedral structures 250 are arranged in parallel in a spacing manner along a direction parallel to the first arrangement direction D1. In the embodiment of FIG. 16D, the ridges of two adjacent triangular prisms in the light emitting group in the first arrangement direction D1 and the second arrangement direction D2 are perpendicular to each other. For example, in the light emitting group G, the ridge 254 of the polyhedral structure 250A is perpendicular to the ridge 254 of the polyhedral structure 250C. In addition, the ridge 254 of the polyhedral structure 250A is also perpendicular to the ridge 254 of the polyhedral structure 250B.

FIGS. 17A, 17B, 17C, and 17D are schematic diagrams of different embodiments that a light emitting group generates a light emitting mode similar to FIG. 5. Referring to FIGS. 17A to 17D, when the adjustment panel takes a unidirectional deflected form as the first enabled state, the pixels of the display module at positions corresponding to the third electrode layer and positions corresponding to part of the first electrode layer are not lightened or are set to be dark or fully black. As shown in FIG. 17A, the positions corresponding to the side faces $252C_A$, $252C_B$, $252D_A$ and $252D_B$ provided with the third electrode layer 243 are not lightened, and the positions corresponding to the side faces $252A_B$, $252B_A$ and $252B_B$ are not lightened, either. The position corresponding to the side face $252A_A$ is lightened or is set to be bright or fully white, so as to deflect the light toward the second light emitting direction B2.

Similarly, in FIG. 17B, the positions corresponding to the side faces provided with the third electrode layer 243 are not lightened, the positions corresponding to the side faces $252A_A$, $252B_A$ and $252B_B$ are not lightened, and the position corresponding to the side face $252A_B$ is lightened, so as to deflect the light toward the first light emitting direction B1.

In FIG. 17C, the positions corresponding to the side faces provided with the third electrode layer 243 are not lightened, the positions corresponding to the side faces $252A_A$, $252A_B$ and $252B_A$ are not lightened, and the position corresponding to the side face $252B_B$ is lightened, so as to deflect the light toward the third light emitting direction B3.

In FIG. 17D, the positions corresponding to the side faces provided with the third electrode layer 243 are not lightened, the positions corresponding to the side faces $252A_A$, $252A_B$ and $252B_B$ are not lightened, and the position corresponding to the side face $252B_A$ is lightened, so as to deflect the light toward the fourth light emitting direction B4.

Different forms of forming the unidirectional deflected light may be known from the descriptions in FIGS. 17A to 17D. When the adjustment panel performs in the unidirectional deflected form, in an embodiment, one of the forms in FIGS. 17A to 17D may be selected to allow each of the light emitting groups to guide the light generated by the display module to the same predetermined light emitting direction, so as to emit the light toward the single direction in the deflected manner.

In another embodiment, different light emitting groups may select different forms in FIGS. 17A to 17D. For example, the light emitting groups G1 to G4 in FIG. 16B adopt the form in FIG. 17A and deflect the light toward the second light emitting direction B2. The light emitting groups G5 to G6 adopt the form in FIG. 17D and deflect the light toward the fourth light emitting direction B4. Therefore, the directions of the unidirectional deflected light provided by different light emitting groups are different. The display device adjusts the light to be in different light intensity directions at different positions of a frame, so as to provide different visual perceptions.

FIGS. 18A and 18B are schematic diagrams of different embodiments that a light emitting group generates a light emitting mode similar to FIG. 8. Referring to FIGS. 18A and 18B, when the adjustment panel takes the multidirectional deflected form as the first enabled state, the pixels of the display module at positions corresponding to the third electrode layer 243 are not lightened or are set to be dark or fully black. As shown in FIG. 18A, the positions corresponding to the side face provided with the third electrode layer 243 are not lightened, and the positions corresponding to the side faces $252B_A$ and $252B_B$ are not lightened, but the positions corresponding to the side faces $252A_A$ and $252B_B$ are lightened, so as to deflect the light toward the first light emitting direction B1 and the second light emitting direction B2.

It should be understood that in other embodiments, the positions corresponding to any three of the four side faces without the third electrode layer 243 in the light emitting group may be selectively lightened to allow each of the light emitting groups to guide the light generated by the display module to three predetermined light emitting directions, so as to emit the light toward multiple directions in the deflected manner. Further, if the positions corresponding to the four side faces without the third electrode layer in the light emitting group are all lightened to allow each of the light emitting groups to guide the light generated by the display module to four predetermined light emitting directions, the light also may be emitted toward multiple directions in the deflected manner. As shown in FIG. 18B, the positions corresponding to the side faces provided with the third electrode layer 243 are not lightened, and the positions corresponding to the side faces $252A_A$, $252A_B$, $252B_A$ and $252B_B$ are all lightened, so as to deflect the light toward four predetermined light emitting directions (B1, B2, B3 and B4).

FIGS. 19A and 19B are schematic diagrams of embodiments that a light emitting group generates a light emitting mode similar to FIG. 10A. Referring to FIG. 19A, when the adjustment panel takes a scattered form as the first enabled state, the positions of the display module corresponding to the third electrode layer are lightened. In an embodiment, as shown in FIG. 19A, the positions corresponding to part of the third electrode layer 243 are lightened. For example, the positions corresponding to the side faces $252C_A$ and $252C_B$ provided with the third electrode layer 243 are lightened, and the rest positions are not lightened to form lens-like equivalent dioptric structures inside the first mediums covered by the side face $252C_A$ and the side face $252C_B$, so as to emit the light in a scattered form.

In another embodiment, as shown in FIG. 19B, the positions corresponding to the side faces $252C_A$, $252C_B$, $252D_A$ and $252D_B$ provided with the third electrode layer 243 are all lightened, and the positions corresponding to the four side faces without the third electrode layer 243 are not lightened, so as to emit the light in the scattered form. Compared with the previous embodiment, the positions corresponding to the side faces $252D_A$ and $252D_B$ are additionally lightened to increase the brightness of the scattered light in the third light emitting direction and the fourth light emitting direction.

Figure 20A:
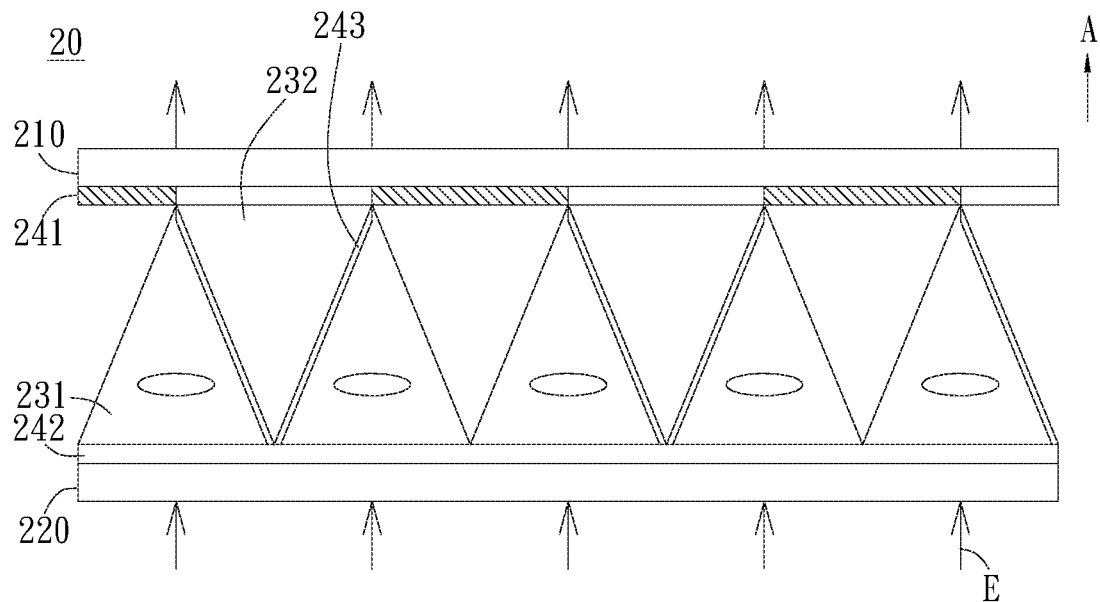
FIG. 20A is a schematic diagram of another embodiment of a second enabled state.

FIG. 20A is a schematic diagram of another embodiment of the second enabled state. FIG. 20A illustrates a collimated form serving as the second enabled state. As shown in FIG. 20A, the first electrode layer 241 is disposed on the first substrate 210; the second electrode layer 242 is disposed on the second substrate 220, and the third electrode layer 243 is disposed on the surfaces of part of the polyhedral structures. When the adjustment panel 20 is in the second enabled state, no voltage difference exists between the first substrate 210 and the second substrate 220. For example, the first electrode layer 241, the second electrode layer 242 and the third electrode layer 243 are all adjusted to be OFF. The collimated light penetrates through the adjustment panel 20 along the propagation direction A.

Figure 20B:
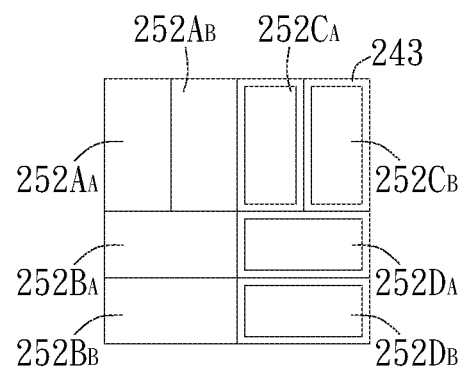
FIG. 20B is a schematic diagram of an embodiment that a light emitting group generates a light emitting mode as shown in FIG. 20A.

FIG. 20B is a schematic diagram of an embodiment that a light emitting group generates a light emitting mode as shown in FIG. 20A. Referring to FIG. 20B, when the adjustment panel is in the second enabled state illustrated in FIG. 20A, each side face corresponding to each light emitting group is lightened, so as to emit the light toward the propagation direction.

Figure 21:
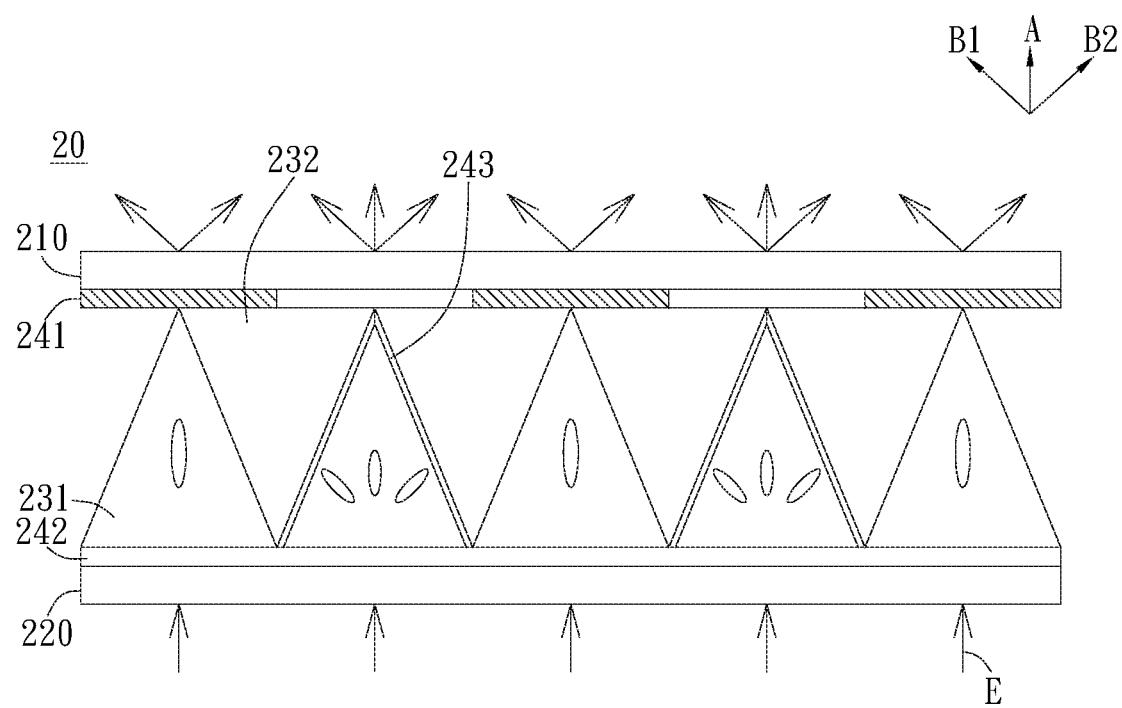
FIG. 21 is a schematic diagram that an adjustment panel generates light in different forms.

In the above-mentioned embodiment, the display device may allow the emitted light to have specific forms by virtue of the voltage difference formed by the electrode layers in the adjustment panel in cooperation with specific non-lightened positions. In other embodiments, the non-lightening operation also may not be used. Referring to FIG. 21, which is a schematic diagram of generating light in different forms by an adjustment panel. As shown in FIG. 21, each position of the display module corresponding to the adjustment panel is lightened. At the moment, each sub pixel correspondingly has different emitting forms. For example, the collimated light passes through the positions corresponding to the first electrode layer 241 to be emitted in a multidirectional deflected form and passes through the positions corresponding to the third electrode layer 243 to be emitted in a scattered form. Therefore, each sub pixel may have emitted light in different forms.

Figure 22:
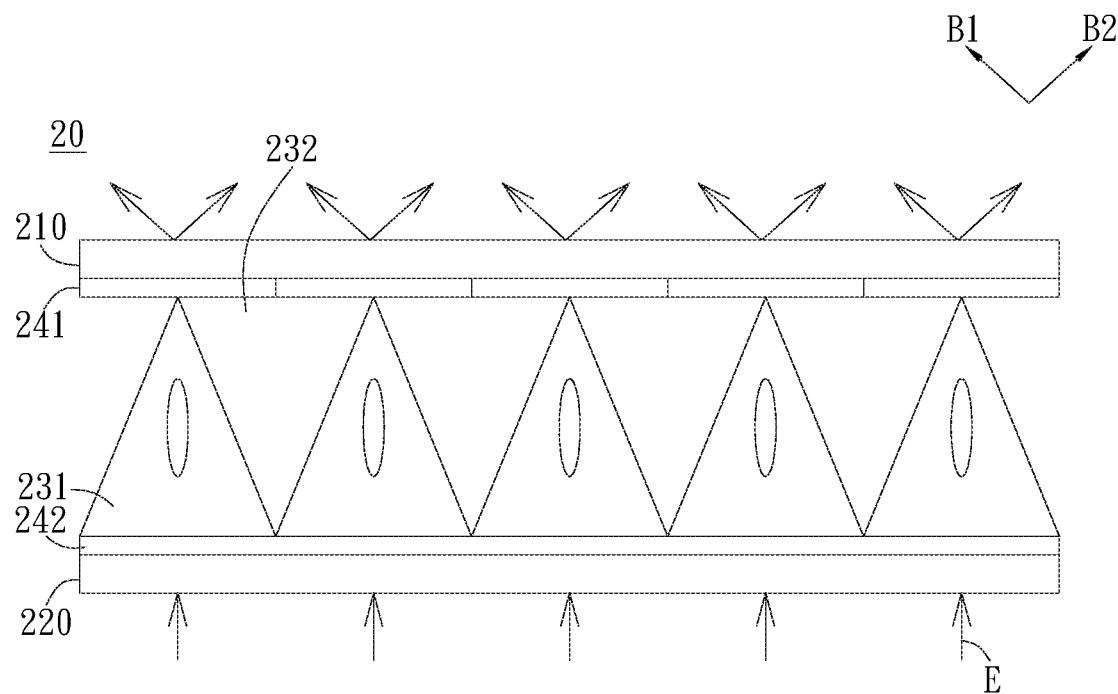
FIGS. 22 and 23 are schematic diagrams of different embodiments of a display device, of which an adjustment panel includes mediums having polyhedral structures.

FIG. 22 is a schematic diagram of another embodiment of a display device, of which an adjustment panel 20 includes mediums having polyhedral structures. As shown in FIG. 22, according to a display requirement, no third electrode layer (243, referring to FIG. 21) are disposed on the surfaces of the polyhedral structures. The first electrode layer 241 are disposed on the first substrate 210, and the second electrode layer 242 is disposed on the second substrate 220 and faces the first electrode layer 241. For example, the first electrode layer 241 includes strip-shaped electrodes, and the second electrode layer 242 is a planar electrode. The first electrode layer 241 covers first mediums 231 and second mediums 232 respectively. The first electrode layer 241 may be appropriately insulated so as to avoid signal interference.

Therefore, the collimated light that passes through the positions corresponding to the first electrode layer 241 may be emitted in a multidirectional deflected form. In the cooperation with the display module below (not shown) not lightened at specific positions, the collimated light that passes through the positions corresponding to the first electrode layer 241 may be emitted in a unidirectional deflected form. In addition, when the first electrode layer 241 and the second electrode layer 242 are operated to make no voltage difference between the first substrate 210 and the second substrate 220, the collimated light is emitted in a collimated form through the adjustment panel 20. Therefore, the adjustment panel 20 may take the unidirectional deflected form or the multidirectional deflected form as the first enabled state and take the collimated form as the second enabled state.

It should be added that when part of the electrode layers is canceled, the range of light emitting group may be correspondingly adjusted. In the embodiment of FIG. 22, no third electrode layer is disposed on the surfaces of the polyhedral structures. When the predetermined light emitting direction includes a first light emitting direction, a second light emitting direction, a third light emitting direction and a fourth light emitting direction, and pyramids are used as the polyhedral structures. The four side faces of the single pyramid may respectively guide the light to the four different light emitting directions. At the same time, the four side faces of the single polyhedral structure may be used as the light emitting group.

In another embodiment, triangular prisms are used as the polyhedral structures. Two side faces of the single triangular prism may respectively guide the light to two of the four different light emitting directions, and the other two light emitting directions may be guided by another triangular prism having a different arrangement direction of the ridge. At the same time, the four side faces of the two polyhedral structures having different arrangement directions of the ridges may be used as the light emitting group.

Figure 23:
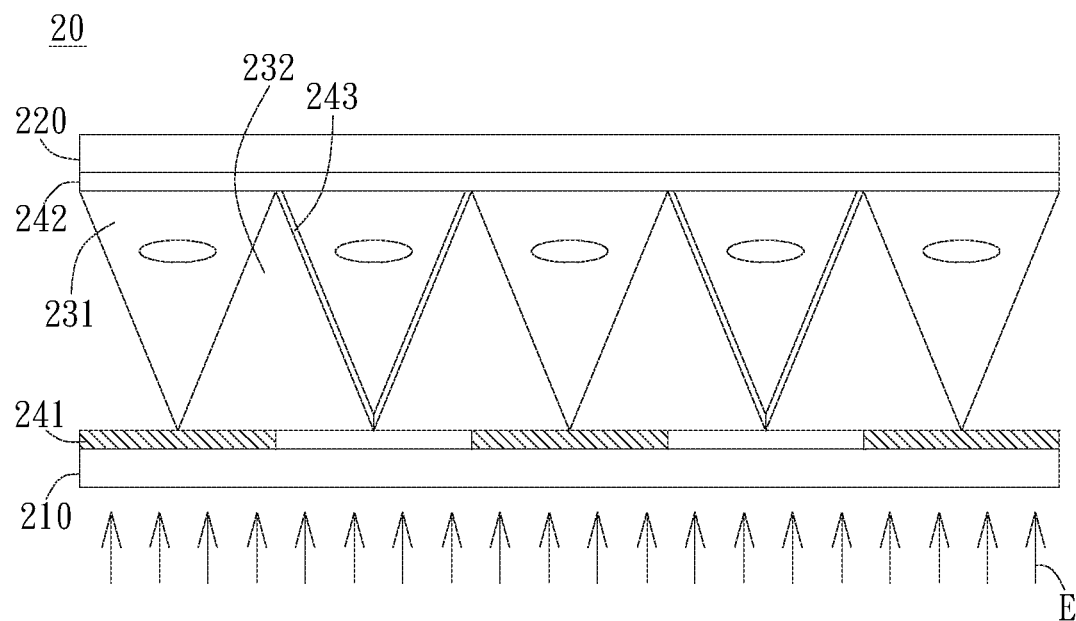

FIG. 23 is a schematic diagram of another embodiment of a display device, of which an adjustment panel 20 includes mediums having polyhedral structures. As shown in FIG. 23, the first substrate 210 receives collimated light E from the display module. That is, the first substrate 210 is located on the light incoming side of the adjustment panel 20, and the second substrate 220 is located on the light emitting side of the adjustment panel 20. A medium layer 230 is disposed between the first substrate 210 and the second substrate 220. The first electrode layer 241 is disposed on the first substrate 210, and the second electrode layer 242 is disposed on the second substrate 220 and faces the first electrode layers 241. The medium layer 230 includes first mediums 231 and second mediums 232. In the present embodiment, the medium layer 230 is filled with the first mediums 231 and the second mediums 232. The second mediums 232 and the first mediums 231 are staggered from each other. The second mediums 232 include a plurality of polyhedral structures. The bottom surfaces of the polyhedral structures are disposed close to the first substrate 210. The third electrode layer 243 is disposed on the surfaces of part of the polyhedral structures.

Figure 24:
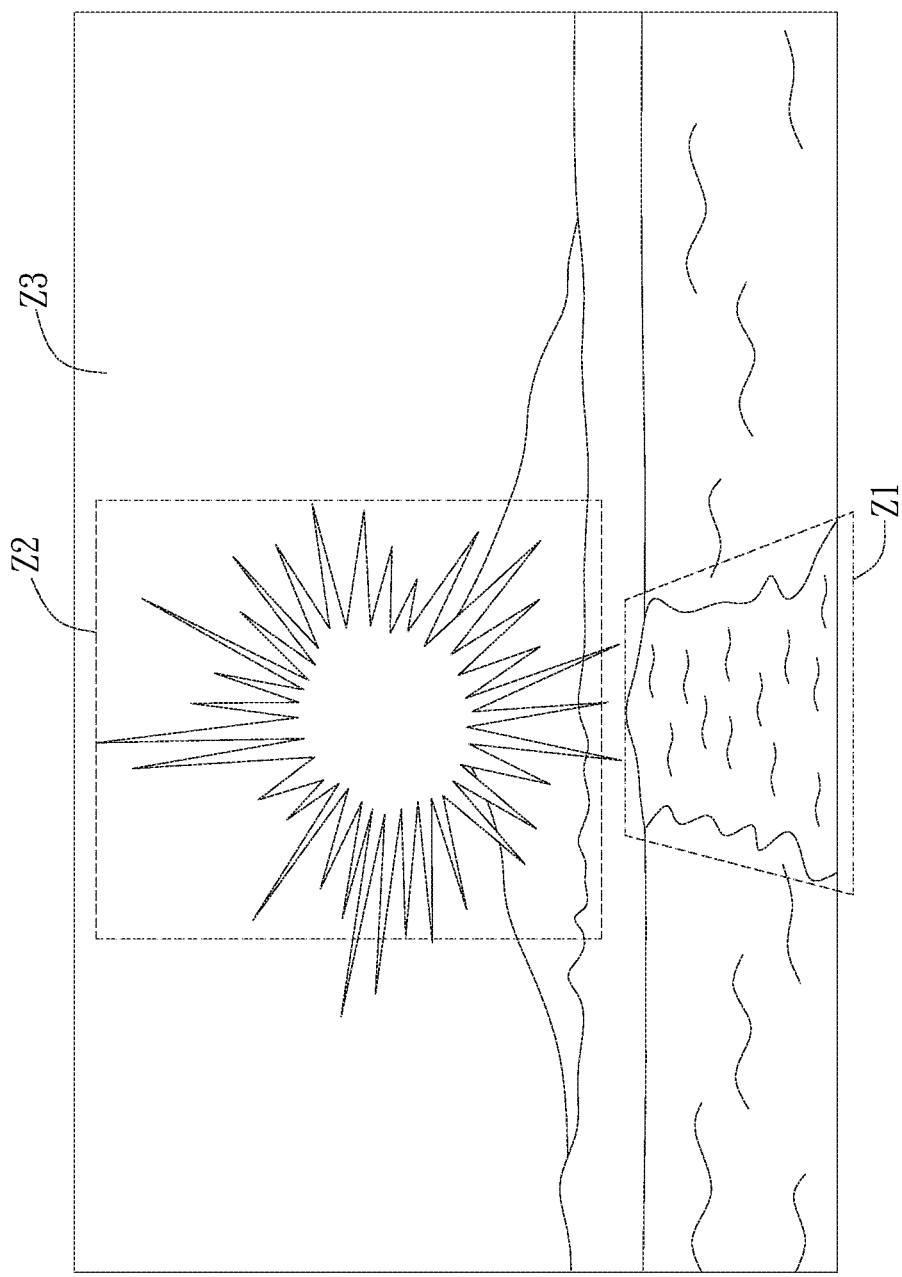
FIG. 24 is a schematic diagram of a display frame.

FIG. 24 is a schematic diagram of a display frame. As shown in FIG. 24, the display frame displays a sun and a water surface in scenery. The sunlight generates reflected light on the water surface. The display frame as shown in FIG. 24 may be applied to the technology of the present invention. For example, the reflected light is located in a first zone Z1, and the sun is located in a second zone Z2. The rest of the display frame are in a third zone Z3. The unidirectional deflected form is performed in the first zone Z1, so the light intensity of light emitted from the first zone Z1 is in a specific direction. The scattered form is performed in the second zone Z2, so light emitted from the second zone Z2 has a relatively uniform light intensity distribution in all directions to allow observers at different positions to have a relatively consistent feeling for the brightness of the second zone Z2 in the frame. The collimated form is performed in the third zone Z3, so light emitted from the third zone Z3 maintains the light emitting direction of the display module. A voltage signal provided for the electrode layers may set voltage differences required by the various zones according to a time sequence to allow the light emitted from the various zones to be in different forms, so as to provide a more vivid display frame to improve the display quality.

Figure 25A:
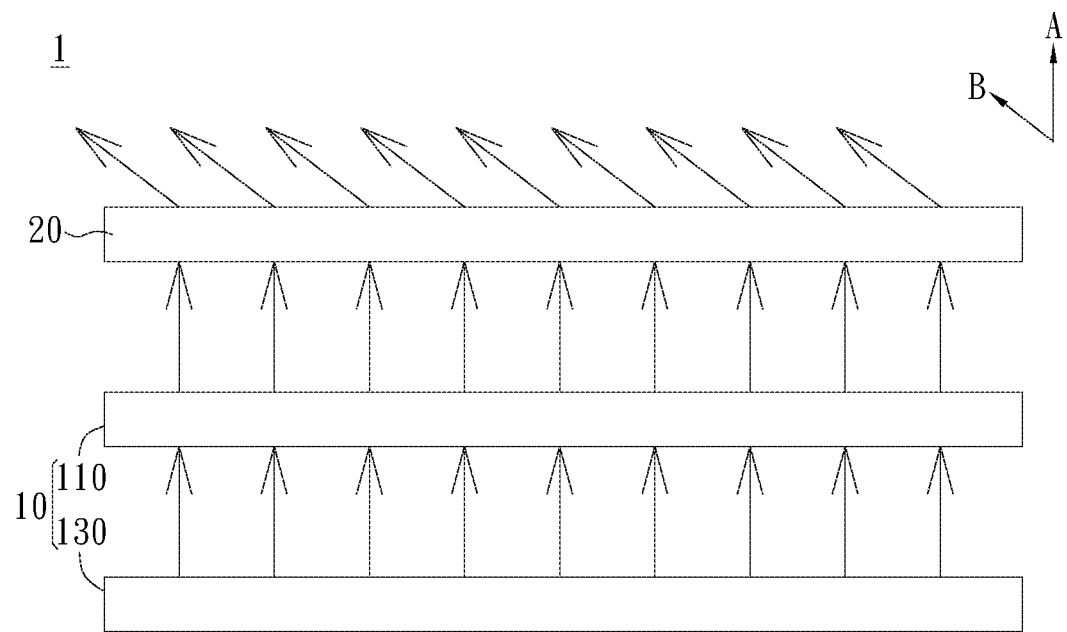
FIG. 25A is a schematic diagram of another embodiment of a display device.

FIG. 25A is a schematic diagram of another embodiment of a display device 1. As shown in FIG. 25A, the display device 1 includes a display module 10 and an adjustment panel 20 disposed on the display module 10. The display module 10 includes a backlight source 130 and a display panel 110. The display panel 110 is located between the backlight source 130 and the adjustment panel 20. The backlight source 130 emits collimated light that passes through the display panel 110 and then arrives at the adjustment panel 20 toward a propagation direction A. When the adjustment panel 20 is in a first enabled state, an equivalent dioptric structure is formed inside the adjustment panel 20, so the light that passes through the equivalent dioptric structure is emitted along a predetermined light emitting direction B deflected from the propagation direction A.

Figure 25B:
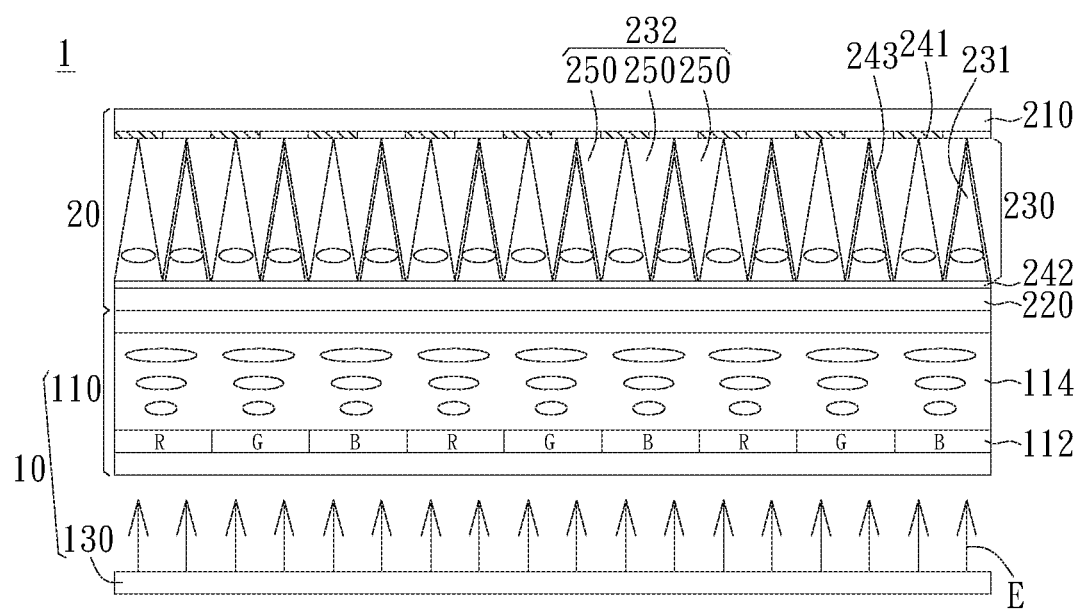
FIG. 25B is a schematic diagram of an embodiment of a display device having a backlight source.

FIG. 25B is a schematic diagram of an embodiment of a display device 1 having a backlight source 130. As shown in FIG. 25B, an adjustment panel 20 is disposed on a display module 10. In the embodiments of FIGS. 25A and 25B, the display module 10 is a non-self-luminous display module, and includes a display panel 110 and the backlight source 130. The display panel 110 has a liquid crystal layer 114 and a plurality of sub pixels 112. In an embodiment, marking letters R, G and B in the sub pixels 112 refer to regions capable of producing light in different colors. The adjustment panel 20 includes a first substrate 210, a second substrate 220, a medium layer 230, first electrode layer 241 and a second electrode layer 242. The second substrate 220 is disposed facing the first substrate 210. The backlight source 130, for example, may take a micro-LED (Light Emitting Diode) or µ-LED as a light source.

In the embodiment of FIG. 25B, the second substrate 220 is disposed closer to the display panel 110 than the first substrate 210. The second substrate 220 receives collimated light E from the display module 10. That is, the second substrate 220 is located on the light incoming side of the adjustment panel 20, and the first substrate 210 is located on the light emitting side of the adjustment panel 20. The medium layer 230 is disposed between the first substrate 210 and the second substrate 220. The medium layer 230 contains first mediums 231 and second mediums 232. In the present embodiment, the medium layer 230 is filled with the first mediums 231 and the second mediums 232. The second mediums 232 are staggered from the first mediums 231. The second mediums 232 include a plurality of polyhedral structures 250. The bottom surfaces of the polyhedral structures 250 are disposed close to the first substrate 210. In addition, the arrangements of the first electrode layers 241, the second electrode layer 242 and the third electrode layers 243 are described as above, so no more details will be described here.

Figure 26:
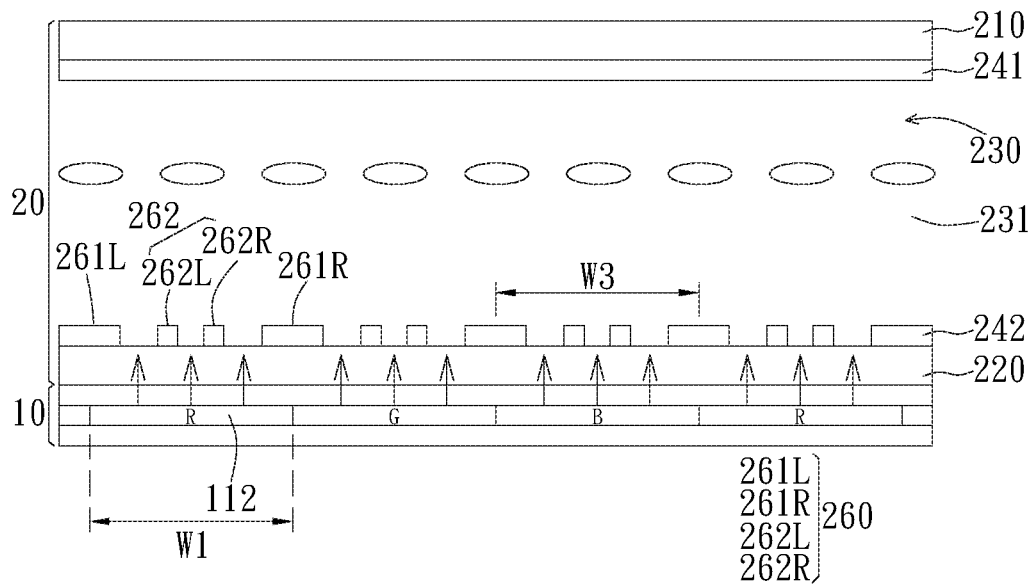
FIG. 26 is a schematic diagram of another embodiment of an adjustment panel of a display device.

FIG. 26 is a schematic diagram of another embodiment of the adjustment panel 20 of the display device 1. As shown in FIG. 26, the adjustment panel 20 is disposed on a display module 10. In the embodiment of FIG. 26, the display module 10 is a self-luminous display panel and has a plurality of sub pixels 112. In an embodiment, marking letters R, G and B in the sub pixels 112 refer to regions capable of producing light in different colors. The adjustment panel 20 includes a first substrate 210, a second substrate 220, a medium layer 230, a first electrode layer 241, and a second electrode layer 242. The second substrate 220 is disposed facing the first substrate 210. The second substrate 220 receives collimated light E from the display module 10. That is, the second substrate 220 is located on the light incoming side of the adjustment panel 20, and the first substrate 210 is located on the light emitting side of the adjustment panel 20.

The medium layer 230 is disposed between the first substrate 210 and the second substrate 220. In the embodiment of FIG. 26, the medium layer 230 contains first mediums 231 filled between the two substrates. The first mediums 231, for example, are materials having a birefringence property, such as liquid crystals. The refractive index of the first mediums 231 may be controlled by a voltage. In other words, the refractive index of the first mediums 231 is voltage-dependent or a function of voltage.

Figure 27:
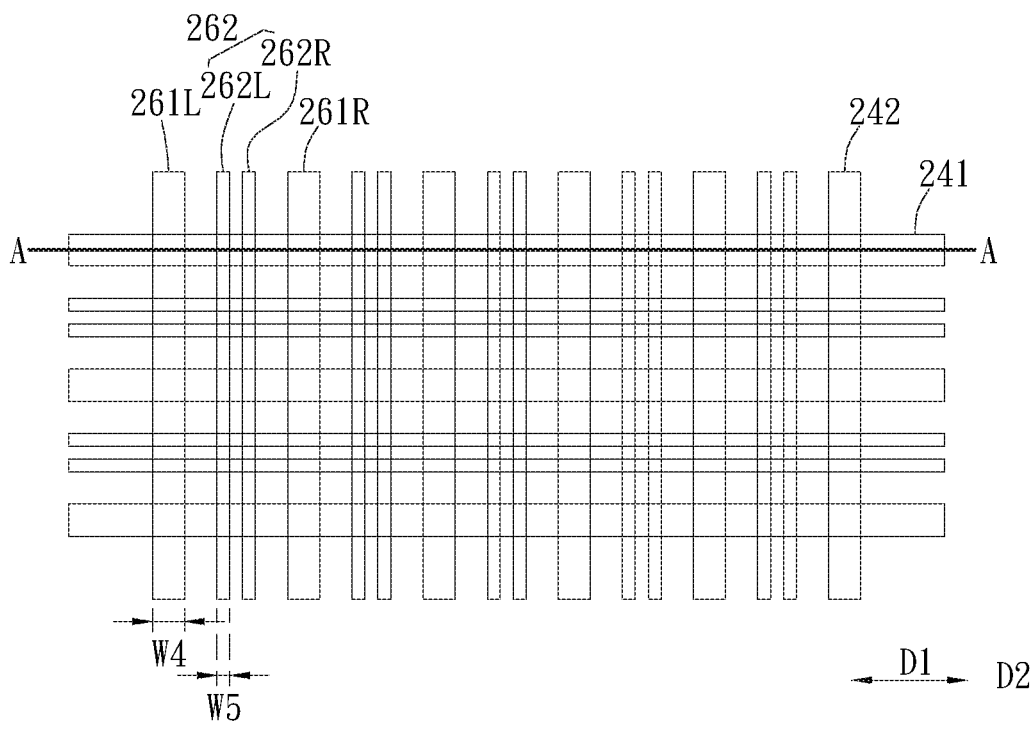
FIG. 27 is a schematic diagram of an electrode distribution corresponding to FIG. 26.

As shown in FIG. 26, the first electrode layer 241 is disposed on the first substrate 210, and the second electrode layer 242 is disposed on the second substrate 220 and faces the first electrode layer 241. Referring to FIGS. 26 and 27, FIG. 27 is a schematic diagram of an electrode distribution corresponding to FIG. 26. As shown in FIG. 27, the first electrode layer 241 and the second electrode layer 242 include multiple strip-shaped electrodes. The electrodes of the first electrode layer 241 extend along a first arrangement direction D1 parallel to the side edge of the adjustment panel and are arranged in a spacing manner along a direction perpendicular to the first arrangement direction D1. The electrodes of the second electrode layer 242 extend along a second arrangement direction D2 parallel to the side edge of the adjustment panel and are arranged in a spacing manner along a direction perpendicular to the second arrangement direction D2. The first arrangement direction D1 is perpendicular to the second arrangement direction D2.

In addition, the second electrode layer 242 includes a plurality of electrode groups 260 (referring to FIG. 26) corresponding to dioptric units of equivalent dioptric structures. In the embodiment of FIG. 27, one dioptric unit may be generated within a range of every four strip-shaped electrodes in the second electrode layer 242, so every four strip-shaped electrodes in the second electrode layer 242 form one electrode group. As shown in FIGS. 26 and 27, each of the electrode groups 260 includes a center electrode 262 and two opposite edge electrodes (261L, 261R). The center electrode 262 has at least two adjustment electrodes (262L, 262R). The two edge electrodes (261L, 261R) are respectively located on two sides of the center electrode 262. As shown in FIG. 26, the width W1 of each of the sub pixel 112 is approximately equal to the width W3 of each of the electrode groups.

Referring to FIGS. 26 and 27, in an embodiment, the width W4 of each of the edge electrodes (261L and/or 261R) may be greater than the width W5 of each of the adjustment electrodes (262L and/or 262R). The edge electrodes may be used as common electrodes between adjacent electrode groups due to the greater widths. For example, in the second electrode layer 242 of FIG. 27, the edge electrode (such as 261R) between the adjacent electrode groups may be simultaneously used as the edge electrode of the previous electrode group and the edge electrode of the next electrode group.

In other embodiments, the width W4 of each of the edge electrodes may be equal to the width W5 of each of the adjustment electrodes. For example, each of the edge electrodes in the second electrode layer 242 of FIG. 27 is divided into two relatively narrow separated edge electrodes. In this way, each of the electrode groups has four independent electrodes, and the edge electrodes of the adjacent electrode groups are separated from each other.

Figure 28:
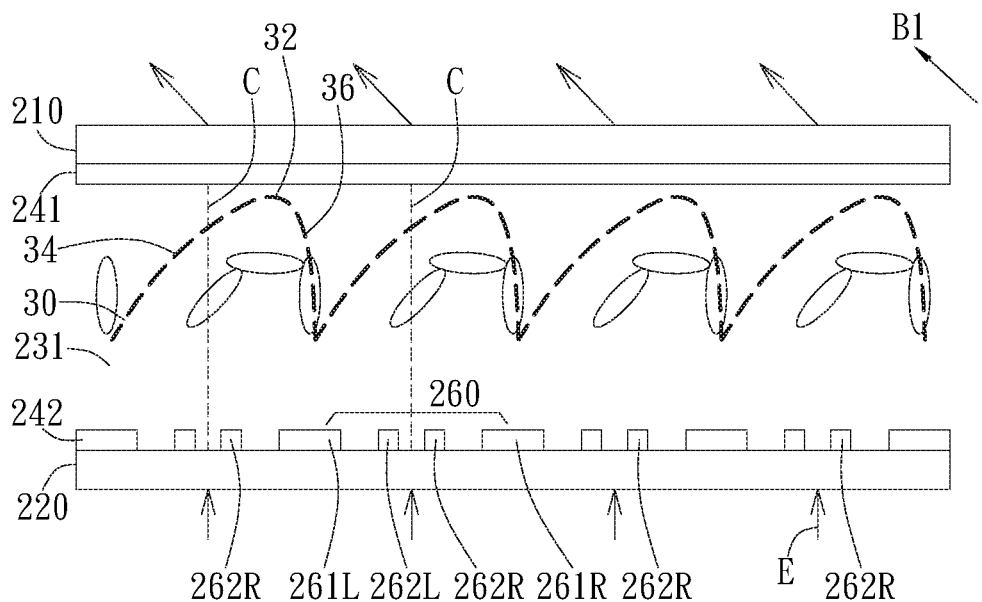
FIG. 28 is a schematic diagram of an embodiment, corresponding to FIG. 26, in a first enabled state.

FIG. 28 is a schematic diagram of an embodiment of the first enabled state. FIG. 28 corresponds to the adjustment panel 20 in FIG. 26. The first electrode layer 241 and the second electrode layer 242 in FIG. 28 are enlarged cross-sectional views corresponding to the AA line in FIG. 27. The FIG. 28 illustrates a unidirectional deflected form serving as the first enabled state. As shown in FIG. 28, the first electrode layer 241 is disposed on the first substrate 210, and the second electrode layer 242 is disposed on the second substrate 220. When the adjustment panel 20 is in the first enabled state, a voltage difference exists between the first substrate 210 and the second substrate 220 to form an electric field distribution. The arrangement of liquid crystal molecules is changed by changing of the electric field distribution. For example, part of the liquid crystal molecules are changed into an upright state, and part of the liquid crystal molecules are changed into an inclined state. At the moment, equivalent dioptric structures are formed in the medium layer according to the electric field distribution to change the path of the collimated light.

Specifically, the refractive index of the first mediums 231 may be controlled by a voltage. In terms of the medium layer filled with liquid crystals serving as the first mediums 231, the arrangement order of the liquid crystal molecules is related to the refractive index of the first mediums 231. In other words, changing the arrangement state of the liquid crystal molecules may change the refractive index of the first mediums 231. When no voltage difference exists between the first substrate 210 and the second substrate 220, the light that passes through different positions of the first mediums 231 undergoes the same refractive index. When the adjustment panel 20 is in the first enabled state, for example, the two adjustment electrodes (262L, 262R) in each of the electrode groups 260 have different voltage values; the two edge electrodes (261L, 261R) have different voltage values, and the adjustment electrode 262R has the same voltage value as the first electrode layer 241. Therefore, multiple different voltage differences are formed in a range corresponding to each of the electrode groups 260, so as to control the liquid crystal molecules to have different arrangement directions. The first mediums 231 generate refraction interfaces having gradient-distributed refractive indexes according to the electric field distribution, such as analogous curved surfaces formed by turning the liquid crystal molecules in a way of stacking or connection or in other combination ways. In other words, the refraction interfaces are located inside the first mediums 231. In the first enabled state, the refraction interfaces generate and form the equivalent dioptric structures.

As shown in FIG. 28, one dioptric unit 30 is disposed in the range corresponding to each of the electrode groups 260. Each of the dioptric units 30 of the equivalent dioptric structures has a peak part 32, which in a projection direction on the second substrate 220 is away from the center line C between two edge electrodes (261L, 261R). The deviation positions of the peak parts 32 of the dioptric units 30 corresponding to the electrode groups 260 are approximately the same. One side (such as the side close to the edge electrode 261R), close to the peak part 32, of each of the dioptric units 30 is relatively steep, and the other side of the dioptric unit 30 spans over the two adjustment electrodes (262L, 262R) from the edge electrode (such as the edge electrode 261L) to form an inclined plane 34.

On the whole, in the embodiment of FIG. 28, the equivalent dioptric structures formed by the refraction interfaces built inside the first mediums 231 provide a prism-like effect, so as to deflect the light emitted from the display module toward a single light emitting direction. As shown in FIG. 28, the predetermined light emitting direction includes a first light emitting direction B1. When the adjustment panel 20 is in the first enabled state, the collimated light E that passes through the equivalent dioptric structures is emitted along the first light emitting direction B1 deflected from a propagation direction. Therefore, a position of the adjustment panel 20 corresponding to each of the electrode groups 260 may emit the light toward the single direction in a deflected manner.

Figure 29:
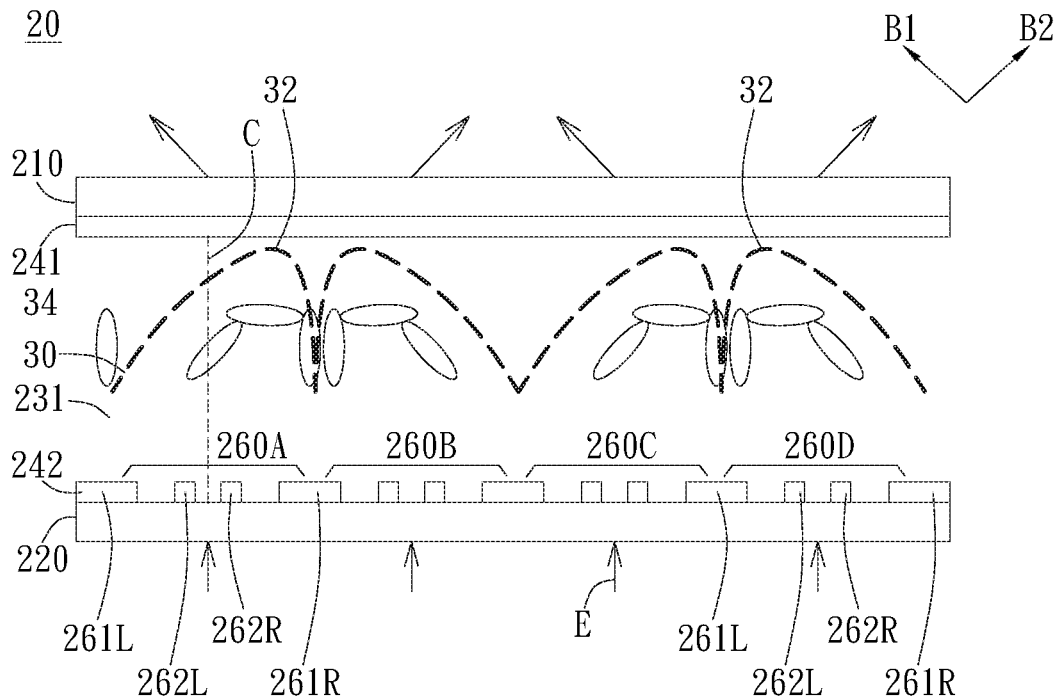
FIG. 29 is a schematic diagram of another embodiment of a first enabled state.

FIG. 29 is a schematic diagram of another embodiment of the first enabled state. FIG. 29 is an embodiment that illustrates a multidirectional deflected form serving as the first enabled state. A difference from the above-mentioned embodiment is that in FIG. 28, the position corresponding to each of the electrode groups 260 guides the light generated by the display module to the same predetermined light emitting direction, so as to emit the light toward the single direction in the deflected manner. In FIG. 29, the dioptric units formed by each of the electrode groups are different, so that the direction of deflected light provided by the position corresponding to each of the electrode groups is different, either.

As shown in FIG. 29, when the adjustment panel is in the first enabled state, for example, the two adjustment electrodes (262L, 262R) in the electrode group 260A have different voltage values; the two edge electrodes (261L, 261R) have different voltage values, and the adjustment electrode 262R has the same voltage value as the first electrode layer 241. The two adjustment electrodes (262L, 262R) in the electrode group 260D have different voltage values; the two edge electrodes (261L, 261R) have different voltage values, and the voltage values of the adjustment electrode 262L and the first electrode layer 241 are set to be the same. Therefore, the arrangement of the liquid crystal molecules controlled by the electrode group 260A is different from that of the liquid crystal molecules controlled by the electrode group 260D. At the moment, the first mediums 231 generate refraction interfaces having gradient-distributed refractive indexes according to the electric field distribution, so as to form the equivalent dioptric structures.

As shown in FIG. 29, one dioptric unit 30 is disposed in the range corresponding to each of the electrode groups. Each of the dioptric units 30 of the equivalent dioptric structures has a peak part 32, which in a projection direction on the second substrate 220 is away from the center line C between two edge electrodes (261L, 261R). The deviation positions of the peak parts 32 of the dioptric units 30 corresponding to the electrode groups are different. For example, in the electrode group 260A, the peak part 32 of the dioptric unit 30 is closer to the edge electrode 261R, and an inclined plane 34 is formed by spanning over the two adjustment electrodes (262L, 262R) from the edge electrode 261L. In the electrode group 260D, the peak part 32 of the dioptric unit 30 is closer to the edge electrode 261L, and an inclined plane 34 is formed by spanning over the two adjustment electrodes (262L, 262R) from the edge electrode 261R.

As shown in FIG. 29, the predetermined light emitting direction includes a first light emitting direction B1 and a second light emitting direction B2. When the adjustment panel 20 is in the first enabled state, the collimated light E that passes through the equivalent dioptric structures is emitted along the first light emitting direction B1 and the second light emitting direction B2 which are deflected from the propagation direction. For example, the positions corresponding to the electrode group 260A and the electrode group 260C guide the light to the first light emitting direction B1, and the positions corresponding to the electrode group 260B and the electrode group 260D guide the light to the second light emitting direction B2. Therefore, the position of the adjustment panel 20 corresponding to each of the electrode groups may emit the light toward the single direction, and the positions of the various electrode groups deflect the light toward different directions. Due to the design, the display device adjusts the light to be in different light intensity directions at different positions of a frame, so as to provide different visual perceptions.

Figure 30:
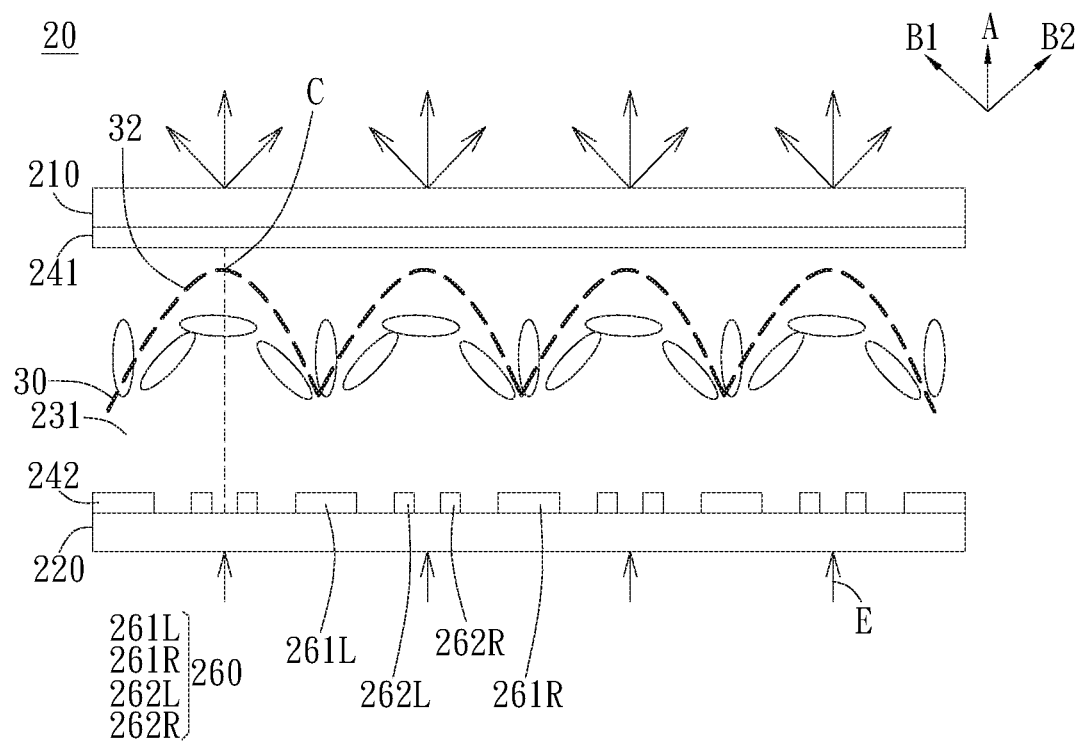
FIG. 30 is a schematic diagram of another embodiment of a first enabled state.

FIG. 30 is a schematic diagram of another embodiment of the first enabled state. FIG. 30 illustrates a scattered form serving as the first enabled state. As shown in FIG. 30, when the adjustment panel 20 is in the first enabled state, a voltage difference exists between the first substrate 210 and the second substrate 220 to form an electric field distribution. For example, the two adjustment electrodes (262L, 262R) in each of the electrode groups 260 have same voltage values; the two edge electrodes (261L, 261R) have different voltage values, and the two adjustment electrodes (262L, 262R) have the same voltage values as the first electrode layer 241.

As mentioned above, the refractive index of the first medium 231 may be controlled by a voltage. When the adjustment panel 20 is in the first enabled state, multiple different voltage differences are generated in a range corresponding to each of the electrode groups 260, so as to control the arrangement of the liquid crystal molecules. At the moment, the first mediums 231 generate refraction interfaces having gradient-distributed refractive indexes to form the equivalent dioptric structures to change the path of the collimated light.

As shown in FIG. 30, one dioptric unit 30 is disposed in the range corresponding to each of the electrode groups 260. Each of the dioptric units 30 of the equivalent dioptric structures has a peak part 32, which in a projection direction on the second substrate 220 is located on the center line C between two edge electrodes (261L, 261R). The positions of the peak parts 32 of the dioptric units 30 corresponding to the electrode groups 260 are approximately the same.

On the whole, in the embodiment of FIG. 30, the equivalent dioptric structures formed by building the refraction interfaces inside the first mediums 231 provide a lens-like effect, so as to refract the light from the display module to form divergent light. As shown in FIG. 30, the predetermined light emitting direction includes a first light emitting direction B1 and a second light emitting direction B2. When the adjustment panel is in the first enabled state, the collimated light E that passes through the equivalent dioptric structures is emitted toward the first light emitting direction B1, the second light emitting direction B2, and the propagation direction A. Therefore, a position of the adjustment panel 20 corresponding to each of the electrode groups 260 may emit the light in a scattered manner.

It should be understood that the above-mentioned of emitting the light toward the first light emitting direction B1, the second light emitting direction B2, and the propagation direction A is only an example illustrating that the scattered light is emitted toward different directions in addition to the predetermined light emitting directions, but not limited to the propagation direction. By virtue of the scattering operation, a relatively uniform light intensity distribution exists in each of the directions.

It should be added that in the above-mentioned electrode groups, the two edge electrodes and the center electrode having the two adjustment electrodes are taken as an example, but the number of electrodes is not limited thereto. For example, the number of the center electrode in each of the electrode groups may be increased to improve the accuracy of controlling the refraction interfaces and further improve the light emitting effect. For example, the prism-like (referring to FIG. 28) dioptric unit 30 is formed to allow the steep plane 36 to be substantially perpendicular to the surface of the second substrate 220 and allow the peak part 32 to be almost a sharp corner. In addition, the width of each electrode and the distance between the electrodes in each of the electrode groups 260 may be further adjusted, so as to improve the accuracy of controlling the refraction interfaces.

Furthermore, as mentioned above, in other embodiments, multiple dioptric units, such as multiple lenses, may be formed in the same electrode group by selectively increasing the number of electrodes. In this circumstance, the peak part 32 is not limited to falling on the center line C between the edge electrodes (261L, 261R).

Furthermore, as mentioned above, in other embodiments, the number of electrodes in the electrode group may be decreased to 3 as required. For example, the center electrode of the electrode group only maintains one adjustment electrode to form the electrode group composed of three electrodes. The equivalent dioptric structure of FIG. 28 is taken as an example. To form the required dioptric unit 30, the peak part 32 is relatively close to the edge electrode 261R, and when the number of the adjustment electrodes is decreased to 1, the position of the adjustment electrode may be away from the center line C between the two edge electrodes (261L, 261R) and disposed closer to the edge electrode 261R. In this way, the electrode group having three electrodes may be disposed at the specific position of the adjustment panel 20 so as to provide the dioptric unit 30 similar to FIG. 28.

Figure 31:
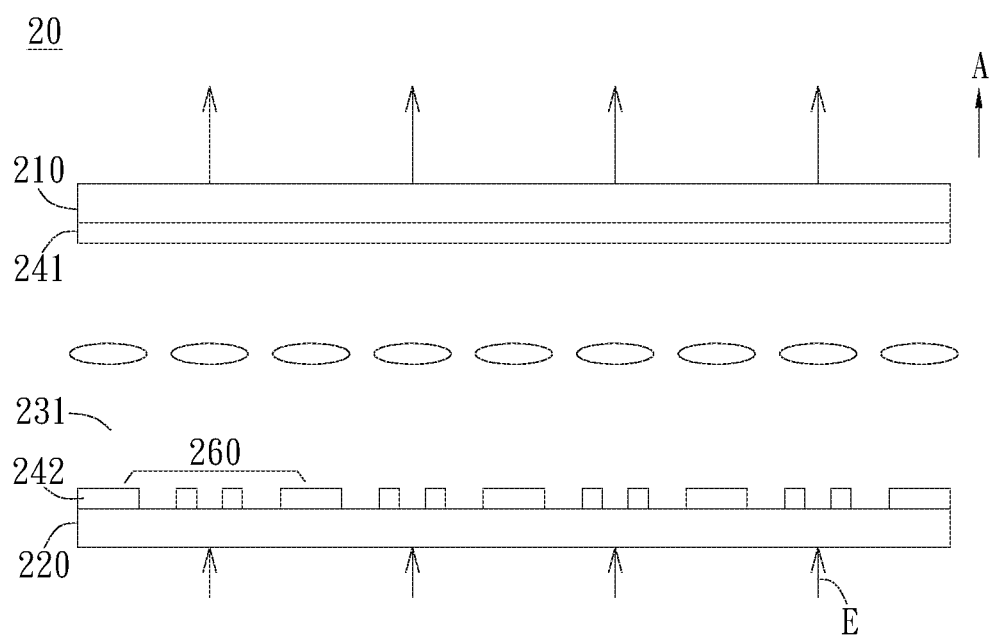
FIG. 31 is a schematic diagram of another embodiment of a second enabled state.

FIG. 31 is a schematic diagram of another embodiment of the second enabled state. FIG. 31 illustrates a collimated form serving as the second enabled state. As shown in FIG. 31, the first electrode layer 241 is disposed on the first substrate 210, and the second electrode layer 242 is disposed on the second substrate 220. When the adjustment panel 20 is in the second enabled state, no voltage difference exists between the first substrate 210 and the second substrate 220. For example, the voltage values of all the electrodes of each of the electrode groups 260 of the second electrode layer 242 are adjusted to be the same as the voltage value of the first electrode layer 241. The collimated light E penetrates through the adjustment panel 20 along the propagation direction A.

It can be seen from the embodiments of FIGS. 28 to 31 that the display device may switch different forms (such as unidirectional deflection, scattering and collimation) of the emitted light by virtue of the voltage difference/no voltage difference of the electrode layers in the adjustment panel 20, so as to provide different changing modes for the light intensity direction.

Figure 32A:
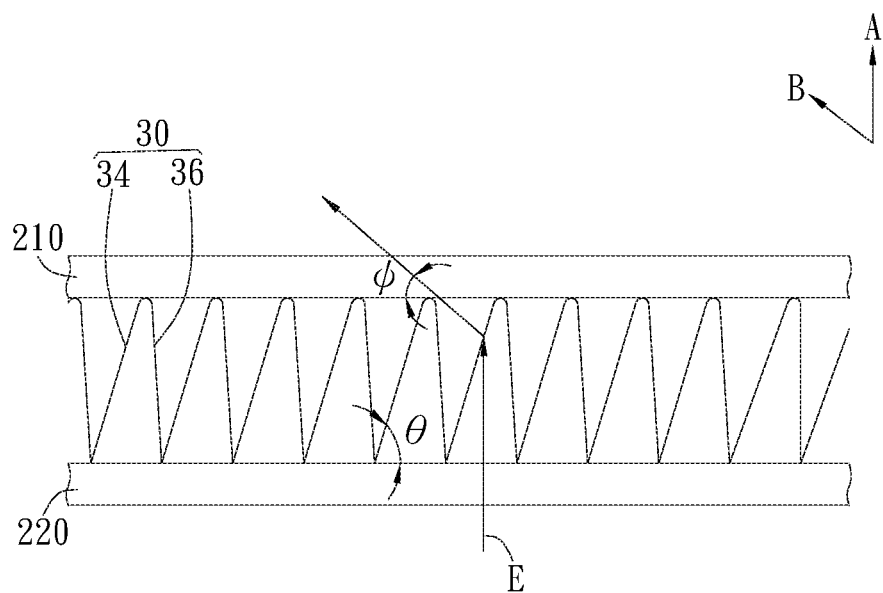
FIGS. 32A and 32B are an example of simulating light emitting and a light emitting result.

FIG. 32A is an example of simulating light emitting. As shown in FIG. 32A, refraction interfaces are built between the first substrate 210 and the second substrate 220 to form equivalent dioptric structures. Each of the dioptric units 30 of the equivalent dioptric structures has an inclined plane 34. An inclination angle ∴ is formed between the inclined plane 34 and the second substrate 220. The collimated light E is substantially deflected from the propagation direction A toward the inclination direction of the inclined plane 34 (such as away from the steep plane). An included angle ψ is formed between the predetermined light emitting direction B and the first substrate 210. As shown in FIG. 32A, the collimated light E is emitted toward the predetermined light emitting direction B. The included angle ψ is formed between the predetermined light emitting direction B and the first substrate 210.

In addition, the refractive index of the first mediums may be controlled by a voltage. The refraction interfaces may be generated inside the first mediums (as shown in the embodiment of FIG. 28). The included angle between the predetermined light emitting direction and the surface of the first substrate 210 is increased with the increase of the inclination angle θ. For example, the refractive index of the first mediums is 1.725, and the refractive indexes of the first substrate 210 and the second substrate 220 are 1.5. When the inclination angle θ is increased, the included angle ψ is increased. The inclination angle θ ranges between 10 degrees and 60 degrees, and the included angle ψ ranges between 0 and 40 degrees corresponding to the above-mentioned angle range.

Furthermore, the refraction interfaces may be generated along borders between the first mediums and the second mediums (as shown in the embodiment of FIG. 5). For example, the first mediums have a first refractive index value and a second refractive index value which vary with the voltage difference. The included angle ψ between the predetermined light emitting direction and the surface of the first substrate 210 changes differently along with changing of the inclination angle θ and a difference value between the first refractive index value and the second refractive index value. The difference value between the first refractive index value and the second refractive index value is 0 to 0.225. For example, the first mediums are close to the light incoming side, and the second mediums are close to the light emitting side. The refractive index of the first mediums ranges between 1.5 and 1.725. The refractive index of the second mediums and the refractive indexes of the first substrate and the second substrate are 1.5. The inclination angle θ has a first angle range between 10 degrees and 60 degrees, and the included angle ψ has a range between 0 and 40 degrees corresponding to the first angle range.

Specifically, within the first angle range, when the inclination angle θ is increased and the refractive index of the first mediums and the refractive index of the second mediums are different (for example, the refractive index of the first mediums varies to 1.725), the included angle ψ is increased therewith. In addition, within the first angle range, when the inclination angle θ is fixed and the refractive index of the first mediums is increased, the included angle ψ is increased therewith. In other words, within the first angle range, the included angle ψ between the predetermined light emitting direction and the surface of the first substrate 210 is increased along with the increase of the inclination angle θ and the difference value between the refractive indexes.

Furthermore, similarly, the first mediums are close to the light incoming side, and the second mediums are close to the light emitting side. The refractive index of the first mediums is 1.5 to 1.725, and the refractive index of the second mediums and the refractive indexes of the first substrate 210 and the second substrate 220 are 1.5. The inclination angle θ has a second angle range between 67.5 degrees and 75 degrees, and the included angle ψ has a range between 40 and 75 degrees corresponding to the second angle range.

Specifically, within the second angle range, when the inclination angle θ is increased and the refractive index of the first mediums and the refractive index of the second mediums are different, the included angle ψ is decreased therewith. In addition, within the second angle range, when the inclination angle θ is fixed and the refractive index of the first mediums is increased, the included angle ψ is decreased therewith. In other words, within the second angle range, the included angle ψ between the predetermined light emitting direction and the surface of the first substrate 210 is decreased along with the increase of the inclination angle θ and the difference value between the refractive indexes.

Figure 32B:
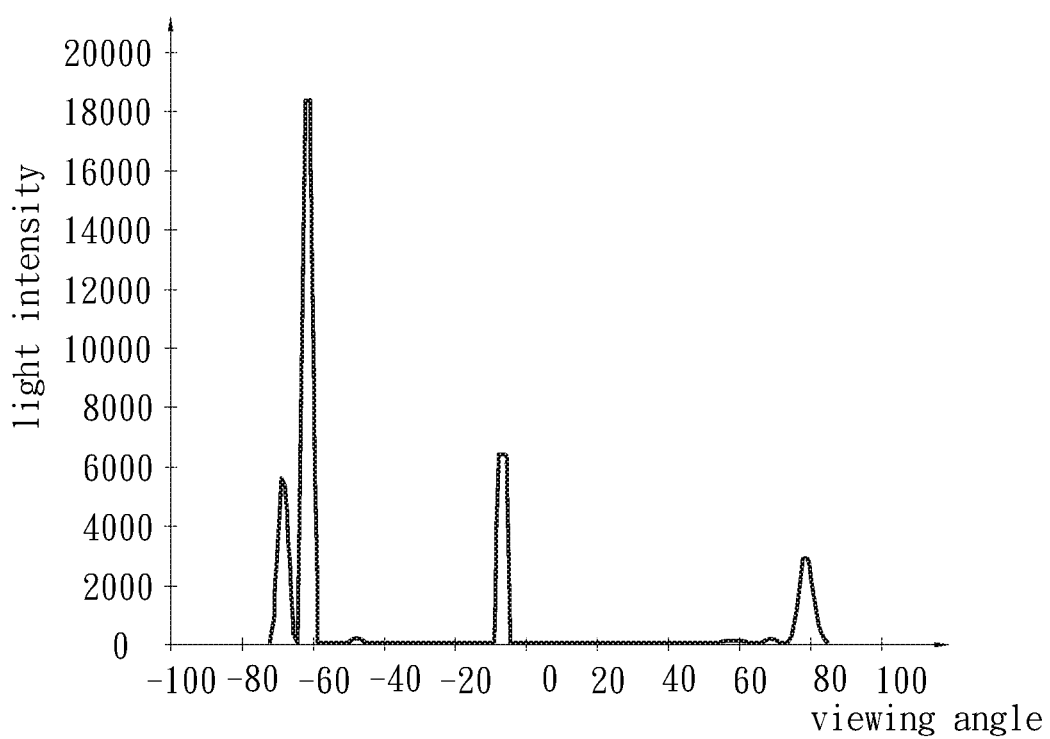

FIG. 32B is a light emitting result of the equivalent dioptric structures as shown in FIG. 32A. As shown in FIG. 32A, each of the dioptric units 30 of the equivalent dioptric structures has the inclined plane 34 and the steep plane 36. In the present embodiment, the steep plane 36 is slightly inclined in an inclination degree less than that of the inclined plane 34. That is, an included angle between the steep plane 36 and the surface of the second substrate 220 is greater than the included angle between the inclined plane 34 and the surface of the second substrate 220. In addition, a fillet is formed at a joint of the inclined plane 34 and the steep plane 36.

In FIG. 32B, the longitudinal axis refers to the light intensity, and the transverse axis refers to a viewing angle. It should be noted that the viewing angle here refers to an included angle between the predetermined light emitting direction and a normal of the first substrate. As shown in FIG. 32B, the collimated light is emitted in a deflected manner. Most light intensity is intensively distributed at about −60 degrees, and the light intensity at other angles is obviously lower than the former. If the position at 0 degree is a boundary, one part of the light is possibly emitted from the other side, namely a position of about 80 degrees due to the slight inclination of the steep plane, and the other part of the light is possibly emitted from positions of about −68 degrees and about −7 degrees due to the fillet formed at the joint of the inclined plane and the steep plane.

Figure 33A:
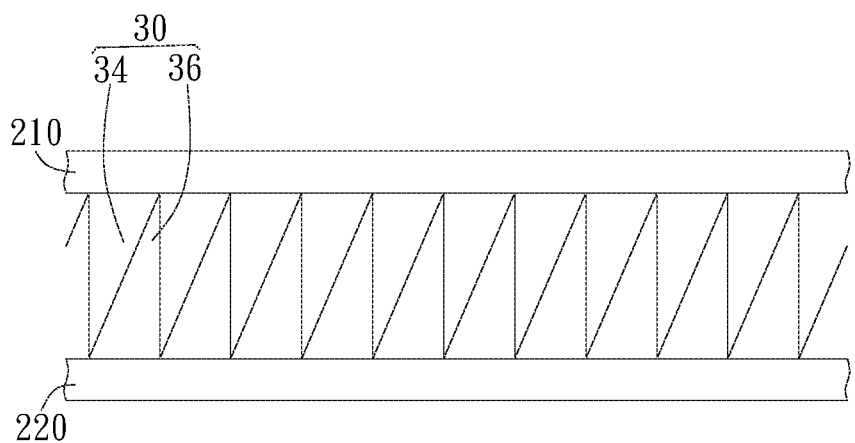
FIGS. 33A and 33B are another example of simulating light emitting and a light emitting result.
Figure 33B:
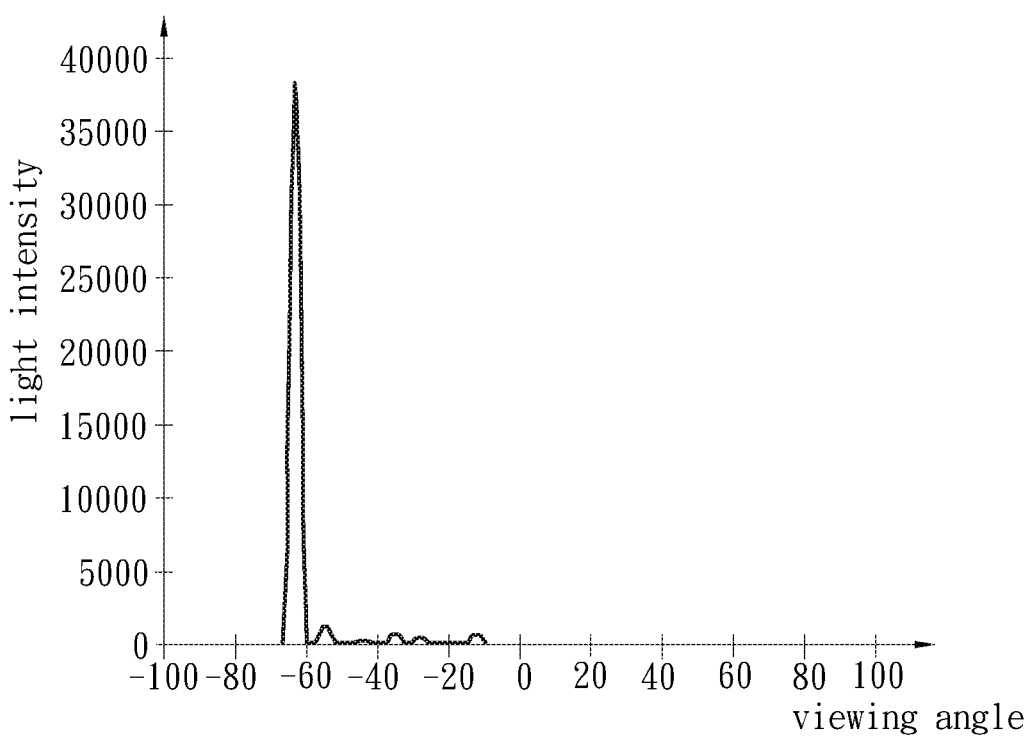

FIG. 33A is another example of simulating light emitting. FIG. 33B is a light emitting result of the equivalent dioptric structures as shown in FIG. 33A. The accuracy of controlling the refraction interfaces is improved so as to improve the light emitting effect. As shown in FIG. 33A, each of the dioptric units 30 of the equivalent dioptric structures has an inclined plane 34 and a steep plane 36. In the present embodiment, the steep plane 36 has a smaller inclination degree than the previous embodiment. In addition, a sharp corner is formed at a joint of the inclined plane 34 and the steep plane 36.

In FIG. 33B, the longitudinal axis refers to the light intensity, and the transverse axis refers to a viewing angle. As shown in FIG. 33B, the collimated light is emitted in a deflected manner. Most light intensity is intensively distributed at about −60 degrees, and the light intensity at other angles is obviously lower than the former. If the position at 0 degree is a boundary, the emitted light is nearly distributed on the side having a viewing angle less than 0. In addition, one part of the light is emitted from positions of about −55 degrees and about −35 degrees, and the light intensity of this part of light and the light intensity of the light emitted from the position of −60 degrees have a greater difference than the previous embodiment. In this way, the light may be guided to a specific light emitting direction to achieve an effect of adjusting the light intensity direction.

Figure 34:
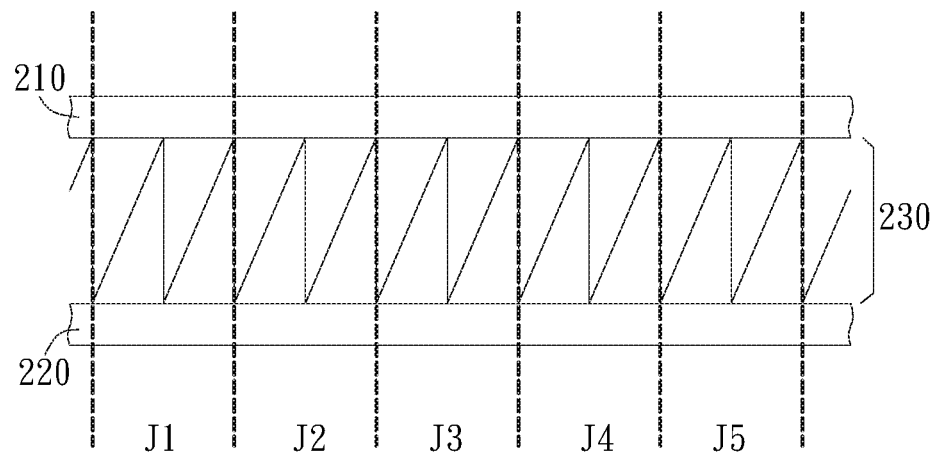
FIG. 34 is a schematic diagram of a medium layer having different adjustment regions.

FIG. 34 is a schematic diagram of a medium layer 230 having different adjustment regions. For example, the medium layer 230 is divided into a plurality of adjustment regions (J1 to J5). Each of the adjustment regions corresponds to each of sub pixels, and at least part of the adjustment regions has different dioptric degrees. In FIG. 34, the simulated refraction interfaces illustrated in FIG. 33A are taken as an example. As shown in FIG. 34, the medium layer 230 is divided into an adjustment region J1, an adjustment region J2, an adjustment region J3, an adjustment region J4 and an adjustment region J5.

For example, the adjustment region J1 and the adjustment region J4 may receive the collimated light that passes through the sub pixels generating red light; the adjustment region J2 and the adjustment region J5 may receive the collimated light that passes through the sub pixels generating green light, and the adjustment region J3 may receive the collimated light that passes through the sub pixels generating blue light. For example, the dioptric degrees between the adjustment region J1, the adjustment region J2 and the adjustment region J3 are set to be different, but the dioptric degree of the adjustment region J1 is the same as that of the adjustment region J4, and the dioptric degree of the adjustment region J2 is the same as that of the adjustment region J5. In terms of the prism-like equivalent dioptric structures, different dioptric degrees refer to different deflection angles of the light. Furthermore, in terms of the lens-like equivalent dioptric structures, different dioptric degrees refer to different scattering degrees of the light.

Figure 35:
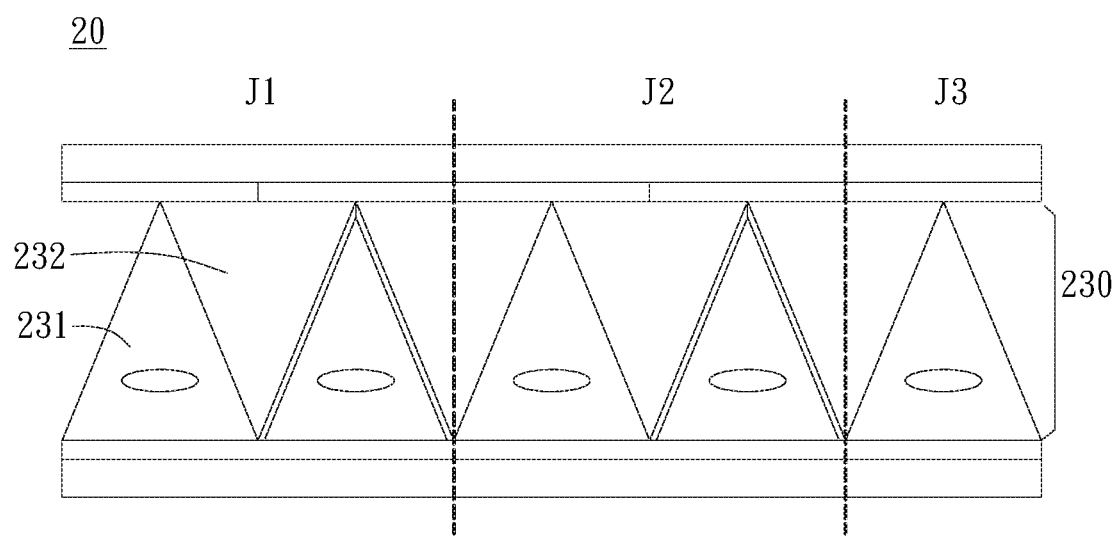
FIG. 35 is a schematic diagram illustrating that the medium layer has different adjustment regions according to the adjustment panel in FIG. 2.

FIG. 35 is a schematic diagram of an embodiment of a medium layer 230 having different adjustment regions. In FIG. 35, the adjustment panel in FIG. 2 is taken as an example. As shown in FIG. 35, the medium layer 230 has first mediums 231 and second mediums 232, and is divided into an adjustment J1, an adjustment J2 and an adjustment J3 to respectively receive the collimated light that passes through different sub pixels. The adjustment regions are separated by partition boards (not shown in the figure). The partition boards are preferably light-permeable. The dioptric degrees among the adjustment region J1, the adjustment region J2 and the adjustment region J3 are set to be different.

In an embodiment, the refractive index of the first mediums 231 may be controlled by a voltage, and the refractive index of the second mediums 232 is a fixed value. In the adjustment region J1, the difference value between the refractive indexes of the first mediums 231 and the second mediums 232 is $d_{nA}$. In the adjustment region J2, the difference value between the refractive indexes of the first mediums 231 and the second mediums 232 is $d_{nB}$. In the adjustment region J3, the difference value between the refractive indexes of the first mediums 231 and the second mediums 232 is $d_{nC}$. The difference values between the refractive indexes in all the adjustment regions are different ($d_{nA} \neq d_{nB} \neq d_{nC}$). In terms of the unidirectional deflected form, the adjustment panel 20 may emit the light toward the single direction and also further control the deflection degree by use of the different difference values between the refractive indexes in all the adjustment regions, so as to enhance the adjustment effect on various light intensity directions.

Figure 36:
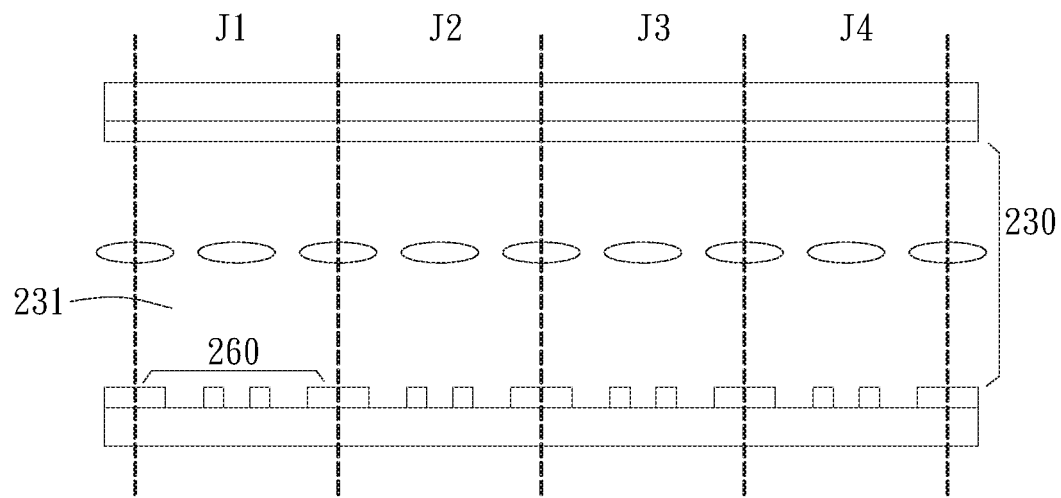
FIG. 36 is a schematic diagram illustrating that the medium layer has different adjustment regions according to the adjustment panel in FIG. 26.

FIG. 36 is a schematic diagram of another embodiment of a medium layer 230 having different adjustment regions. In FIG. 36, the adjustment panel 20 in FIG. 26 is taken as an example. As shown in FIG. 36, the medium layer 230 has first mediums 231, and is divided into an adjustment J1, an adjustment J2, an adjustment J3, and an adjustment region J4 to respectively receive the collimated light that passes through different sub pixels. The sizes of all the adjustment regions, for example, may correspond to the ranges of the electrode groups 260. The adjustment regions are separated by partition boards. The partition boards are preferably light-permeable. The dioptric degrees among the adjustment region J1, the adjustment region J2, the adjustment region J3 and the adjustment region J4 are set to be different.

In an embodiment, the refractive index of the first mediums 231 may be controlled by a voltage. Multiple different voltage differences are formed in the range corresponding to each of the electrode groups 260, so as to control the liquid crystal molecules to have different arrangement directions. In addition, voltage difference distributions formed in all the adjustment regions are different, so that the liquid crystal molecules in all the adjustment regions are arranged in different ways. The unidirectional deflected form is taken as an example. The inclination degree of the inclined plane of the dioptric unit formed in the adjustment region J1 is different from the inclination degrees of the inclined planes of the dioptric units formed in the adjustment region J2 and the adjustment region J3 to further control the deflection degree, so as to enhance the adjustment effect on various light intensity directions.

Figure 37:
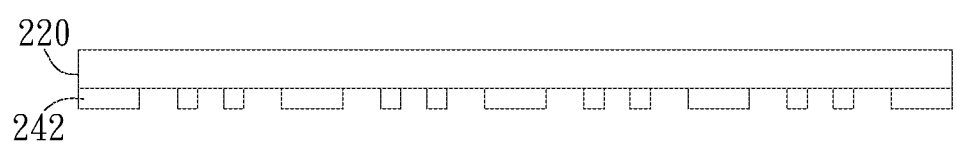
FIG. 37 is a schematic diagram of another embodiment of an adjustment panel of a display device.
Figure 37:
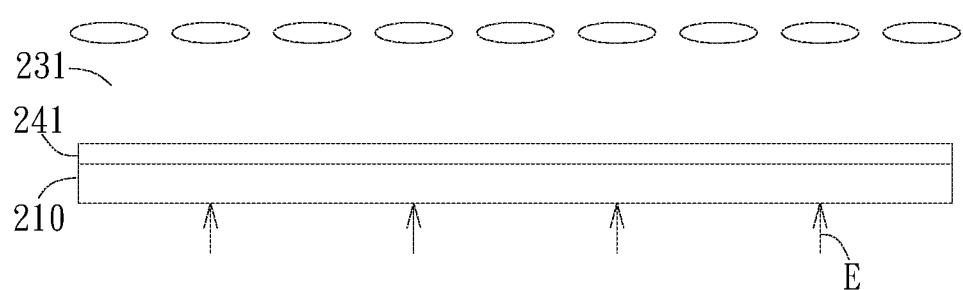

FIG. 37 is a schematic diagram of another embodiment of an adjustment panel 20 of a display device. As shown in FIG. 37, the first substrate 210 receives the collimated light E from the display module; namely the first substrate 210 is located on the light incoming side of the adjustment panel 20, and the second substrate 220 is located on the light emitting side of the adjustment panel 20. The medium layer 230 is disposed between the first substrate 210 and the second substrate 220. The first electrode layer 241 is disposed on the first substrate 210, and the second electrode layer 242 is disposed on the second substrate 220 and faces the first electrode layer 241. The medium layer 230 includes first mediums 231 filled between the two substrates. The first mediums 231, for example, are materials having a birefringence property, such as liquid crystals.

Figure 38:
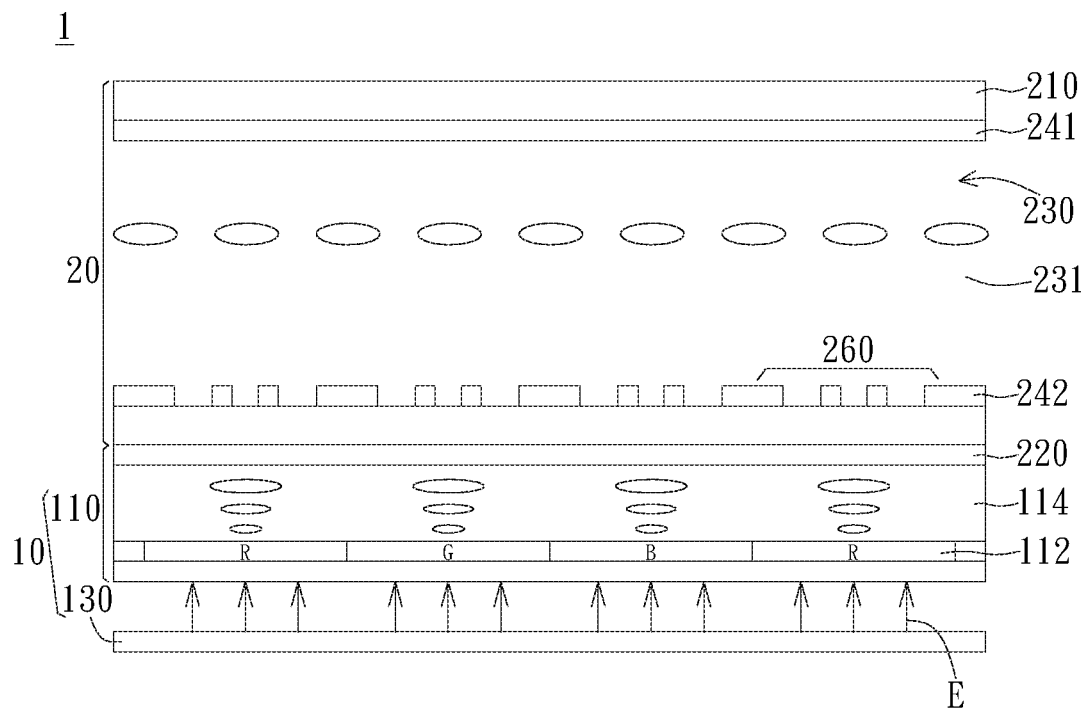
FIG. 38 is a schematic diagram of another embodiment of a display device having a backlight source.

FIG. 38 is a schematic diagram of another embodiment of a display device 1 having a backlight source 130. As shown in FIG. 38, an adjustment panel 20 is disposed on a display module 10. In the embodiment of FIG. 38, the display module 10 is a non-self-luminous display module and includes a display panel 110 and the backlight source 130. The display panel 110 has a liquid crystal layer 114 and a plurality of sub pixels 112. In an embodiment, marking letters R, G and B in the sub pixels 112 refer to regions capable of producing light in different colors. The adjustment panel 20 includes a first substrate 210, a second substrate 220, a medium layer 230, a first electrode layer 241, and a second electrode layer 242. The second substrate 220 is disposed facing the first substrate 210. The backlight source 130, for example, may take a micro-LED or µ-LED as a light source.

In the embodiment of FIG. 38, the second substrate 220 is disposed closer to the display panel 110 than the first substrate 210. The second substrate 220 receives collimated light E from the display module 10. That is, the second substrate 220 is located on the light incoming side of the adjustment panel 20, and the first substrate 210 is located on the light emitting side of the adjustment panel 20. The medium layer 230 is disposed between the first substrate 210 and the second substrate 220. The medium layer 230 includes first mediums 231 filled between the two substrates. In addition, the content that the second electrode layer 242 includes a plurality of electrode groups 260 is as mentioned above, so no more details will be described here.

Figure 39:
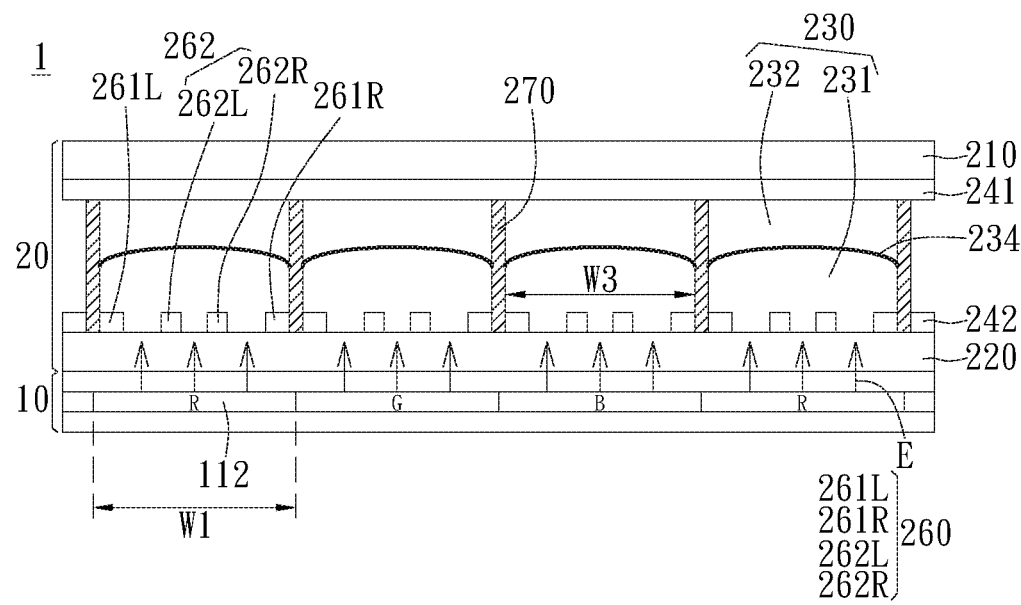
FIG. 39 is a schematic diagram of another embodiment of an adjustment panel of a display device.

FIG. 39 is a schematic diagram of another embodiment of the adjustment panel 20 of the display device 1. As shown in FIG. 39, the adjustment panel 20 is disposed on a display module 10. In the embodiment of FIG. 39, the display module 10 is a self-luminous display panel and has a plurality of sub pixels 112. In an embodiment, marking letters R, G and B in the sub pixels 112 refer to regions capable of producing light in different colors. The adjustment panel 20 includes a first substrate 210, a second substrate 220, a medium layer 230, a first electrode layer 241, and a second electrode layer 242. The second substrate 220 is disposed facing the first substrate 210. The second substrate 220 receives collimated light E from the display module 10. That is, the second substrate 220 is located on the light incoming side of the adjustment panel 20, and the first substrate 210 is located on the light emitting side of the adjustment panel 20.

The medium layer 230 is disposed between the first substrate 210 and the second substrate 220. In the embodiment of FIG. 39, the medium layer 230 includes a first medium 231 and a second medium 232 which are filled between the two substrates. The first medium 231 and the second medium 232 are respectively first fluid and second fluid which have different polarities and refractive indexes. For example, the first fluid is oil, and the second fluid is an aqueous solution. The first fluid and the second fluid are substantially insoluble. As shown in FIG. 39, a contact interface 234 exists between the first fluid and the second fluid.

As shown in FIG. 39, the first electrode layer 241 is disposed on the first substrate 210, and the second electrode layer 242 is disposed on the second substrate 220 and faces the first electrode layer 241. In the present embodiment, the first electrode layer 241 and the second electrode layer 242 include multiple strip-shaped electrodes having a distribution similar to that in FIG. 27. The electrodes of the first electrode layer 241 are arranged in parallel in a spacing manner. The arrangement direction of the electrodes of the second electrode layer 242 are perpendicular to that of the electrodes of the first electrode layer 241, and the electrodes of the second electrode layer 242 are also arranged in parallel in a spacing manner. A difference from FIG. 27 is that the widths of the edge electrodes (261L, 261R) of the second electrode layer 242 are approximately equal to the widths of the adjustment electrodes (262L, 262R). Each of the electrode groups 260 has four independent electrodes, and the edge electrodes of the adjacent electrode groups 260 are separated.

Similarly, the second electrode layer 242 includes a plurality of electrode groups 260 corresponding to dioptric units of the equivalent dioptric structures. By taking the embodiment of FIG. 39 as an example, one dioptric unit may be generated within a range of every four strip-shaped electrodes in the second electrode layer 242, so every four strip-shaped electrodes in the second electrode layer 242 form one electrode group 260. The medium layer 230 is divided into multiple regions by barrier walls 270 according to the ranges of the electrode groups 260. The barrier walls 270, for example, are light-permeable materials. As shown in FIG. 39, each of the electrode groups 260 includes a center electrode 262 and two opposite edge electrodes (261L, 261R). The center electrode 262 has at least two adjustment electrodes (262L, 262R). The two edge electrodes (261L, 261R) are respectively located on two sides of the center electrode 262. As shown in FIG. 39, the width W1 of each of the sub pixels 112 is approximately equal to the width W3 of each of the electrode groups 260.

Figure 40:
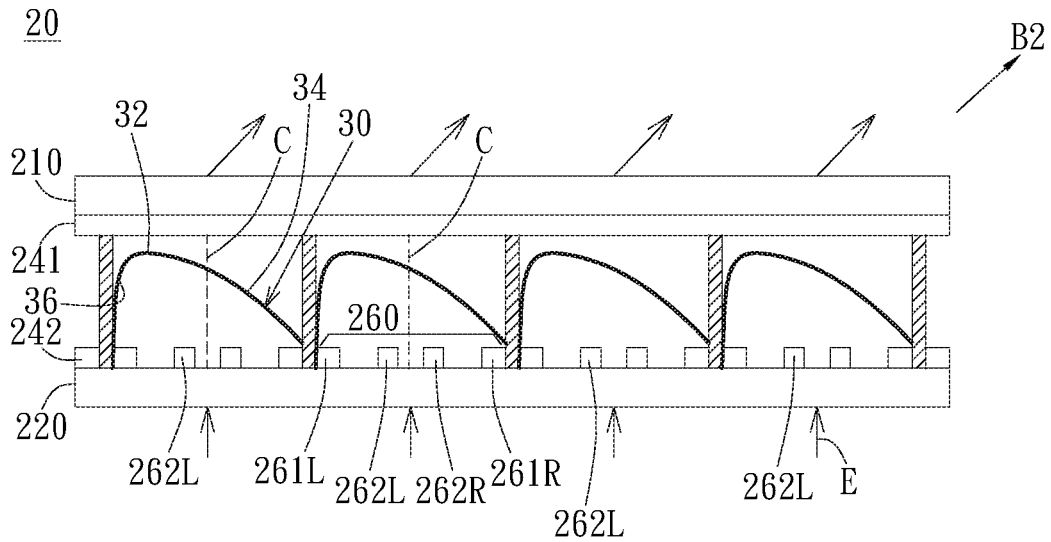
FIG. 40 is a schematic diagram of an embodiment, corresponding to FIG. 39, in a first enabled state.

FIG. 40 is a schematic diagram of an embodiment of a first enabled state. FIG. 40 corresponds to the adjustment panel 20 in FIG. 39. FIG. 40 illustrates the unidirectional deflected form serving as the first enabled state. As shown in FIG. 40, the first electrode 241 is disposed on the first substrate 210, and the second electrode layer 242 is disposed on the second substrate 220. When the adjustment panel 20 is in the first enabled state, a voltage difference exists between the first substrate 210 and the second substrate 220 to form an electric field distribution. The shape of a contact interface is changed by virtue of changing of the electric field distribution. For example, the contact interface is changed from a flat state into an inclined state.

Specifically, the shape of the contact interface may be controlled by a voltage. When no voltage difference exists between the first substrate 210 and the second substrate 220, the contact interface is a flat surface, and at the moment, the normal directions of the contact interface at different positions are substantially the same, so as not to change the advancing direction of the collimated light. When the adjustment panel 20 is in the first enabled state, for example, the two adjustment electrodes (262L, 262R) in each of the electrode groups 260 have different voltage values; the two edge electrodes (261L, 261R) have different voltage values, and the voltage value of the adjustment electrode 262L is the same as that of the first electrode layer 241.

Therefore, multiple different voltage differences are formed in a range corresponding to each of the electrode groups 260, so as to control the wettability of the first medium 231 to change a contact angle, and the second medium 232 pushes the first medium 231 to maintain the contact interface to form a specific shape (such as the inclined plane 34). At the moment, a refraction interface is built on a border between the first medium 231 and the second medium 232, and the normal direction of the contact interface is changed to change the light path. In other words, the contact interface serving as the refraction interface exists between the first fluid and the second fluid. In the first enabled state, the shape of the refraction interface is changed according to the electric field distribution to form an equivalent dioptric structure.

As shown in FIG. 40, one dioptric unit 30 is disposed in the range corresponding to each of the electrode groups 260. Each of the dioptric units 30 of the equivalent dioptric structures has a peak part 32, which in a projection direction on the second substrate 220 is located away from the center line C between two edge electrodes (261L, 261R). The deviation positions of the peak parts 32 of the dioptric units 30 corresponding to the electrode groups are approximately the same. One side (such as the side close to the edge electrode 261L), close to the peak part 32, of each of the dioptric units 30 is relatively steep, and the other side of the dioptric unit 30 spans over the two adjustment electrodes from the edge electrode (such as the edge electrode 261R) to form an inclined plane 34.

On the whole, in the embodiment of FIG. 40, the equivalent dioptric structures formed by the refraction interfaces provide a prism-like effect, so as to deflect the light from the display module toward a single light emitting direction. As shown in FIG. 40, the predetermined light emitting direction includes a second light emitting direction B2. When the adjustment panel 20 is in the first enabled state, the collimated light E that passes through the equivalent dioptric structures is emitted along the second light emitting direction B2 deflected from a propagation direction. Therefore, a position of the adjustment panel 20 corresponding to each of the electrode groups 260 may emit the light toward the single direction in a deflected manner.

In other embodiments, the varied refractive index of the first medium 231 is preferably greater than the refractive index of the second medium 232. That is, the medium close to the light incoming side of the adjustment panel 20 has a relatively large refractive index. The light passes through the medium having the relatively large refractive index at first so as to increase the deflection degree of the emitted light from the propagation direction, but not limited thereto.

Figure 41:
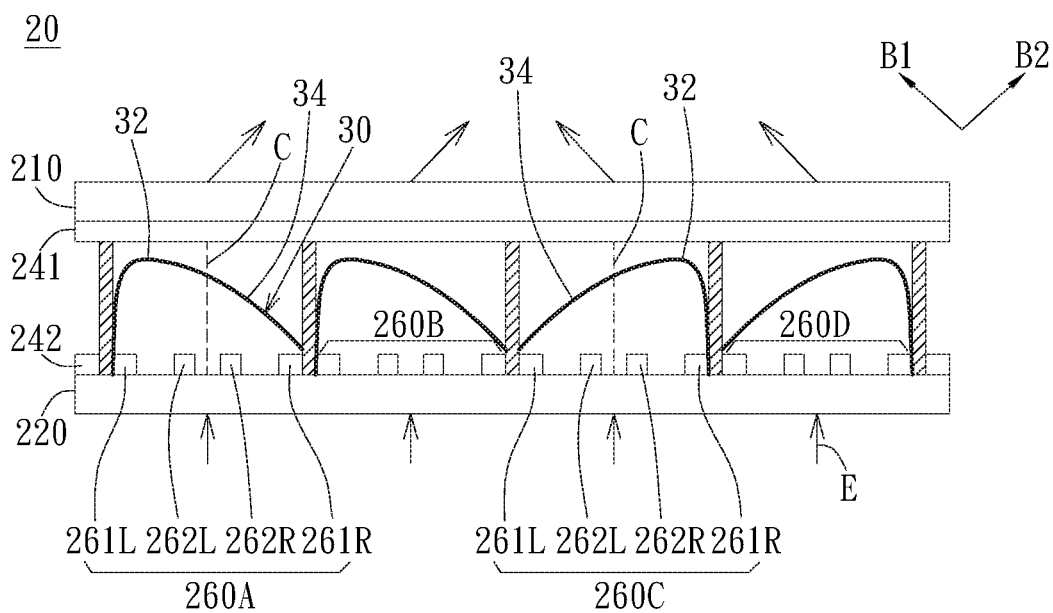
FIG. 41 is a schematic diagram of another embodiment of a first enabled state.

FIG. 41 is a schematic diagram of another embodiment of the first enabled state. FIG. 41 illustrates a multidirectional deflected form serving as the first enabled state. A difference from the above-mentioned embodiment is that in FIG. 40, the position corresponding to each of the electrode groups guides the light generated by the display module to the same predetermined light emitting direction, so as to emit the light toward the single direction in the deflected manner. In FIG. 41, the dioptric units formed by each of the electrode groups are different, so that the direction of deflected light provided by the position corresponding to each of the electrode groups is different, either.

As shown in FIG. 41, when the adjustment panel 20 is in the first enabled state, for example, the two adjustment electrodes (262L, 262R) in the electrode group 260A have different voltage values; the two edge electrodes (261L, 261R) have different voltage values, and the adjustment electrode 262L has the same voltage value as the first electrode layer 241. The two adjustment electrodes (262L, 262R) in the electrode group 260C have different voltage values; the two edge electrodes (261L, 261R) have different voltage values, and the adjustment electrode 262R has the same voltage value as the first electrode layer 241. Therefore, the shape of the contact interface controlled by the electrode group 260A is different from the shape of the contact interface controlled by the electrode group 260C. The shape of the refraction interface is changed according to the electric field distribution to form the equivalent dioptric structure.

As shown in FIG. 41, one dioptric unit 30 is disposed in the range corresponding to each of the electrode groups. Each of the dioptric units 30 of the equivalent dioptric structures has a peak part 32, which in a projection direction on the second substrate 220 is located away from the center line C between two edge electrodes (261L, 261R). The deviation positions of the peak parts 32 of the dioptric units 30 corresponding to the electrode groups 260 are different. For example, in the electrode group 260A, the peak part 32 of the dioptric unit 30 is closer to the edge electrode 261L, and an inclined plane 34 is formed by spanning over the two adjustment electrodes (262L, 262R) from the edge electrode 261R. In the electrode group 260C, the peak part 32 of the dioptric unit 30 is closer to the edge electrode 261R, and the inclined plane 34 is formed by spanning over the two adjustment electrodes (262L, 262R) from the edge electrode 261L.

As shown in FIG. 41, the predetermined light emitting direction includes a first light emitting direction B1 and a second light emitting direction B2. When the adjustment panel 20 is in the first enabled state, the collimated light E that passes through the equivalent dioptric structures is emitted along the first light emitting direction B1 and the second light emitting direction B2 which are deflected from the propagation direction. For example, the positions corresponding to the electrode group 260A and the electrode group 260B guide the light to the second light emitting direction B2, and the positions corresponding to the electrode group 260C and the electrode group 260D guide the light to the first light emitting direction B1. Therefore, the position of adjustment panel 20 corresponding to each of the electrode groups may emit the light toward the single direction, and the positions of the various electrode groups deflect the light toward different directions. Due to the design, the display device adjusts the light to be in different light intensity directions at different positions of a frame, so as to provide different visual perceptions.

Figure 42:
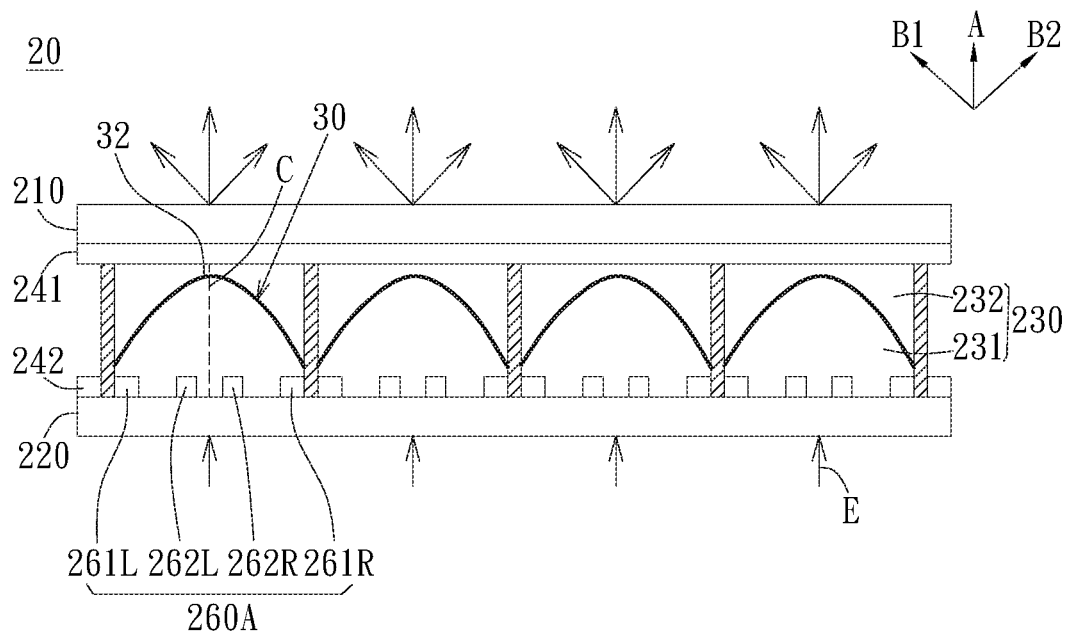
FIG. 42 is a schematic diagram of another embodiment of a first enabled state.

FIG. 42 is a schematic diagram of another embodiment of the first enabled state. FIG. 42 illustrates a scattered form serving as the first enabled state. As shown in FIG. 42, when the adjustment panel 20 is in the first enabled state, a voltage difference exists between the first substrate 210 and the second substrate 220 to form an electric field distribution. For example, the two adjustment electrodes (262L, 262R) in the electrode group 260A have the same voltage value which is equal to the voltage value of the first electrode layer 241, and the two edge electrodes (261L, 261R) have the same voltage value which is different from the voltage values of the two adjustment electrodes (262L, 262R).

As mentioned above, the shape of the contact interface may be controlled by a voltage. When the adjustment panel 20 is in the first enabled state, multiple different voltage differences are generated in a range corresponding to each of the electrode groups, so as to control the wettability of the first medium 231 to change a contact angle, and the second medium 232 pushes the first medium 231 to maintain the contact interface to form a specific shape (such as an arc curved surface). At the moment, a refraction interface is built on a border between the first medium 231 and the second medium 232, and the normal direction of the contact interface is changed so as to change the light path. The shape of the refraction interface is changed according to the electric field distribution to form the equivalent dioptric structure.

As shown in FIG. 42, one dioptric unit 30 is disposed in the range corresponding to each of the electrode groups 260. Each of the dioptric units 30 of the equivalent dioptric structures has a peak part 32, which in a projection direction on the second substrate 220 is located on the center line C between two edge electrodes (261L, 261R). The positions of the peak parts 32 of the dioptric units 30 corresponding to the electrode groups are approximately the same.

On the whole, in the embodiment of FIG. 42, the equivalent dioptric structures formed by the refraction interfaces provide a lens-like effect, so as to refract the light from the display module to form divergent light. As shown in FIG. 42, the predetermined light emitting direction includes a first light emitting direction B1 and a second light emitting direction B2. When the adjustment panel 20 is in the first enabled state, the collimated light E that passes through the equivalent dioptric structures is emitted toward the first light emitting direction B1, the second light emitting direction B2, and the propagation direction A. Therefore, a position of the adjustment panel 20 corresponding to each of the electrode groups 260 may emit the light in a scattered manner.

It should be understood that the above-mentioned of emitting the light toward the first light emitting direction, the second light emitting direction, and the propagation direction is only an example illustrating that the scattered light is emitted toward different directions in addition to the predetermined light emitting directions, but not limited to the propagation direction. By virtue of the scattering operation, a relatively uniform light intensity distribution exists in each of the directions.

It should be added that in the above-mentioned electrode groups, the two edge electrodes and the center electrode having the two adjustment electrodes are taken for example, but the number of electrodes is not limited thereto. For example, the number of the center electrode in each of the electrode groups may be increased to improve the accuracy of controlling the refraction interfaces and further improve the light emitting effect. For example, the prism-like (referring to FIG. 40) dioptric units 30 are formed to allow the steep planes 36 to be substantially perpendicular to the surface of the second substrate 220 and allow the peak parts 32 to be almost sharp corners. In addition, the width of each electrode and the distance between the electrodes in each of the electrode groups 260 may be further adjusted, so as to improve the accuracy of controlling the refraction interfaces.

Furthermore, as mentioned above, in other embodiments, multiple dioptric units, such as multiple lenses, may be formed in the same electrode group by selectively increasing the number of electrodes. In this circumstance, the peak part 32 is not limited to falling on the center line C between the edge electrodes (261L, 261R).

Furthermore, as mentioned above, in other embodiments, the number of electrodes in the electrode group may be decreased to 3 as required. For example, the center electrode of the electrode group only maintains one adjustment electrode to form the electrode group composed of three electrodes. The equivalent dioptric structure of FIG. 40 is taken as an example. To form the required dioptric unit 30, the peak part 32 is relatively close to the edge electrode 261L, and when the number of the adjustment electrodes is decreased to 1, the position of the adjustment electrode may be away from the center line C between the two edge electrodes (261L, 261R) and disposed closer to the edge electrode 261L. In this way, the electrode group having three electrodes may be disposed at the specific position of the adjustment panel so as to provide the dioptric unit 30 as shown in FIG. 40.

Figure 43:
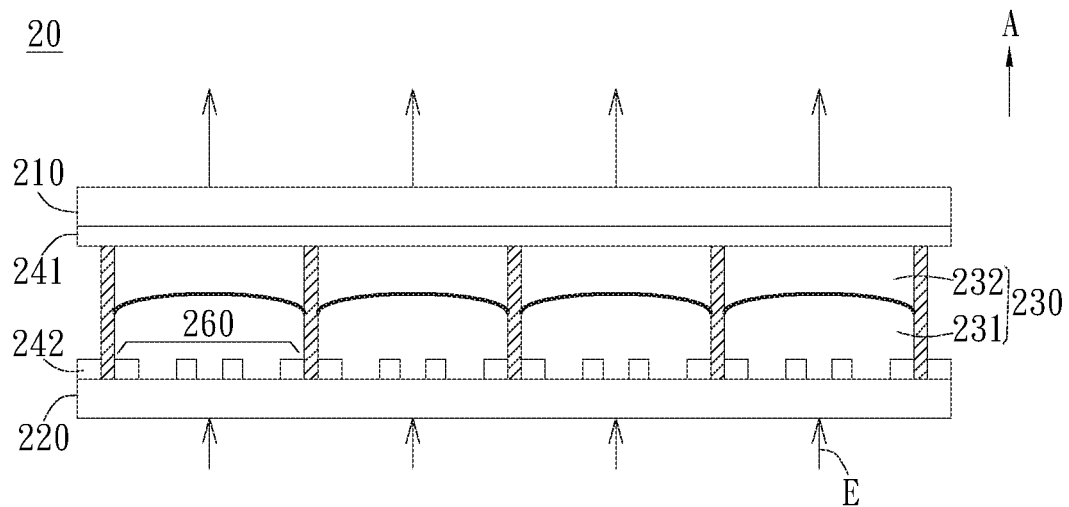
FIG. 43 is a schematic diagram of another embodiment of a second enabled state.

FIG. 43 is a schematic diagram of another embodiment of the second enabled state. FIG. 43 illustrates a collimated form serving as the second enabled state. As shown in FIG. 43, the first electrode layer 241 is disposed on the first substrate 210, and the second electrode layer 242 is disposed on the second substrate 220. When the adjustment panel 20 is in the second enabled state, no voltage difference exists between the first substrate 210 and the second substrate 220. For example, the voltage values of all the electrodes of each of the electrode groups 260 of the second electrode layer 242 are adjusted to be the same as the voltage value of the first electrode layer 241. The collimated light E penetrates through the adjustment panel 20 along the propagation direction.

It can be seen from the embodiments of FIGS. 40 to 43 that the display device may switch different forms (such as unidirectional deflection, scattering and collimation) of the emitted light by changing the shape of the contact interface between the first fluid and the second fluid by virtue of the voltage difference/no voltage difference of the electrode layers in the adjustment panel, so as to provide different changing modes for the light intensity direction.

Figure 44:
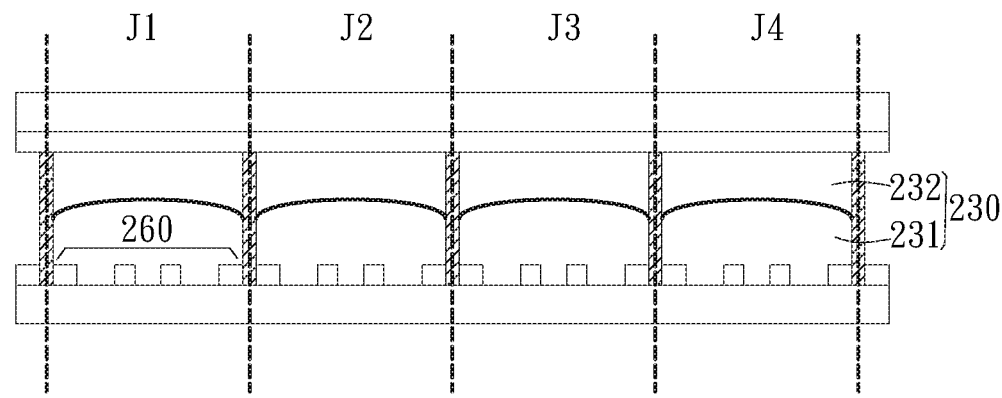
FIG. 44 is a schematic diagram illustrating that the medium layer has different adjustment regions according to the adjustment panel in FIG. 39.

FIG. 44 is a schematic diagram illustrating that the medium layer 230 has different adjustment regions according to the adjustment panel 20 in FIG. 39. In FIG. 44, the adjustment panel 20 in FIG. 39 is taken as an example. As shown in FIG. 44, the medium layer 230 has a first medium 231 and a second medium 232 and is divided into an adjustment region J1, an adjustment region J2, an adjustment region J3, and an adjustment region J4 to respectively receive the collimated light that passes through different sub pixels. The sizes of all the adjustment regions correspond to the ranges of the electrode groups 260. Barrier walls between the adjustment regions may serve as boundaries of the adjustment regions. The barrier walls are preferably light-permeable. The dioptric degrees between the adjustment region J1, the adjustment region J2, the adjustment region J3, and the adjustment region J4 may be set to be different.

In an embodiment, the first medium 231 and the second medium 232 are respectively first fluid and second fluid which have different polarities and refractive indexes. A contact interface exists between the first fluid and the second fluid. Multiple different voltage differences are formed in a range corresponding to each of the electrode groups 260. The shape of the contact interface is changed by changing of the electric field distribution. In addition, the voltage difference distributions formed in all the adjustment regions are different, so that the shapes of the contact interfaces in all the adjustment regions are different. The unidirectional deflected form is taken as an example. The inclination degree of the inclined plane of the dioptric unit formed in the adjustment region J1 is different from the he inclination degrees of the inclined planes in the adjustment region J2 and the adjustment J3 to further control the deflection degree, so as to enhance the adjustment effect on various light intensity directions.

Figure 45:
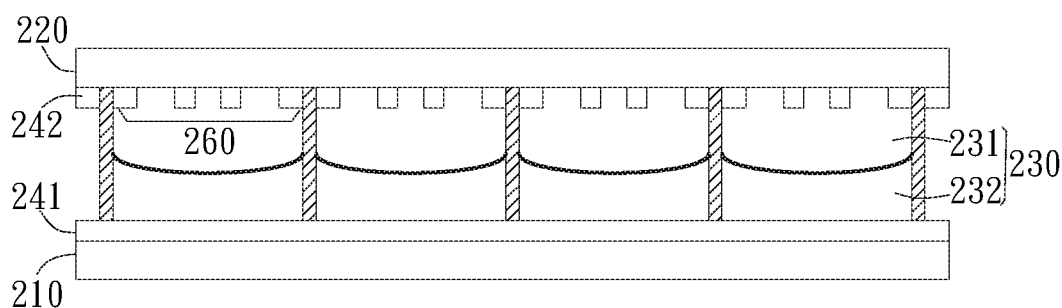
FIG. 45 is a schematic diagram of another embodiment of an adjustment panel of a display device.

FIG. 45 is a schematic diagram of another embodiment of an adjustment panel 20 of a display device. As shown in FIG. 45, the first substrate 210 receives the collimated light from the display module; namely the first substrate 210 is located on the light incoming side of the adjustment panel 20, and the second substrate 220 is located on the light emitting side of the adjustment panel 20. The medium layer 230 is disposed between the first substrate 210 and the second substrate 220. The first electrode layer 241 is disposed on the first substrate 210, and the second electrode layer 242 is disposed on the second substrate 220 and faces the first electrode layer 241. The medium layer 230 includes a first medium 231 and a second medium 232. In the present embodiment, the medium layer 230 is filled with the first medium 231 and the second medium 232. The first medium 231 and the second medium 232 are respectively first fluid and second fluid which have different polarities and refractive indexes, and the first fluid and the second fluid are substantially insoluble.

Figure 46:
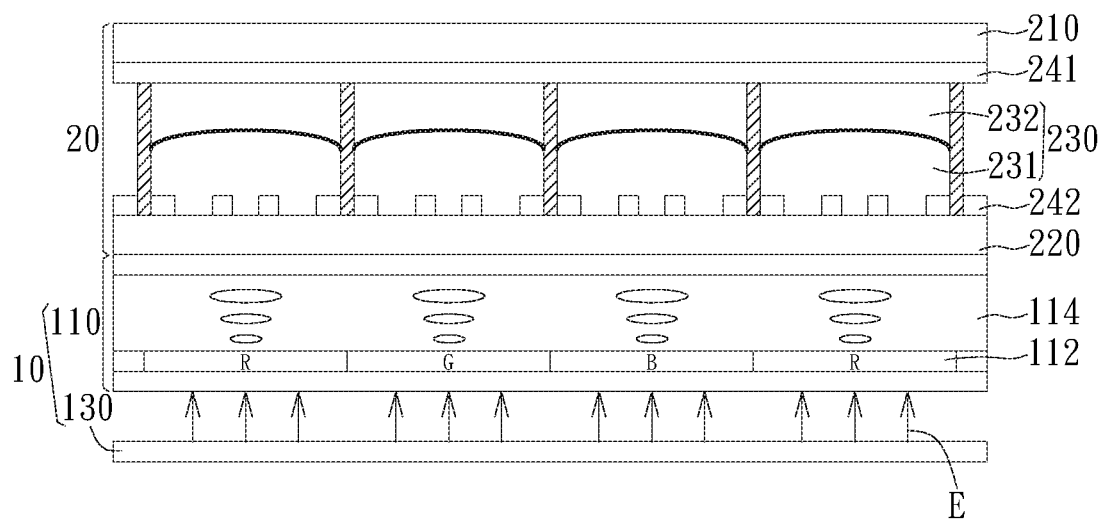
FIG. 46 is a schematic diagram of another embodiment of a display device having a backlight source.

FIG. 46 is a schematic diagram of another embodiment of a display device 1 having a backlight source 130. As shown in FIG. 46, an adjustment panel 20 is disposed on a display module 10. In the embodiment of FIG. 46, the display module 10 is a non-self-luminous display module and includes a display panel 110 and the backlight source 130. The display panel 110 has a liquid crystal layer 114 and a plurality of sub pixels 112. In an embodiment, marking letters R, G and B in the sub pixels 112 refer to regions capable of producing light in different colors. The adjustment panel 20 includes a first substrate 210, a second substrate 220, a medium layer 230, a first electrode layer 241, and a second electrode layer 242. The second substrate 220 is disposed facing the first substrate 210. The backlight source 130, for example, may take a micro-LED or μ-LED as a light source.

In the embodiment of FIG. 46, the second substrate 220 is closer to the display panel 110 than the first substrate 210. The second substrate 220 receives collimated light E from the display module 10. That is, the second substrate 220 is located on the light incoming side of the adjustment panel 20, and the first substrate 210 is located on the light emitting side of the adjustment panel 20. The medium layer 230 is disposed between the first substrate 210 and the second substrate 220. The medium layer 230 includes a first medium 231 and a second medium 232. In the present embodiment, the medium layer 230 is filled with the first medium 231 and the second medium 232. In addition, the content that the second electrode layer 242 includes a plurality of electrode groups is as mentioned above, so no more details will be described here.

The present invention is described in the above-mentioned related embodiments, but the above-mentioned embodiments are only examples of the present invention. It must be noted that the disclosed embodiments do not limit the scope of the present invention. On the contrary, the modifications and equivalent settings that are made without departing from the spirit and scope of claims shall all fall within the scope of the present invention.

What is claimed is:

1. A display device, comprising:
a display module emitting collimated light toward a propagation direction; and
an adjustment panel disposed on the display module, the adjustment panel comprising:
a first substrate;
a second substrate disposed facing the first substrate;
a medium layer disposed between the first substrate and the second substrate, the medium layer comprising a first medium and a second medium;
a first electrode layer disposed on the first substrate; and
a second electrode layer disposed on the second substrate and facing the first electrode layer,
wherein when the adjustment panel is in a first enabled state, a voltage difference exists between the first substrate and the second substrate to form an electric field distribution; at least one equivalent dioptric structure is formed in the medium layer according to the electric field distribution, and at least part of the collimated light passes through the equivalent dioptric structure and emits along a predetermined light emitting direction deflected from the propagation direction; and
wherein the second medium comprises a plurality of polyhedral structures; the polyhedral structures are adjacent to one another and are arranged along a first arrangement direction parallel to the side edge of the adjustment panel and a second arrangement direction perpendicular to the first arrangement direction, and the second medium is staggered from the first medium; the first medium is a material having a birefringence property.

2. The display device according to claim 1, wherein the refractive index of the first medium is voltage-dependent; when the adjustment panel is in the first enabled state, the refractive index of the first medium varies from a first refractive index value to a second refractive index value with the voltage difference, and the refractive index of the second medium is equal to the first refractive index value.

3. The display device according to claim 1, further comprising a third electrode layer disposed on part of surfaces of the polyhedral structures, wherein the third electrode layer and the first electrode layer are staggered in a projection direction on the first substrate.

4. The display device according to claim 3, wherein four polyhedral structures in the polyhedral structures are adjacent to one another along the first arrangement direction and the second arrangement direction and constitute one light emitting group; the polyhedral structures are triangular prisms; each of the triangular prisms has a ridge and a bottom surface opposite to the ridge; the bottom surface is disposed close to the first substrate; and in the first arrangement direction or the second arrangement direction, the ridges of two adjacent triangular prisms in the light emitting group are perpendicular to each other.

5. The display device according to claim 3, wherein four polyhedral structures in the polyhedral structures are adjacent to one another along the first arrangement direction and the second arrangement direction and constitute one light emitting group, and the polyhedral structures are pyramids.

6. The display device according to claim 3, wherein the predetermined light emitting direction comprises a first light emitting direction and a second light emitting direction; when the adjustment panel is in the first enabled state, positions of the display module corresponding to the third electrode layer and positions corresponding to part of the first electrode layer are not lightened; a refraction interface is generated at a border between the first medium and the second medium to form the equivalent dioptric structure, and the collimated light is emitted toward the first light emitting direction.

7. The display device according to claim 3, wherein the predetermined light emitting direction comprises a first light emitting direction and a second light emitting direction; when the adjustment panel is in the first enabled state, positions of the display module corresponding to the third electrode layer are not lightened; a refraction interface is generated at a border between the first medium and the second medium to form the equivalent dioptric structure, and the collimated light is emitted toward the first light emitting direction and the second light emitting direction.

8. The display device according to claim 1, wherein the refractive index of the first medium is voltage-dependent; the predetermined light emitting direction comprises a first light emitting direction and a second light emitting direction; when the adjustment panel is in the first enabled state, a position of the display module corresponding to the first electrode layer is not lightened; the first medium generates a refraction interface having a gradient-distributed refractive index according to the electric field distribution; the refraction interface forms the equivalent dioptric structure, and the collimated light is emitted toward the first light emitting direction, the second light emitting direction, and the propagation direction.

9. The display device according to claim 1, wherein when the adjustment panel is in a second enabled state, no voltage difference exists between the first substrate and the second substrate, and the collimated light penetrates through the adjustment panel along the propagation direction.

10. The display device according to claim 1, wherein the display module is a self-luminous display panel and has a plurality of sub pixels; the medium layer is divided into a plurality of adjustment regions; the adjustment regions correspond to the sub pixels, and at least part of the adjustment regions have different dioptric degrees.

11. The display device according to claim 1, wherein each dioptric unit in the equivalent dioptric structure has an inclined plane; an inclination angle is formed between the inclined plane and the surface of the second substrate; the collimated light is substantially deflected from the propagation direction toward an inclination direction of the inclined plane.

12. The display device according to claim 1, wherein the first medium has a first refractive index value and a second refractive index value which vary with the voltage difference; when the adjustment panel is in the first enabled state, the refractive index of the first medium varies from the first refractive index value to the second refractive index value with the voltage difference, and a difference value between the first refractive index value and the second refractive index value ranges between 0 and 0.225.

13. The display device according to claim 12, wherein each dioptric unit in the equivalent dioptric structure has an inclined plane; an inclination angle is formed between the inclined plane and the surface of the second substrate; the first refractive index value ranges between 1.5 and 1.725; the inclination angle has a first angle range between 10 degrees and 60 degrees; an included angle is formed between the predetermined light emitting direction and the surface of the first substrate; the included angle has a range between 0 and 40 degrees corresponding to the first angle range; the inclination angle has a second angle range between 67.5 degrees and 75 degrees; the included angle has a range between 40 degrees and 75 degrees corresponding to the second angle range; in the first angle range, the included angle is increased with the increase of the inclination angle and the difference value between the first refractive index value and the second refractive index value; and in the second angle range, the included angle is decreased with the increase of the inclination angle and the difference value between the first refractive index value and the second refractive index value.

14. A display device, comprising:
a display module emitting collimated light toward a propagation direction; and
an adjustment panel disposed on the display module, the adjustment panel comprising:
a first substrate;
a second substrate disposed facing the first substrate;
a medium layer disposed between the first substrate and the second substrate, the medium layer comprising a first medium;
a first electrode layer disposed on the first substrate; and
a second electrode layer disposed on the second substrate and facing the first electrode layer,
wherein when the adjustment panel is in a first enabled state, a voltage difference exists between the first substrate and the second substrate to form an electric field distribution; at least one equivalent dioptric structure is formed in the medium layer according to the electric field distribution, and at least part of the collimated light passes through the equivalent dioptric structure and emits along a predetermined light emitting direction deflected from the propagation direction; and
wherein the first electrode layer is arranged along a first arrangement direction parallel to the side edge of the adjustment panel, and the second electrode layer is arranged along a second arrangement direction; the first arrangement direction is perpendicular to the second arrangement direction; the second electrode layer comprises a plurality of electrode groups corresponding to the equivalent dioptric structures; each of the electrode groups comprises a center electrode and two opposite edge electrodes; the center electrode has at least one adjustment electrode, and the two edge electrodes are respectively located at two sides of the center electrode.

15. The display device according to claim 14, wherein the center electrode has two adjustment electrodes; when the adjustment panel is in the first enabled state, the two adjustment electrodes have different voltage values, and the two edge electrodes have different voltage values; the equivalent dioptric structure comprises multiple dioptric units; each of the dioptric units has a peak part; in a projection direction on the second substrate, the peak part is away from a center line between the two edge electrodes.

16. The display device according to claim 14, wherein the center electrode has two adjustment electrodes; when the adjustment panel is in the first enabled state, the two adjustment electrodes have the same voltage values; the equivalent dioptric structure comprises multiple dioptric units; each of the dioptric units has a peak part, and in a projection direction on the second substrate, the peak part is located on a center line between the two edge electrodes.

17. The display device according to claim 14, wherein the medium layer comprises a second medium; the first medium and the second medium are respectively first fluid and second fluid; the first fluid and the second fluid have different polarities and refractive indexes; a contact interface serving as a refraction interface exists between the first fluid and the second fluid; when the adjustment panel is in the first enabled state, a shape of the refraction interface is changed according to the electric field distribution to form the equivalent dioptric structure.

18. A display device, comprising:
a display module emitting collimated light toward a propagation direction; and
an adjustment panel disposed on the display module, the adjustment panel comprising:
a first substrate;
a second substrate disposed facing the first substrate;
a medium layer disposed between the first substrate and the second substrate, the medium layer comprising a first medium and a second medium;
a first electrode layer disposed on the first substrate; and
a second electrode layer disposed on the second substrate and facing the first electrode layer,
wherein when the adjustment panel is in a first enabled state, a voltage difference exists between the first substrate and the second substrate to form an electric field distribution; at least one equivalent dioptric structure is formed in the medium layer according to the electric field distribution, and at least part of the collimated light passes through the equivalent dioptric structure and emits along a predetermined light emitting direction deflected from the propagation direction; and
wherein the first medium and the second medium are respectively first fluid and second fluid; the first fluid and the second fluid have different polarities and refractive indexes; a contact interface serving as a refraction interface exists between the first fluid and the second fluid; when the adjustment panel is in the first enabled state, a shape of the refraction interface is changed according to the electric field distribution to form the equivalent dioptric structure.

* * * * *